United States Patent [19]

Hartmann et al.

[11] Patent Number: 5,394,720
[45] Date of Patent: Mar. 7, 1995

[54] APPARATUS FOR PRODUCING FORM WOUND STATOR COILS

[75] Inventors: Robert H. Hartmann; James A. Guerrein, both of Erie, Pa.

[73] Assignee: General Electric Company, Erie, Pa.

[21] Appl. No.: 202,847

[22] Filed: Feb. 24, 1994

Related U.S. Application Data

[63] Continuation of Ser. No. 891,871, Jun. 1, 1992, abandoned.

[51] Int. Cl.⁶ .............................................. B21D 7/12
[52] U.S. Cl. ......................................... 72/22; 72/298; 72/302
[58] Field of Search ................. 72/295, 298, 299, 301, 72/302, 22, 23; 29/596, 598; 140/92.1

[56] References Cited

U.S. PATENT DOCUMENTS

| | | | |
|---|---|---|---|
| 2,841,200 | 7/1958 | James | 72/298 |
| 2,962,076 | 11/1960 | Durham | 72/298 |
| 4,751,838 | 6/1988 | Voges | 72/302 |
| 4,922,741 | 5/1990 | Bridges | 140/92.1 |
| 4,964,291 | 10/1990 | Otty | 29/596 |

FOREIGN PATENT DOCUMENTS

| | | |
|---|---|---|
| 0107314 | 2/1984 | European Pat. Off. ............ 72/306 |
| 0135483 | 3/1985 | European Pat. Off. . |
| 0251207 | 7/1988 | European Pat. Off. . |
| 33896 | 11/1964 | German Dem. Rep. . |
| 169352 | 9/1984 | Japan ..................... 72/301 |
| 385984 | 3/1965 | Switzerland .......... 72/301 |

OTHER PUBLICATIONS

Patent Abstracts of Japan, vol. 9, No. 244 (E-346)(1967) 30 Sep. 1985 & JP, A, 60 96 154 (Hitachi) 29 May 1985 (See abstract).

*Primary Examiner*—Daniel C. Crane
*Attorney, Agent, or Firm*—Ann M. Kratz; Marvin Snyder

[57] ABSTRACT

Apparatus for forming a form wound stator coil from a bobbin has means for clamping the straight portions of the bobbin to define the straight portions of the each leg of the coil. It also has means for bending the bobbin to predetermined radii to form arms extending from the straight portions of each leg of the coil to each nose of the coil. Means are provided for bending each arm to a predetermined radius. Means are further provided for bending the nose portions to a predetermined angle. Means for providing a drop to the arm portions of the coil relative to the stator bore are also provided. Means for forming the leads of the bobbin to a predetermined configuration are also provided. Hydraulic means for powering the apparatus and a system for controlling the hydraulic means are also disclosed.

12 Claims, 24 Drawing Sheets

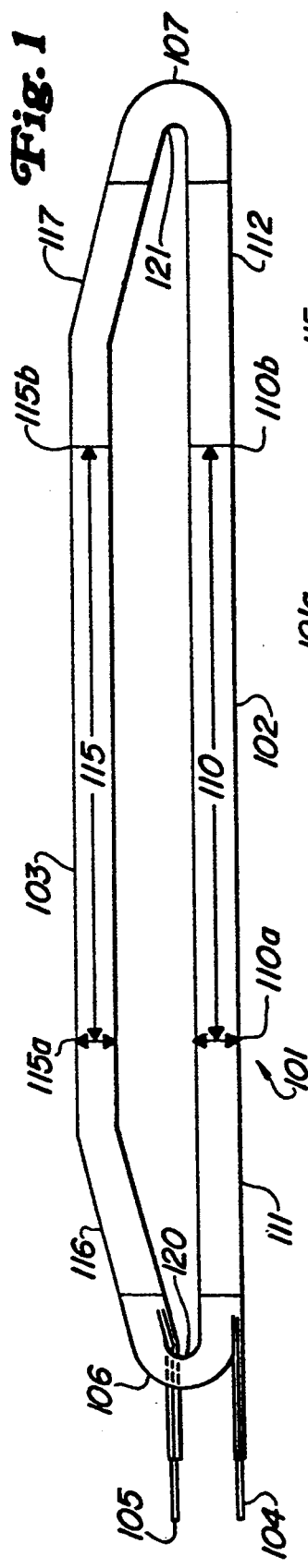
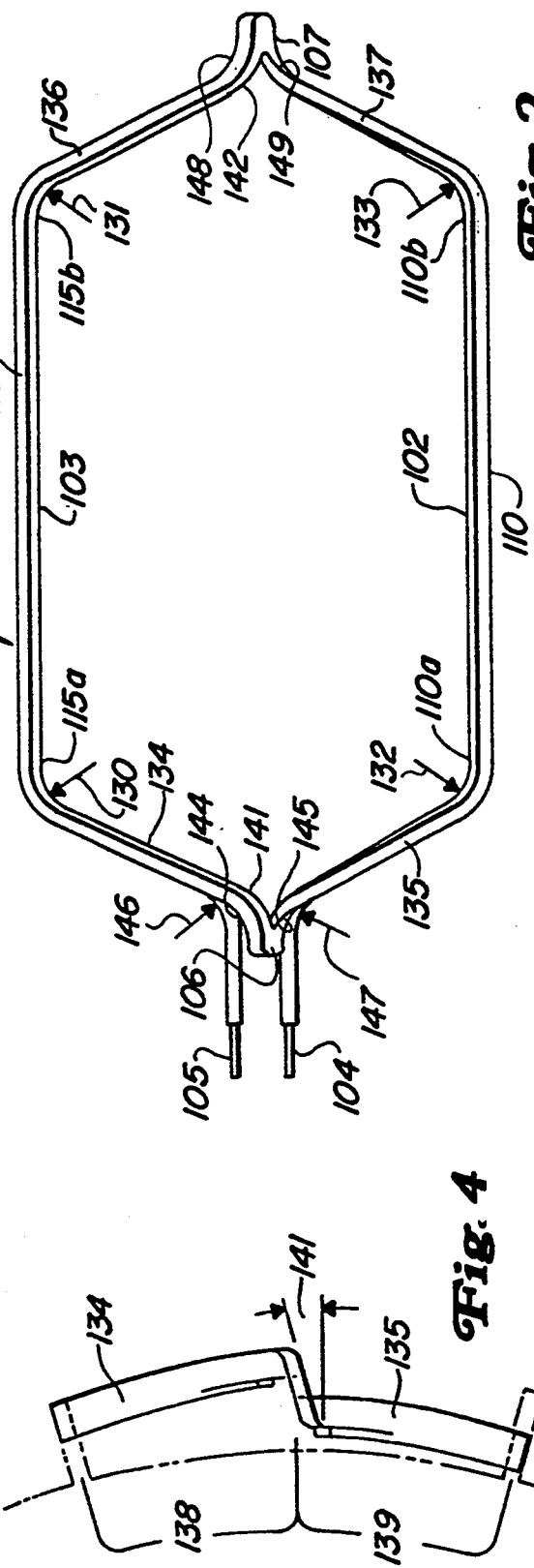
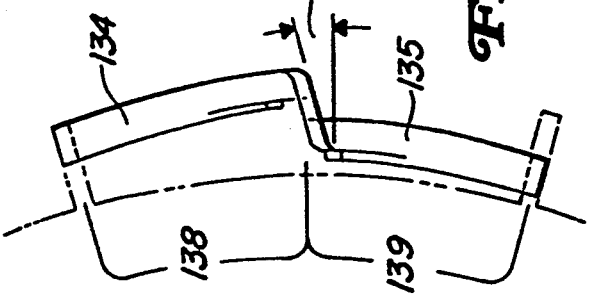

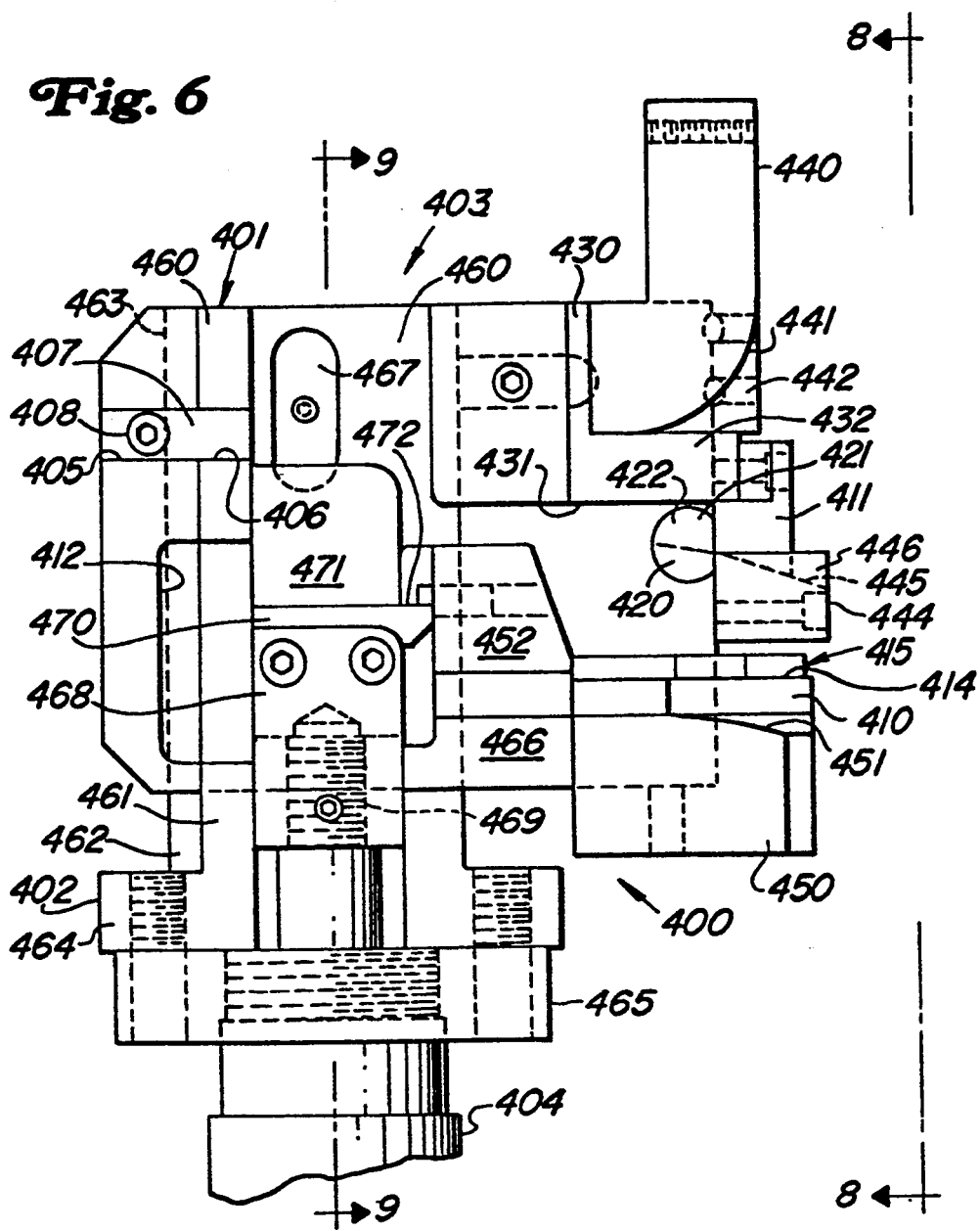
Fig. 6
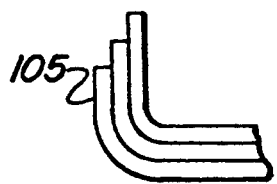
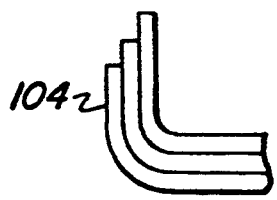

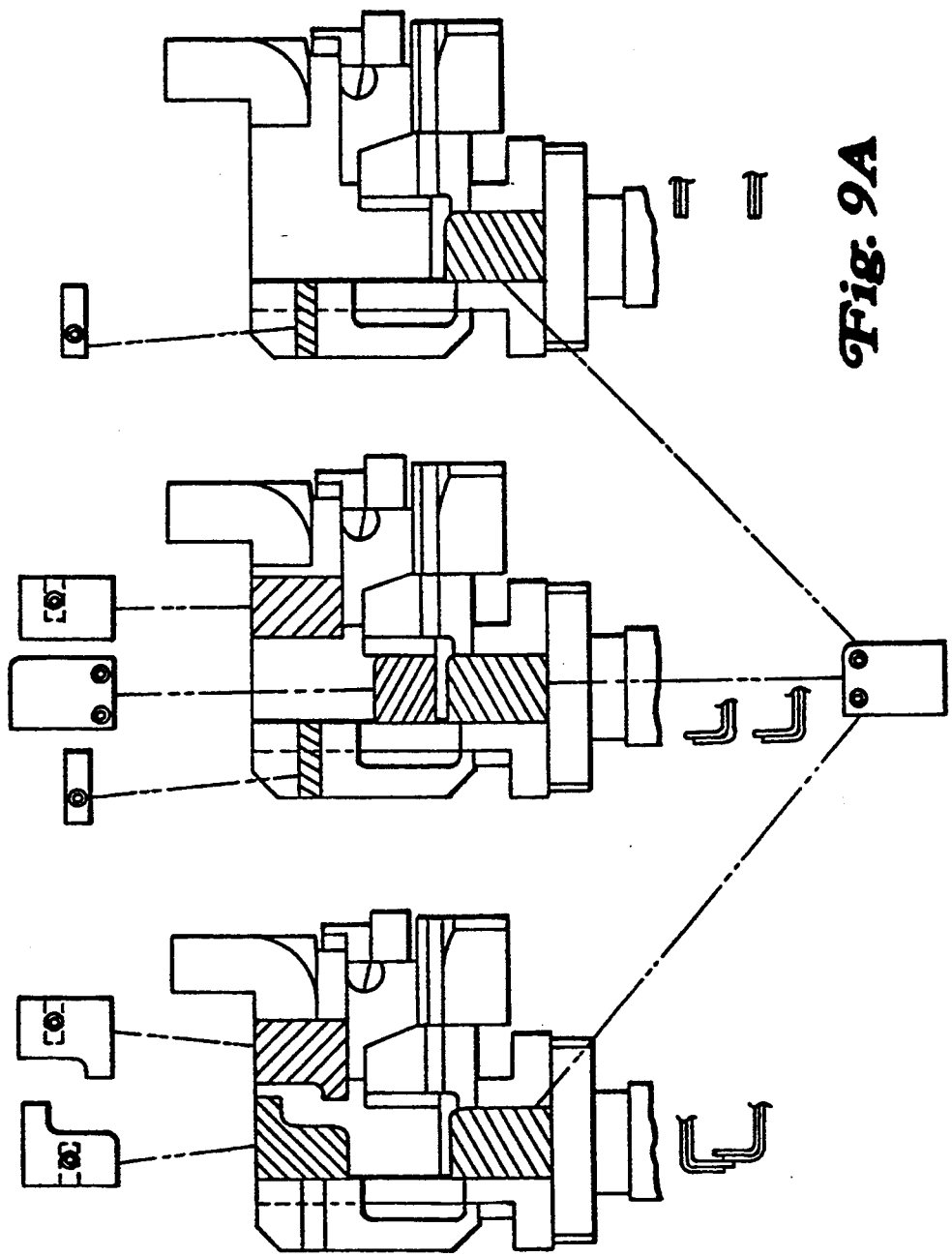

APPARATUS FOR PRODUCING FORM WOUND STATOR COILS

This application is a continuation of application Ser. No. 07/891,871, filed Jun. 1, 1992, now abandoned.

A portion of the disclosure of this patent document contains material which is subject to copyright protection. The Copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to a method and apparatus for producing form wound stator coils from a predesigned bobbin.

BACKGROUND PRIOR ART PROBLEM

Form wound stator coils are made from "bobbins" which consist of a number of turns of copper wire which may be in a prescribed form which relates to the final desired configuration of the stator coil.

Previously, making form wound stator coils was a labor intensive operation. Bobbins of insulated copper wire were formed to an approximate coil shape on crude manually run machines and then hammered into the desired shape. One disadvantage of that process was that repeatedly hammering the bobbin resulted in some degradation of the properties of the copper wire and turn insulation. Another disadvantage was that it took as long as 15 minutes to shape the bobbin into the prescribed shape of the stator coil. Further, it was difficult to produce coils within close tolerances, and poorly shaped coils are difficult to insert into the stator coil and often cause damage which results in future motor failures. Coil forming machines are known which pivot about a center axis equivalent to a center axis of the stator core to stretch bobbins. However, such known machines typically require manual control of grippers and are not generally adapted to form leads of the bobbins. In addition, such machines typically do not have rotational nose end clamps to properly form nose ends of bobbins.

Attempts have been made to construct apparatus to shape bobbins in desired coil configurations. Prior to this invention, no such apparatus has been available to completely configure a bobbin to the desired stator coil configuration.

SUMMARY OF THE INVENTION

It is an object of this invention to create an apparatus which is capable of completely forming a form wound stator coil from a bobbin.

It is another object of this invention to create an apparatus which is capable of completely forming form wound stator coils having a variety of dimensions with a minimal change in tooling.

It is another object of this invention to create an apparatus which is capable of completely forming a form wound stator coil in such a manner which minimizes or eliminates degradation or work hardening of the copper wire in the bobbin.

It is another object of this invention to create an apparatus which is capable of mass producing form wound stator coils having little, if any, meaningful variation in tolerances, and to produce such coils at the rate of about one minute per coil or less.

In one form of the invention, apparatus is provided for forming a form wound stator coil from a bobbin. The bobbin from which the form wound stator coil is formed has a lower leg including a straight length portion and two nose end arms, and an upper leg including an upper leg straight length portion and two nose end arms, a lead end nose defining a lead end inner nose radius, an opposite lead end nose defining an opposite lead end inner nose radius, and leads.

The apparatus includes lower leg clamping means for clamping the lower leg of the bobbin to maintain the lower leg straight length arm portion substantially in its original shape and for forming a radius of predetermined dimensions between the straight length portion and the lower leg nose end arms, and lower leg clamp positioning means for initially positioning the lower leg clamping means on at least the opposite ends of the lower leg straight length arm portion.

The apparatus also includes upper leg clamping means for clamping the upper leg of the bobbin to maintain the upper leg straight length arm substantially in its original shape and for forming a radius of predetermined dimensions between the straight length portion and the upper leg nose end arms, and upper leg clamp positioning means for initially positioning the upper leg clamping means on at least the opposite ends of the upper leg straight length arm.

The apparatus also includes pivoting means for pivoting the lower leg clamping means and pivoting means for pivoting the upper leg clamping means, both pivoting means being pivoted about an axis equivalent to the center axis of the stator core into which the finished coil will be inserted.

Lead end clamping means are provided for securing the lead end nose, and opposite lead end clamping means are provided for securing the opposite lead end nose in a fixed position.

First and second positioning means are provided for positioning the lead end and opposite lead end clamping means with respect to the dimensions of the bobbin. Further, first and second pressure means are provided for selectively applying pressure against the first and second positioning means, and the pressure is directed generally outwardly from the center of the apparatus.

Operation means are provided for pivoting the lower leg clamping means to a first predetermined angle and for pivoting the upper leg clamping means to a second predetermined angle and for activating the first and second pressure means to apply a predetermined amount of pressure and flow so that the lower leg clamping means and the upper leg clamping means reach their respective predetermined angles substantially simultaneously.

Encoder means are also provided for providing feedback to control means of the positions of the lower leg clamping means, the lower leg clamp positioning means, the upper leg clamping means, the upper leg clamp positioning means, the pivoting means, the lead end clamping means, the opposite lead end clamping means, the first and second positioning means, and for providing feedback to control means of the status of the operation means.

Position indication means are provided for visually depicting the lateral spacing between each of the lower leg clamping means and between each of the upper leg clamping means for setting those clamps to a distance equal to the straight length portion of each leg of the bobbin.

Control means are provided for controlling the operation means to position and move the lower leg clamping means, the lower leg clamp positioning means, the upper leg clamping means, the upper leg clamp positioning means, the lead end clamping means, the opposite lead end clamping means, and the first and second positioning means in a predetermined manner so that the clamps can be initially positioned to receive a bobbin having predetermined dimensions, and so that the clamps can close to secure the bobbin, and so that the clamps can be moved and rotated to produce a formed coil having predetermined dimensions.

Means are also provided for securing individual strands of wire in the lead end nose from becoming misaligned with respect to one another, and means are also provided for securing individual strands of wire in the opposite lead end nose from becoming misaligned with respect to one another.

Arcing means are also provided for arcing the arms of the upper and lower legs to a predetermined radius. Additional means are provided for configuring the leads to a predetermined configuration.

In another aspect of this invention, a method is provided for forming a form wound stator coil from a bobbin. The lower and upper legs of the bobbin are clamped proximate to the opposite ends of their straight length portions to maintain the straight length portions to predetermined dimensions.

The lead end nose, the leads, and the opposite lead end nose are also clamped and maintained in a free floating relationship against an applied pressure of from about 10 pounds per square inch to about 25 pounds per square inch, or preferably about 15 pounds per square inch. As will be understood by those skilled in the art, the pressure can be varied, depending on the forces applied to the bobbin during core forming operation. Ideally, the pressure applied to the nose clamps is sufficient to cause the nose clamps to smoothly move inward toward each other as the legs are rotated outward from one another.

The lower and upper legs are rotated outward to a predetermined angular relationship from one another about an axis equivalent to the center axis of the stator core into which the finished coil will be inserted. At approximately the same time a radius of predetermined dimensions is formed between the straight length portion and the lower leg nose end arms, and radii are formed between the lead end and opposite lead end noses and the upper and lower nose end arms proximate to said noses. Those radii are formed by radial tools disposed on the outside ends of the clamps which maintain the straight length portions of the coil.

The noses are rotated to a predetermined angle, and the noses are raised to the desired "drop" (the angular position of the noses relative to a line tangent to the teeth of the stator core which permits sufficient clearance for the rotor to be inserted in the stator core after the coils are inserted into the slots of the stator core).

In preferred embodiments of the method, radii are formed on the upper and lower nose end arms. Further the leads are formed to a predetermined configuration. In addition, the lower and upper legs are rotated outward to a predetermined angular relationship from one another in a smooth, continuous motion to minimize degradation of the copper wire in the bobbin.

In another aspect of this invention, a control system is provided for operating an apparatus for producing a form wound stator coil having a predetermined configuration from a bobbin having a predetermined configuration and dimensions. The control system is provided with means for inputting bobbin and coil dimension data and clamp position data. It also comprises operator controlled means for selectively generating apparatus operating command signals, such as signals for positioning the means operable on the bobbin to receive a bobbin, and signals for causing the means operable on the bobbin to operate on the bobbin to form coils and for causing the means operable on the bobbin to release the formed coil to permit its removal from the apparatus. The control system is provided with means for interpreting feedback signals from the encoder means. It also includes a variable program control means for receiving and interpreting bobbin and coil dimension data, encoder input signals and operating command signals. The control system further includes means for generating commands in a preselected sequence to the operation means responsive to the variable program control means to actuate the operation means to position the means operable on the bobbin to receive the bobbin, to actuate the means operable on the bobbin to form the coil to predetermined dimensions, and to actuate the means operable on the bobbin to permit removal of the formed coil from the apparatus.

The present invention is a very significant advance over any prior art known to applicants. With the present invention, one operator can generate a coil from a bobbin in less than a minute, and ideally in 45 seconds or less. Prior methods took 15 minutes to perform the same operation. Further, the coils formed by the present invention are uniform and have much closer tolerances than was possible using prior apparatus. In addition, the copper wire in the coils formed by the present invention is not subject to nearly as much mechanical degradation as in the prior art method, where the bobbin had to be hammered —a significant amount in some cases—to form a coil, resulting in mechanical degradation of the properties of the copper wire and also in some damage to the wire insulation.

The present invention will be better understood and its various advantages will be more fully appreciated from the following description taken in conjunction with the accompanying drawings.

THE DRAWINGS

FIG. 1 is a sketch of a bobbin used in the present invention.

FIG. 2 is a sketch of a finished form wound stator coil made from the bobbin in FIG. 1.

FIG. 3 is a side view of the finished form wound stator coil shown in FIG. 2.

FIG. 4 is an end view of the finished form wound stator coil shown in FIG. 2.

FIG. 5D is a diagram which indicates the various rotational axis numbers of the apparatus of this invention.

FIG. 6 is a front view of the back section of the head block of the lead end nose clamp showing the cylinder rod in the extended position and also showing how the leads of the bobbin are bent by the removable tools used in that clamp.

FIG. 9A is a front view of the back section of the lead end nose clamp which shows three side views of the lower head block of the lead end nose clamp with the removable lead bending parts darkened to demonstrate those parts and to show the lead configurations that they produce.

FIGS. 17-1 through 17-6 are schematic drawings of a hydraulic system which may operate the apparatus shown in FIGS. 5–16.

DETAILED DESCRIPTION

Figures 1, 17:
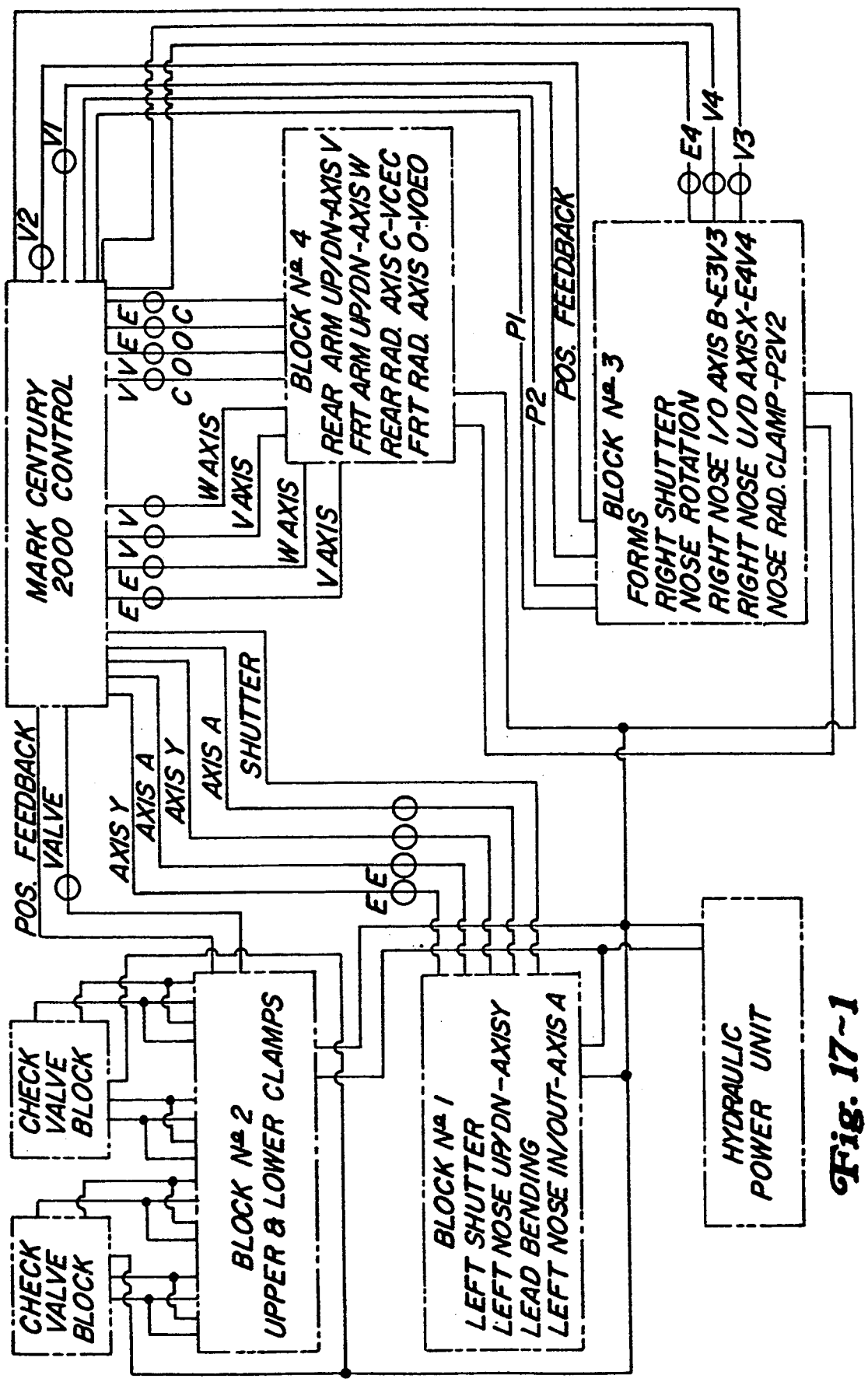

The present invention converts bobbins into form wound stator coils. The dimensions of the bobbin are a function of the final designed geometry of the form wound stator coils. A bobbin used in the present invention is schematically shown in FIG. 1. Bobbin 101 comprises at least one turn of insulated copper wire which has been wound in the configuration shown in FIG. 1. Bobbin 101 has a lower leg 102, an upper leg 103, leads 104 and 105, a lead end nose 106, and an opposite lead end nose 107. Lower leg 102 includes a coil straight length portion 110, which extends between lines 110A and 110B which is equal in length to the total straight length of the finished coil, and nose end arms 111 and 112. Upper leg 103 includes a coil straight length portion 115, which extends between lines 115A and 115B and which is equal in length to the total straight length of the finished coil, and nose end arms 116 and 117.

As will be explained in more detail below, bobbin 101 is placed in clamps in coil forming apparatus 501 shown in FIG. 5. The coil forming apparatus of this invention spreads the bobbin to form the finished form stator coil having the configuration shown in FIGS. 2–4.

Figures 2, 17:
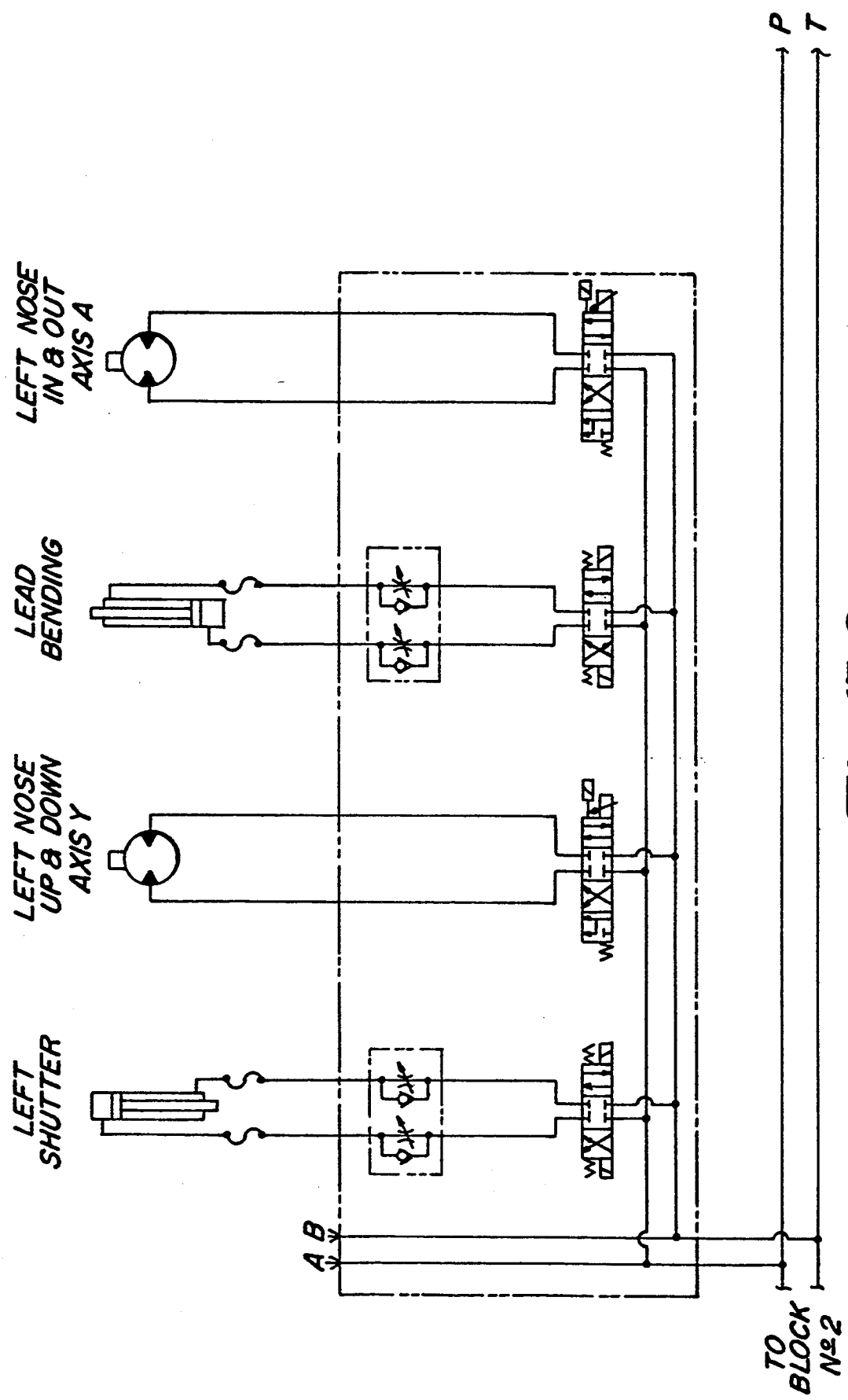
Figures 3A, 17:
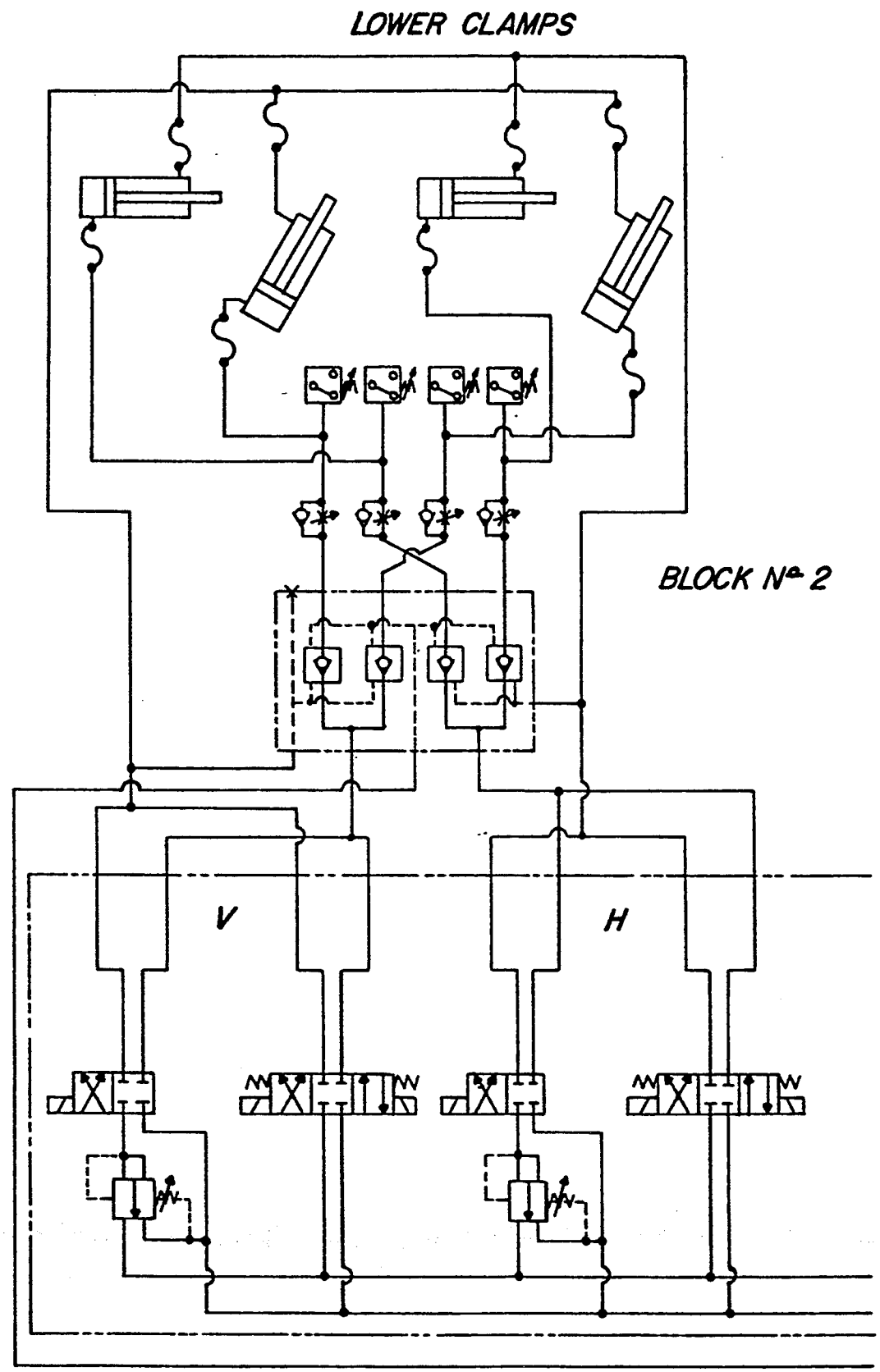
Figures 3B, 17:
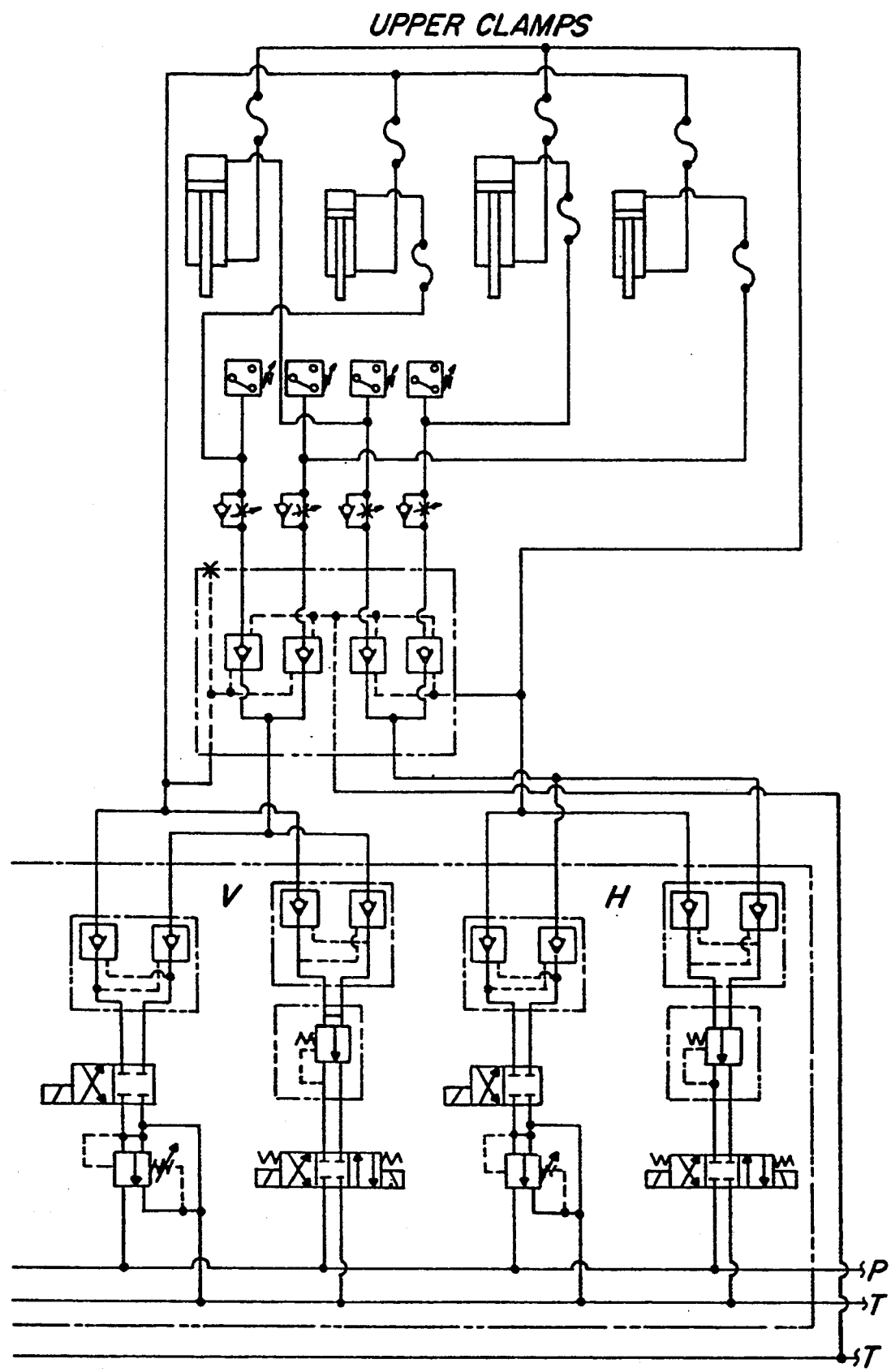
Figures 4, 17:
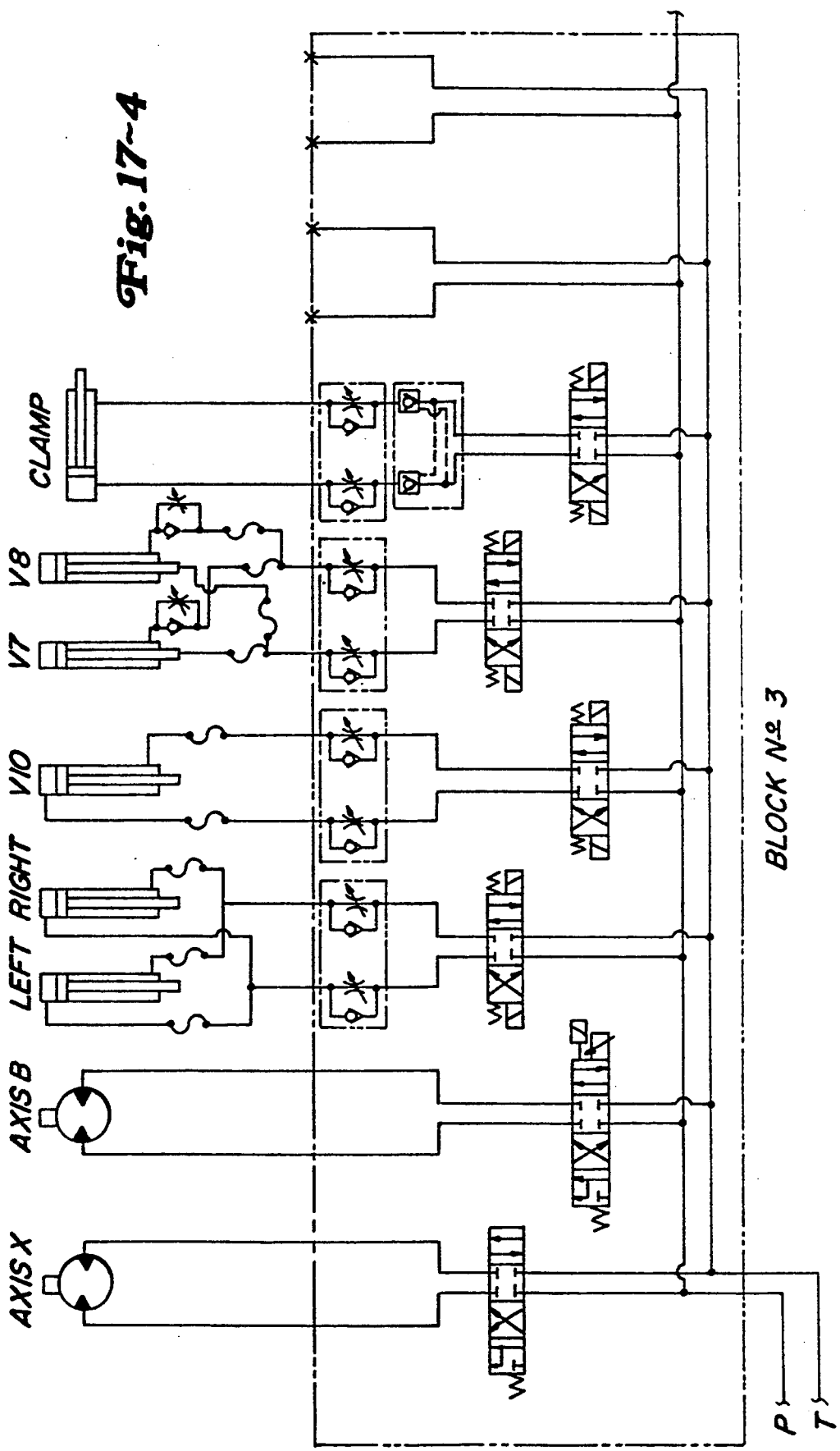
Figures 5, 17:
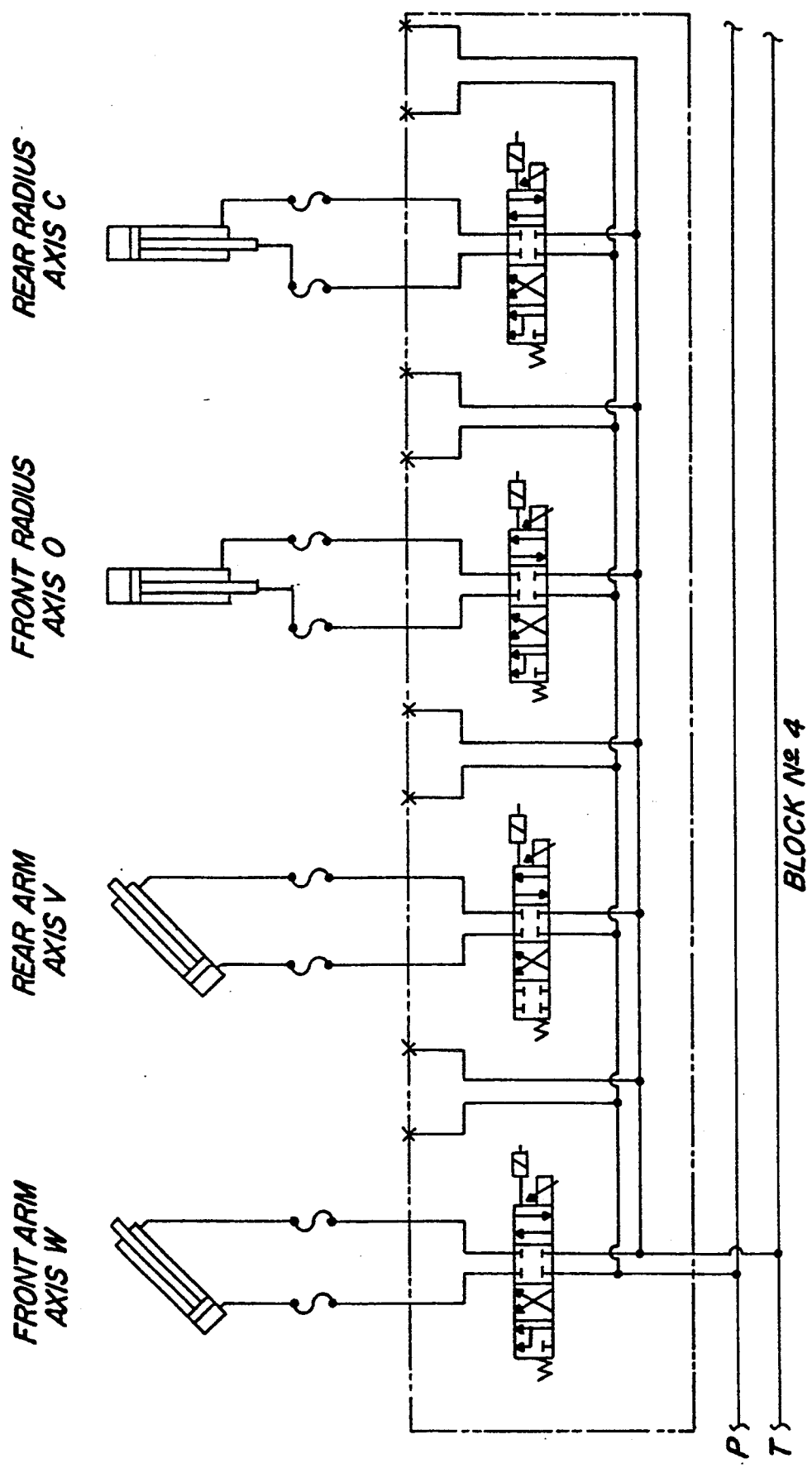

FIG. 2 is a sketch of a coil formed by the apparatus of this invention. As is discussed below, upper and lower leg clamps 531 and 551, respectively, spread legs 102 and 103. FIG. 3 is a side view of the coil, and FIG. 4 is and end view.

Figure 5:
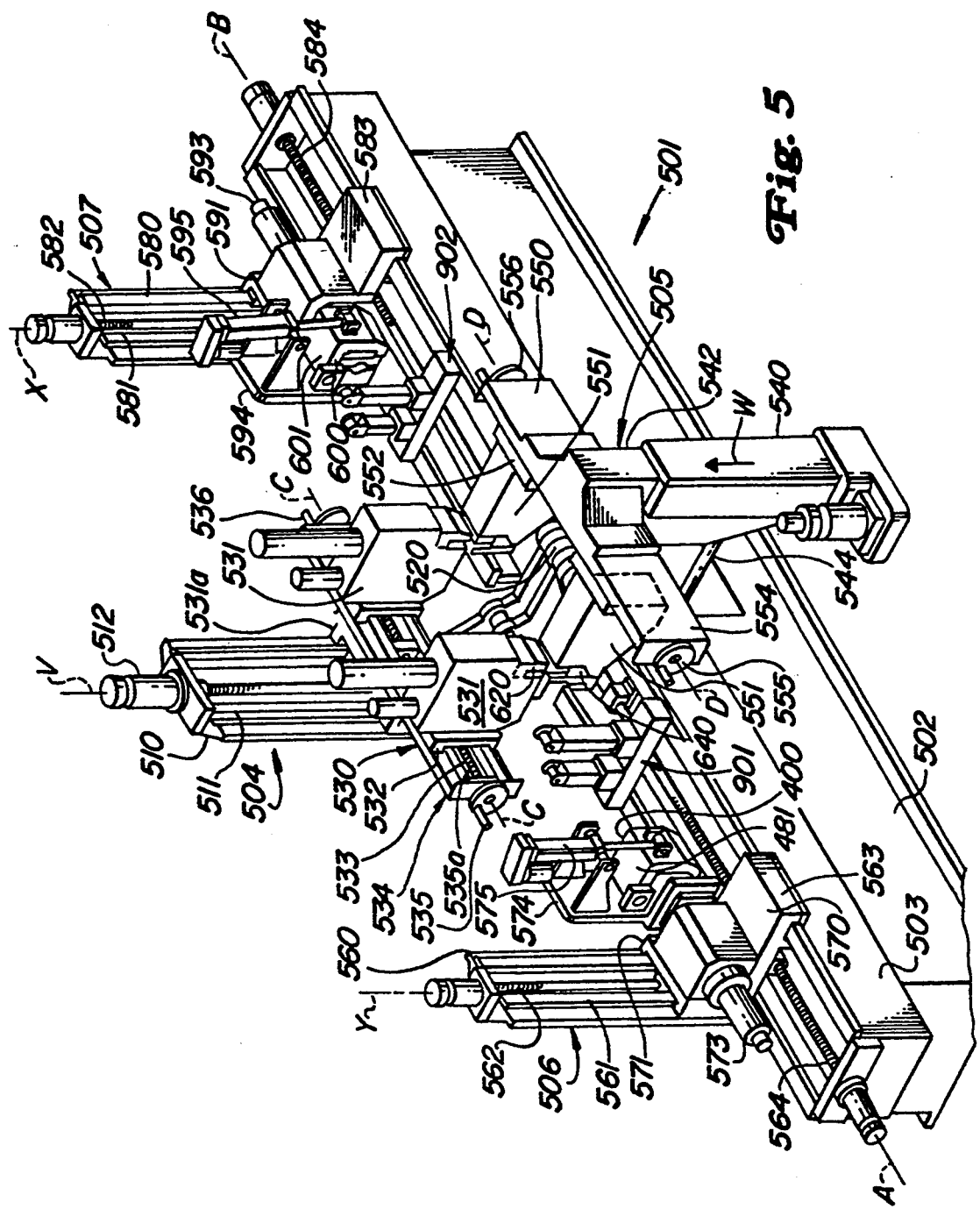
FIG. 5 is a drawing showing an elevational view of the major components of one embodiment of an apparatus of the present invention.

As shown in FIG. 5, the major components of coil forming apparatus 501 include base 502, base drive housing 503, upper bobbin leg clamp assembly 504, lower bobbin leg clamp assembly 505, lead end nose clamp assembly 506, and opposite lead end nose clamp assembly 507.

Upper bobbin leg clamp assembly 504 includes tower frame 510 which is provided with tracks 511 and drive shaft means 512. Tower frame 510 is pivotally connected to pivot 520, and tower frame 510 may be pivoted about pivot 520 by hydraulic drive means or other suitable means which are well known to those skilled in the art. Position encoding means, not shown but known to those skilled in the art, are disposed to indicate the angle to which tower frame has been rotated about pivot 520.

Tower drive unit 530 is mounted in driving relationship with drive shaft means 512 and includes slot units 531a in locked sliding engagement with tracks 511. Tower drive unit 530 thus may be moved up and down tower frame 510 along the "V" axis, which runs through drive shaft 512. Position encoding means, not shown but known to those skilled in the art, are disposed to indicate the position of tower drive unit 530 on tower frame 510.

Tower drive unit 530 is provided with upper leg clamps 531 which are slidably interlocked by track engaging units 532 to tracks 533 on transverse drive assembly 534 which moves upper leg clamps along axis "C" which is transverse to the "V" axis of tower frame 5 10. Transverse drive assembly includes one or more screw drives or other suitable means for moving clamps 53 1 to their desired position. In the embodiment shown, c lamps 531 move simultaneously outward from center or inward toward center by manually turning either handle 535 or 536, which respectively drive screw 535A which is half right handed and half left handed thread. A position indicator (not shown) is disposed on the assembly to indicate the position of each of the clamps 531 on transverse drive assembly 534. That position is input into the control system of the invention. Alternatively, position encoding means may be used to automatically feed the position to the control means.

Figure 12:
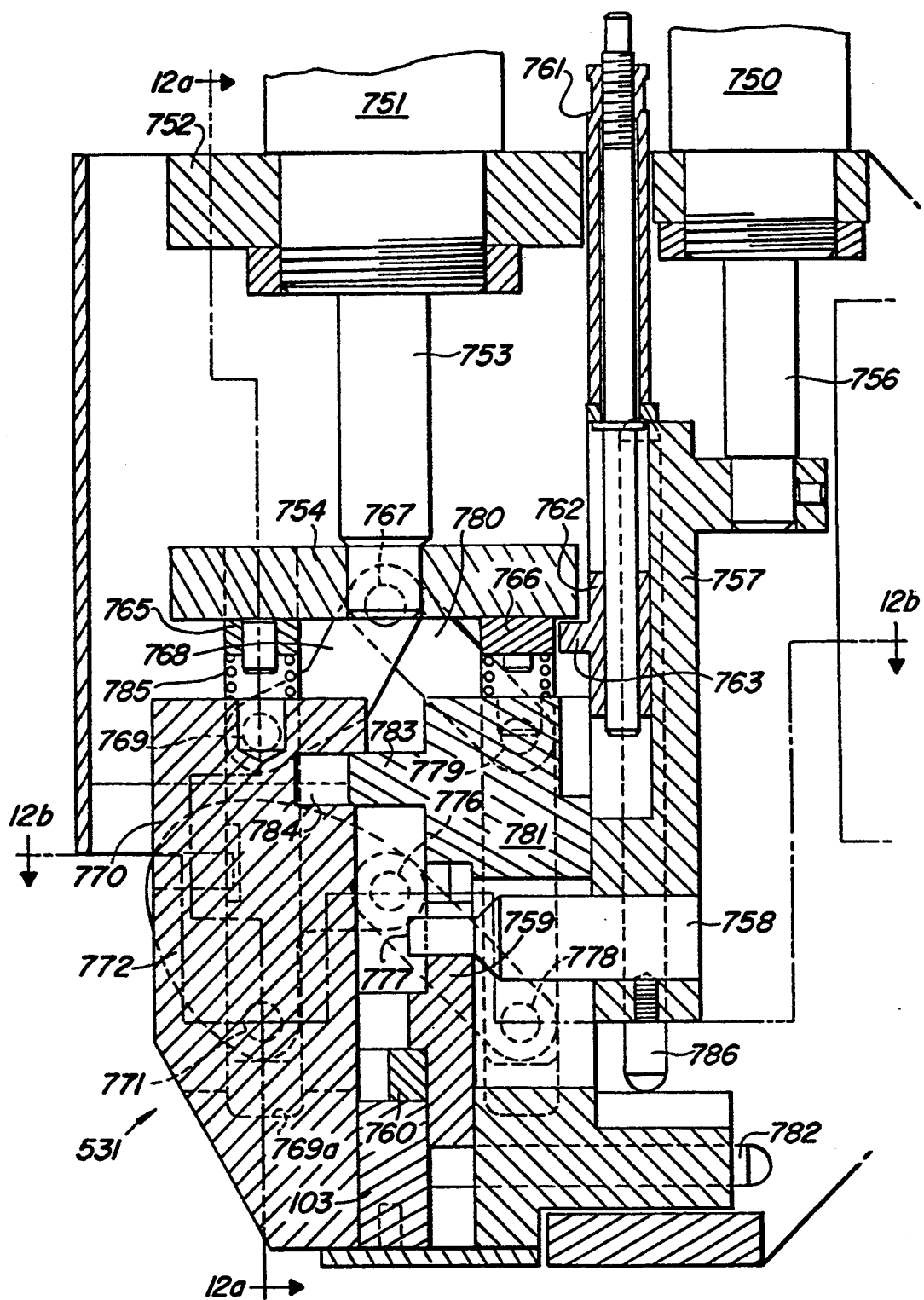
FIG. 12 is a side cross sectional view of the upper leg clamp assembly.
Figure 12A:
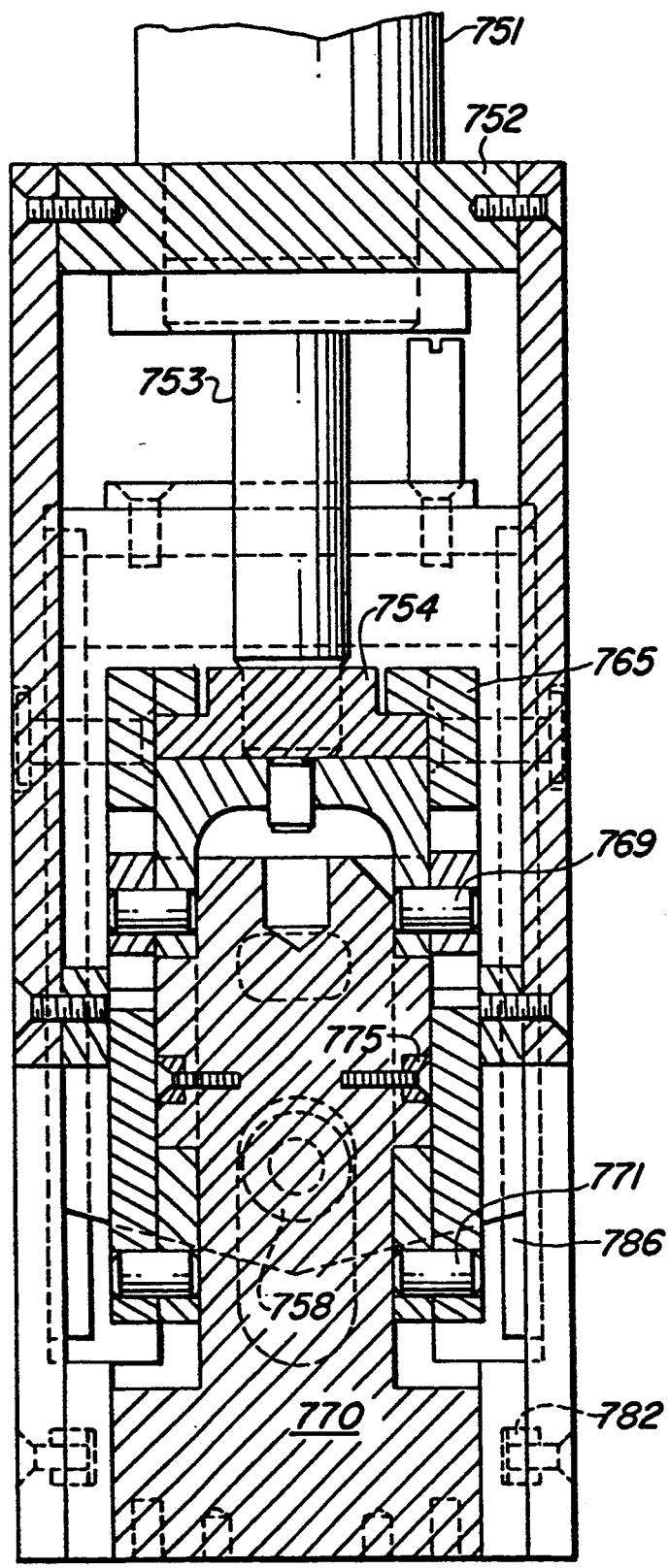
FIG. 12A is a front cross sectional view taken along line C—C of FIG. 12.
Figure 12B:
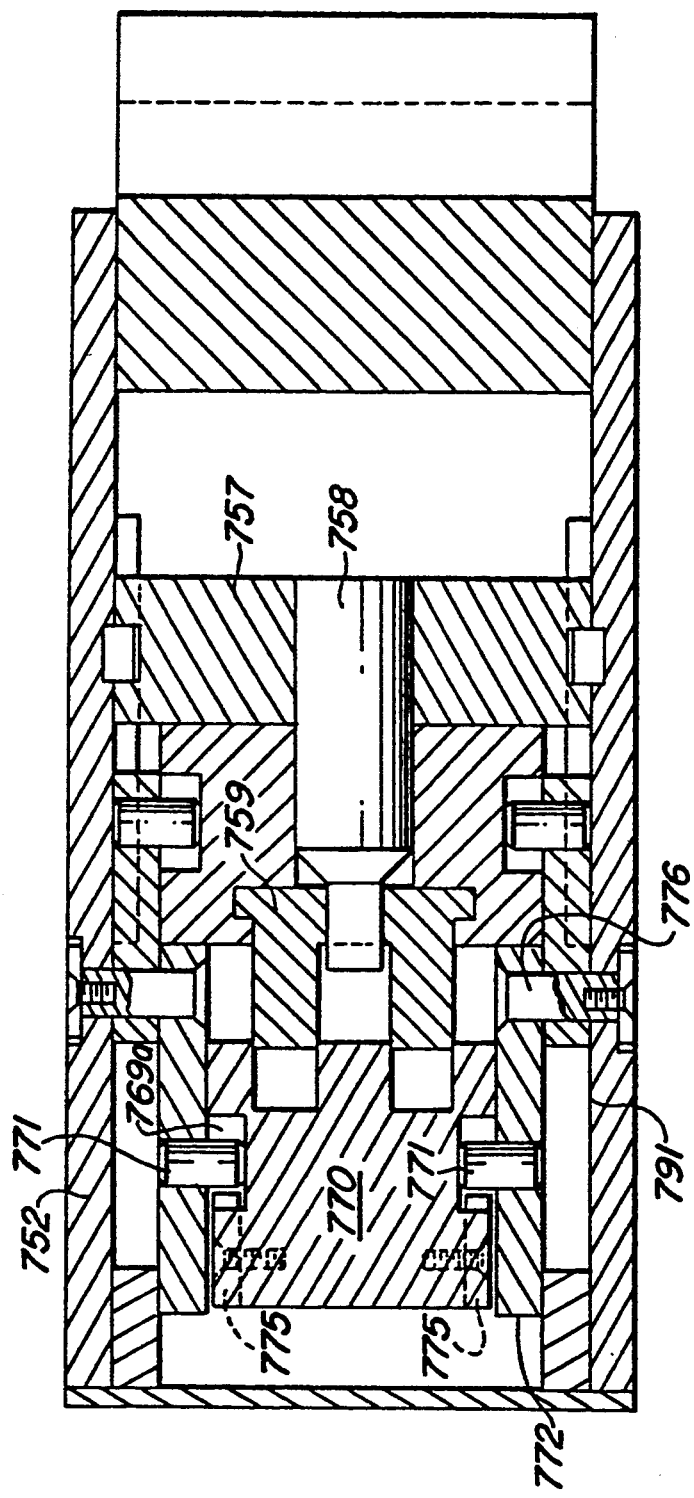
FIG. 12B is a top view taken along line A—A of FIG. 12.

Upper leg clamps 531 are four sided clamps which are adapted to engage upper leg 103 of bobbin 101. As is shown in FIG. 12, which is a side view of the upper leg clamp assembly 531 and associated apparatus, upper leg clamp assembly 531 includes two hydraulic cylinders; front cylinder 751 and back cylinder 750. Front cylinder 751 is mounted on frame 752. Front cylinder rod 753 is connected to plate 754, which is connected to generally U-shaped brackets 765 which is better viewed on FIG. 12A and 766, which is shown in FIG. 12. Frame pin 767 is connected to link 768, which in turn is connected through pin 769 to U-bracket 765. U-bracket 765 slides in a slot 769a in shutter 770. Pin 771 is also connected at the lower end of U-bracket 765. Pin 771 is also connected to link 772. Link 772 and link 768 impart a rotational to linear motion, so that when rod 753 of cylinder 751 is retracted, shutter 770 is lifted forward and upward about the links and thus opens to permit insertion or removal of upper leg 103 of bobbin 101. As is shown in FIG. 12B, retaining keys 775 are disposed in shutter 770 to enable U-bracket 765 to pull shutter 770 into its retracted or open position.

Referring to FIG. 12, link 772 is also connected to frame pin 776, which is also connected to link 777. Link 777 rotates about frame pin 776, and is also connected to pin 778. Pin 778 is located in back U-frame 766. Pin 779 is also located in U-frame 766. Link 780 is connected to pin 779 and to pin 767. Rear jaw 781 is in sliding relation on key 786.

When rod 753 is extended, it closes the shutter 770 by imparting a rotational to linear motion through U-frame 765 which pivots about links 768 and 772 which close shutter 770. When rod 753 is extended, links 780 and 777 impart linear motion to rear jaw 781, which has an integral key 783, which mates with slot 784 in shutter 770 to lock shutter 770 and jaw 781 together.

Die springs 785 disposed between U-frames 765 and 766 and shutter 770 and rear jaws 781 aid in the unclamping cycle when the shutter 770 is opened (i.e., when rod 753 is retracting).

Figure 18:
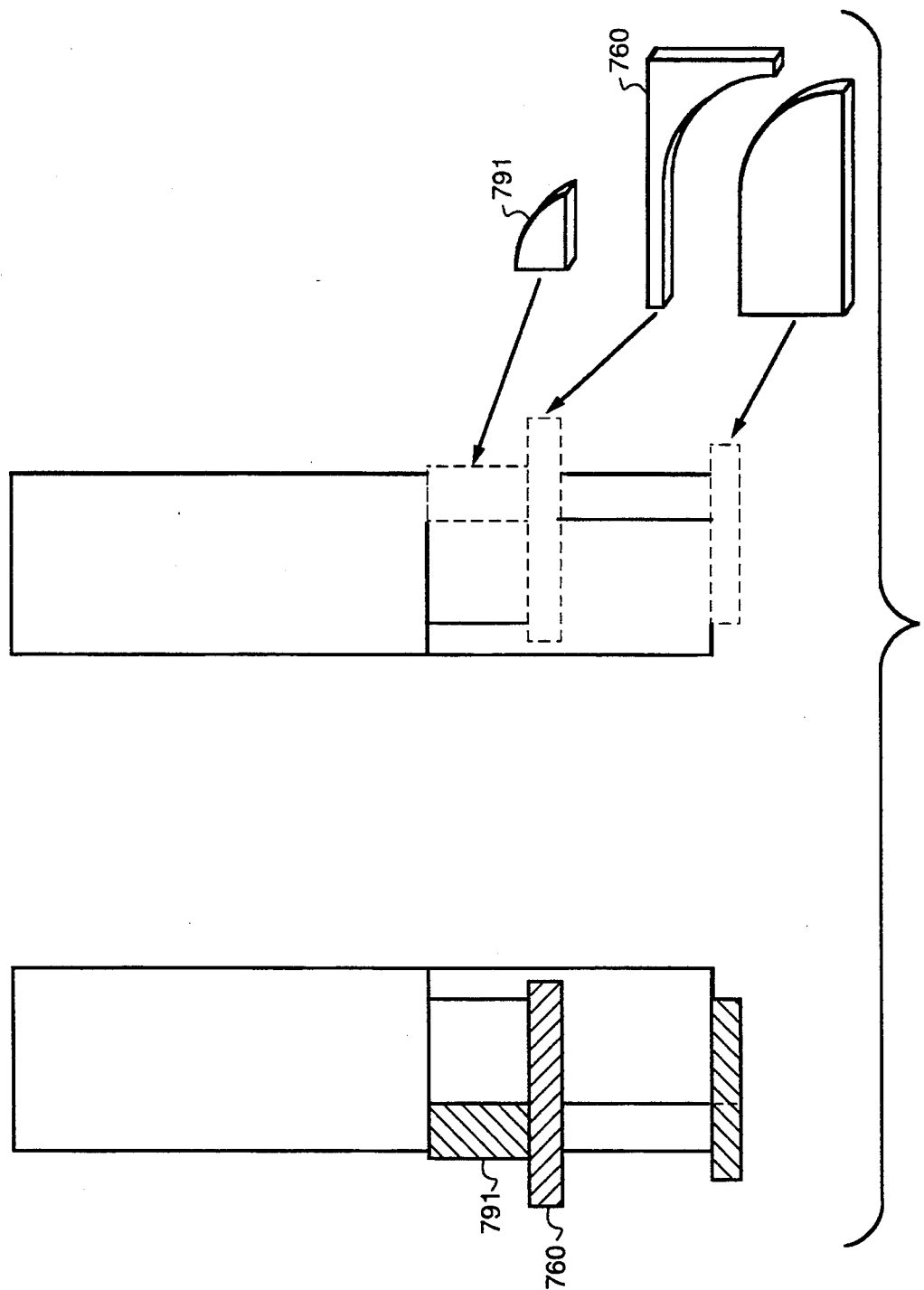
FIG. 18 is an exploded front view of the upper leg clamp assembly of FIG. 12.

Back cylinder 750 has rod 756, which is connected to slide 757, which is guided by keys 786. Pin 758 is connected to slide 757 and extends frontward and is connected at its opposite end to top jaw 759 on which clamping tool 760 is removably secured. As shown in FIG. 18, clamping tool 760 is generally L shaped, having a radially shaped inner surface. Tool 760 may be configured to match the dimensions of the bobbin 101 placed in the clamp. Thus, by forming a number of different sized tool 760 parts, upper clamp 531 may engage and clamp different sized bobbins. Cylinder rod 756 moves tool 760 up and down. When the bobbin is placed in the clamp, tool 760 is in the up position, and when the clamp closes, tool 760 is forced down on the upper arm 115 of the bobbin 101 to secure it in the clamp.

Adjustable pin 761 is connected to stop block 762, which has flange 763 disposed to engage plate 754 to stop relative movement between the upper and lower parts of clamp 531.

Referring to FIG. 5, lower bobbin leg clamp assembly 505 includes support frame 540 and drive shaft 542 which is driven by motor or hydraulic means (not shown) which are well known to those skilled in the art. Drive frame 542 is driven along axis "W" in support frame 540. Support frame 540 is pivotally connected to pivot 520, and support frame 540 may be pivoted about pivot 520 by hydraulic drive means, such as hydraulic drive shaft 544 or other suitable means which are well known to those skilled in the art. Position encoding means, not shown but known to those skilled in the art, are disposed to indicate the angular position of support frame 540 as it is rotated on pivot 520.

Drive frame 542 is provided with lower leg clamps 551 which are slidably interlocked by slot units 552 to tracks (not shown) on transverse drive assembly 554 which moves upper leg clamps along the "D" axis, which is transverse to the "W" axis of support frame 540. Transverse drive assembly 554 is secured to drive frame 542. Position encoding means, not shown but known to those skilled in the art, are disposed to indicate the position of transverse drive assembly along the "W" axis of support frame 542.

Transverse drive assembly includes a screw drive or other suitable means for moving clamps 551 to their desired position. In the embodiment shown, clamps 551 are moved independently and manually by turning drive handles 555 or 556. A position indicator (not shown) is disposed on the assembly to indicate the position of each of the clamps 551 on transverse drive assembly 554. That position is input into the control system of the invention. Alternatively, position encoding means may be used to automatically feed the position to the control means.

Figure 13:
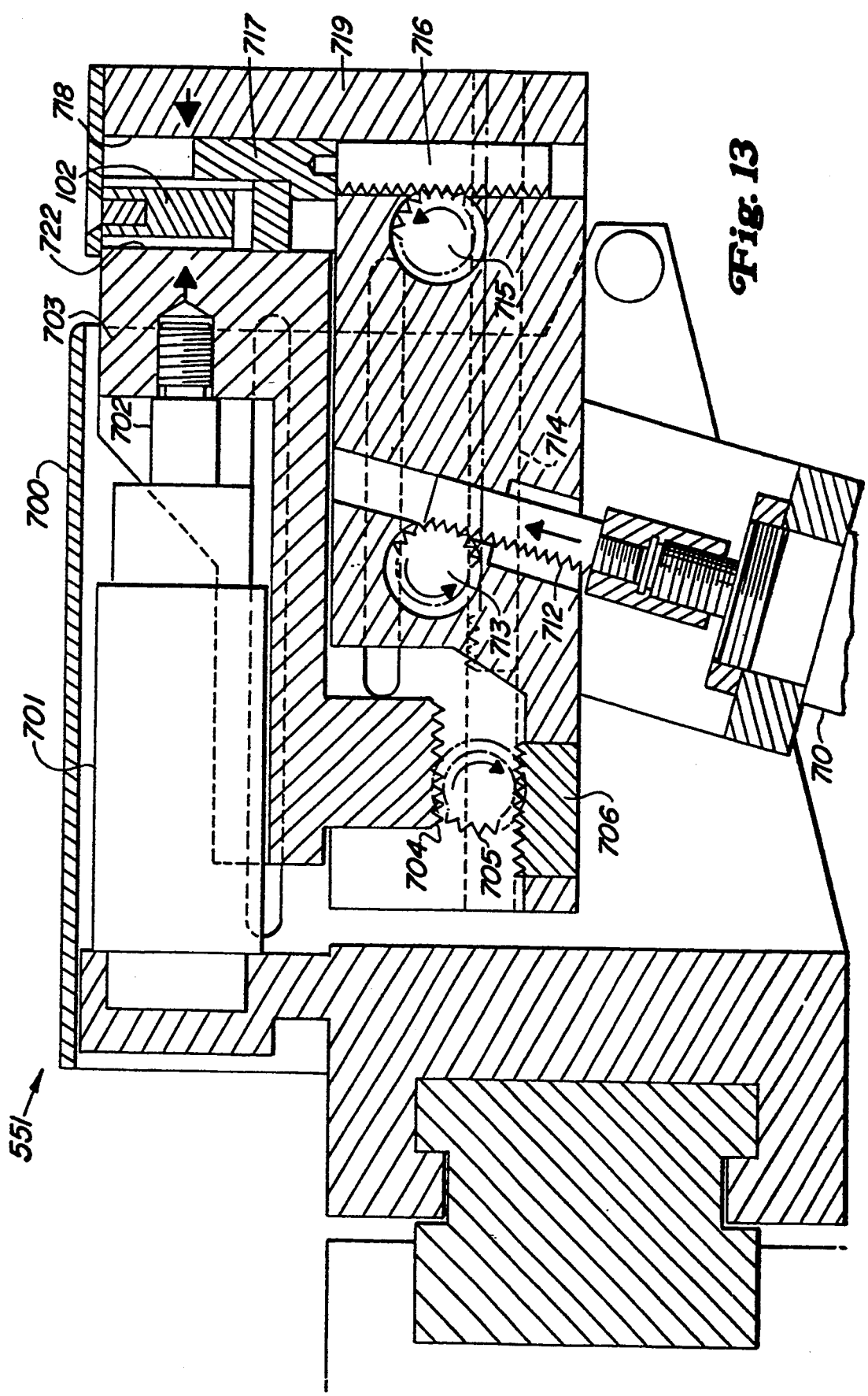
FIG. 13 is a cross sectional side view of lower leg clamp 551.

Lower leg clamps 551 are four sided clamps which are adapted to engage lower leg 102 of bobbin 101. FIG. 13 is a cross sectional side view of lower leg clamp 551 and associated parts. Lower leg clamps include chassis 700, which houses hydraulic cylinder 701 having cylinder rod or plunger 702 in driving connection with upper jaw 703. On the lower part of jaw 703 is a gear 704 that drives pinion 705. Pinion 705 is geared to lower jaw 706. Thus, when plunger 702 moves, upper and lower jaws move toward or away from each other.

Figure 14:
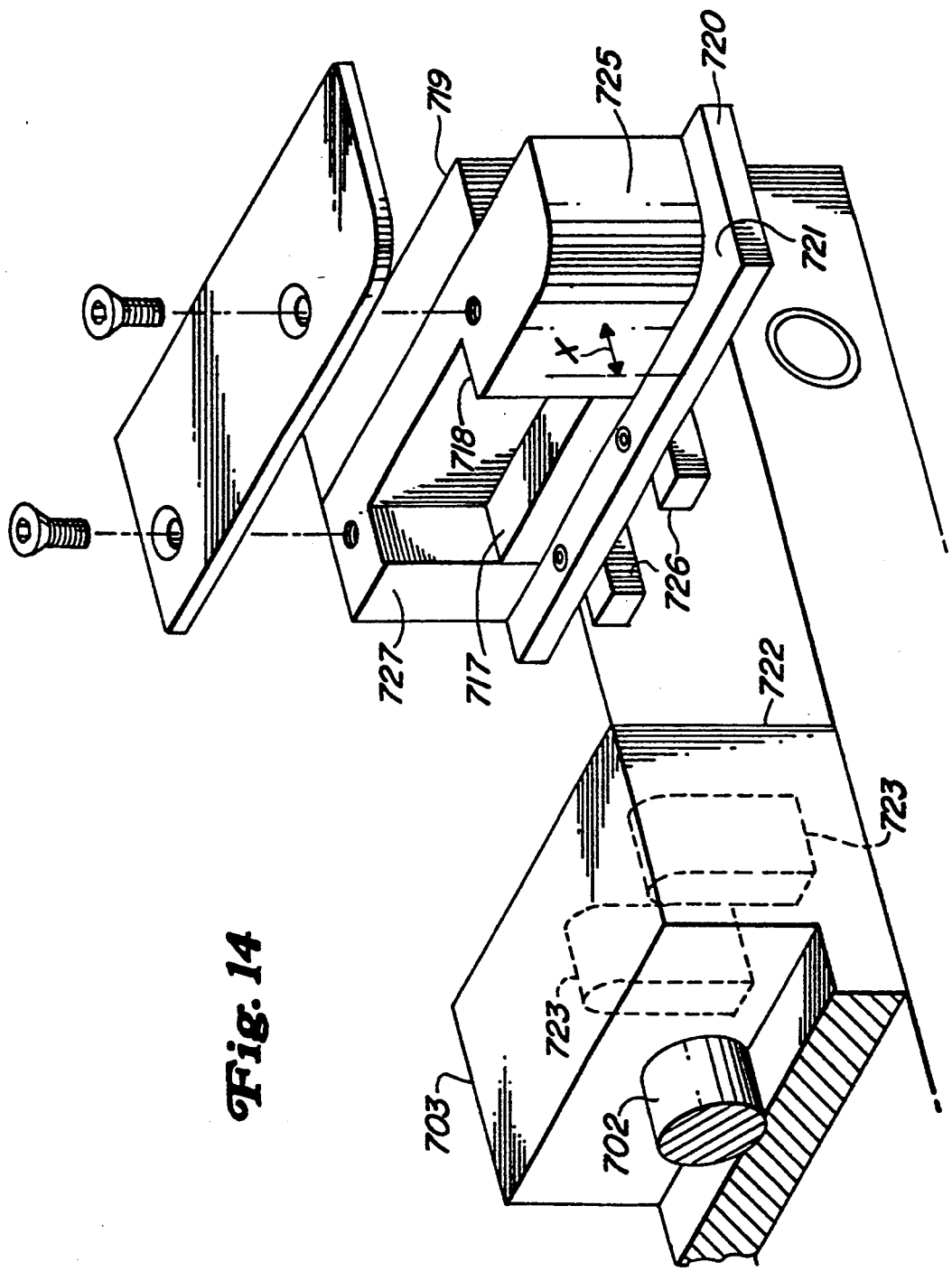
FIG. 14 is a partially exploded elevational view of lower leg clamp 551.

Hydraulic cylinder 710 is secured to the lower jaw 706 and moves with the lower jaw. Cylinder 710 has rod 711 connected to rack 712 which drives pinion 713. Pinion 713 drives rod 714 which in turn drives pinion 715 which drives rod 716 which drives movable front jaw 717 into position to secure the lower leg 102 of bobbin 101. As is shown in FIG. 14, sliding jaw 717 slides up and down in slot 718 defined by front jaw 719. The end of front jaw 719 at the side closest to the nearest nose is provided with cylindrically shaped radius block 725 which is adapted to form a radius on the lower bobbin leg near the closest nose to form the arms on the lower bobbin leg, as can be appreciated from FIGS. 1 and 2. When placed in the clamp, lower leg 102 of bobbin 101 sits the upper surface 721 of shelf 720, which is secured to guides 726 of jaw 717. The "x" dimension of shelf 720 as shown in FIG. 14 is slightly less than the thickness of the wire in the bobbin so that the front face 722 of upper jaw 703 clamps the bobbin against the opposing face 722 of jaw 719 when the clamp is closed. Front face 727 of jaw 703 is provided with slots 723 which receive guides 726. Shelf 721 and radius forming block 725 can be changed, depending on the dimensions of the bobbin and the desired dimensions of the stator coil formed by the apparatus 501.

Referring back to FIG. 5, lead end nose clamp assembly 506 includes tower frame 560 which is provided with tracks 561 and drive shaft means 562. Tower frame 560 includes a track riding unit 563 for moving tower frame along the "A" axis of the base drive screw 564 in the base drive housing. Track riding unit 563 is thus mounted in driving relationship on drive shaft means 564, which may be a screw or other suitable means known to those skilled in the art. Encoding means, not shown but known to those skilled in the art, are disposed in tower frame 560 to indicate its position on the "A" axis relative to pivot point 520.

Tower drive unit 570 is mounted in driving relationship with drive shaft means 562 and includes slot units 571 in locked sliding engagement with tracks 561. Tower drive unit 570 thus may be moved up and down tower frame 560 along the "Y" axis, which runs through drive shaft 562. Position encoding means, not shown but known to those skilled in the art, are disposed to indicate the position of tower drive unit 570 on tower frame 560.

Tower drive unit 570 also includes a rotational drive shaft 573 mounted generally transverse to drive shaft means 562 and mounted parallel to the axis through pivot 520. Lead end nose clamp housing 574 is rotationally mounted on rotational drive shaft 573. Lead end nose clamp housing 574 includes a hydraulic cylinder or other suitable means for opening and closing upper clamping head block 481 on lead end nose clamp 400. Position encoding means, not shown but known to those skilled in the art, are disposed to indicate the angular degree to which lead end nose clamp housing assembly is rotated.

Figure 7:
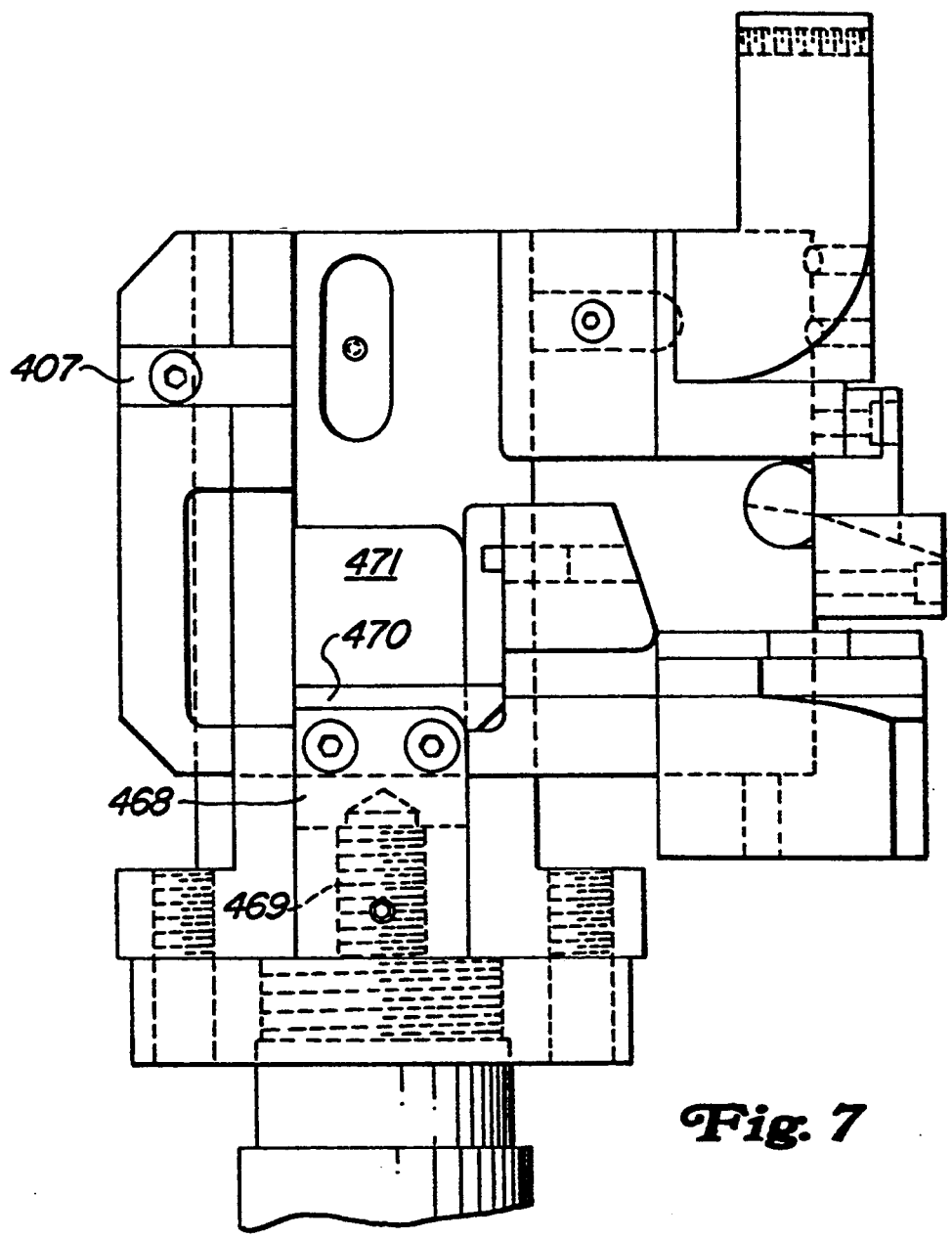
FIG. 7 is a front view of the back section of the head block of the lead end nose clamp showing the cylinder rod in the retracted position and also showing how the leads of the bobbin are bent by the removable tools used in that clamp.
Figure 8:
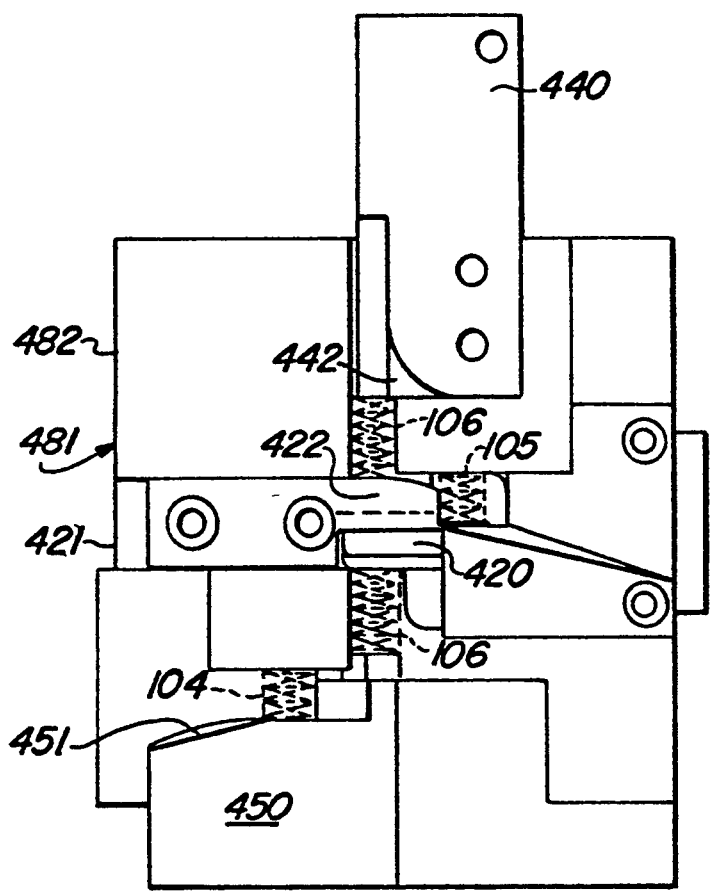
FIG. 8 is a side view of the back and front section of the head block of the lead end nose clamp in a closed position.
Figures 6, 17:
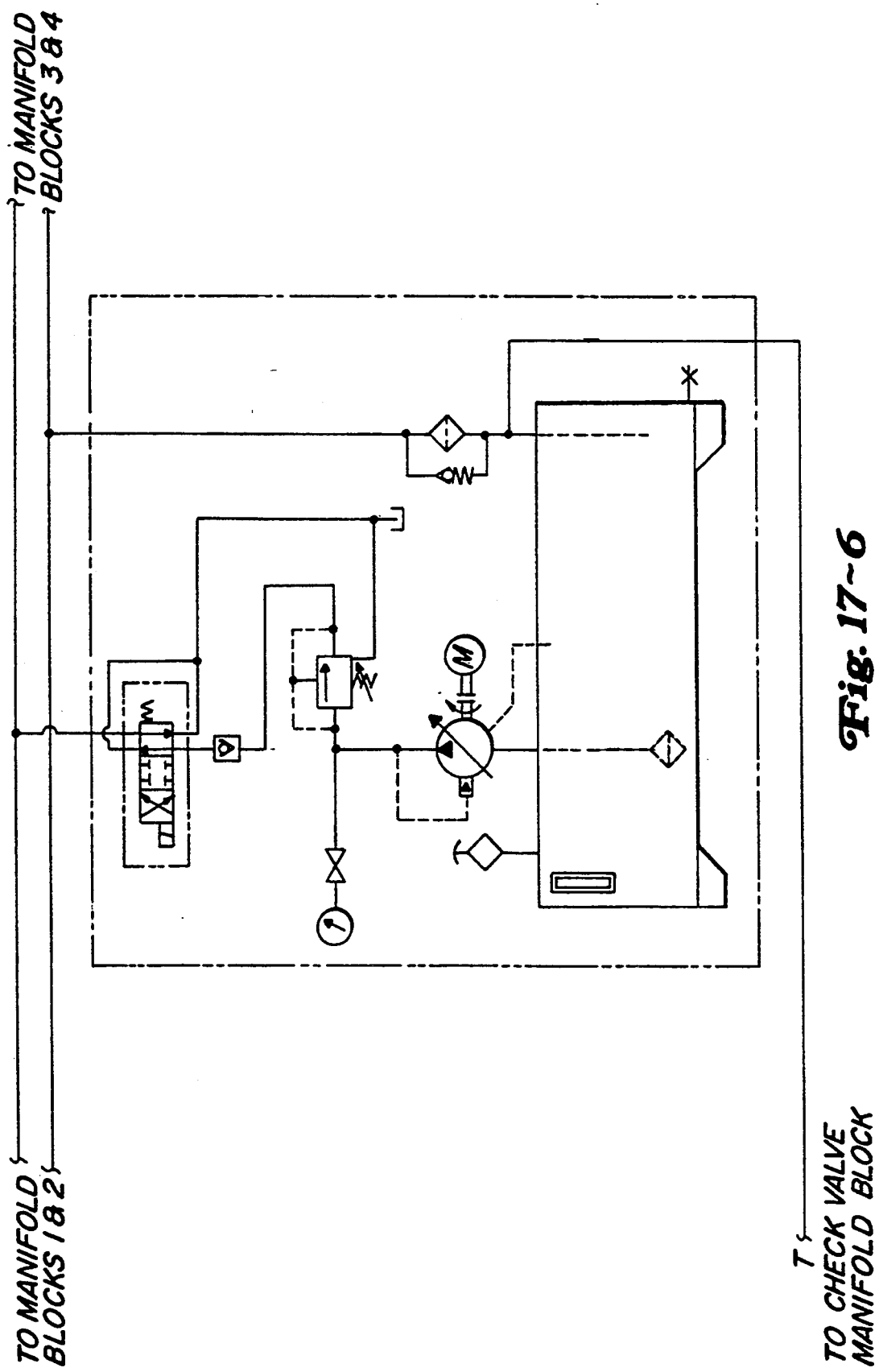

As shown in FIGS. 6–8, Lead end nose clamp 400 constitutes means for clamping the lead end nose 106 and associated lower lead 104 and upper lead 104 and for providing the desired angular turn to the lead end nose and the desired configuration of the leads. Lead end nose clamp 400 is thus used to form the lead end of the coil, and to configure the leads. Lead end nose clamp 400 includes back head block 401, and front clamping head block 481 (shown in FIG. 10) which clamps onto back head block 401 to hold the bobbin 101 in place during coil forming operation, and slide block 402, which is used to configure the leads of the bobbin.

As is shown in FIG. 6, back head block 401 includes slide block slot 403, which is adapted to receive slide block 402 in sliding arrangement therewith. Slide block 402 may be moved up and down in slide block slot 403 by a hydraulic cylinder 404 or other suitable means. Back head block 401 and slide block 402 are each provided with stop block slots 405 and 406 which are configured to receive stop block 407, which may be inserted into slots 405 and 406 and secured by a screw 408 or other suitable means to prevent slide block 402 from moving in slot 403.

Back head block 401 is provided with slot 410 for receiving lower lead 104 and is also provided with slot 411 for receiving upper lead 105. A clearance cavity defined by wall 412 is provided opposite slots 410 and 411 to provide sufficient space so that leads 104 and 105 do not strike wall 412 during the coil forming operation of apparatus 501.

Shelf 414 is provided proximate and upward of slot 410 to receive lead end nose 106. Depending on the dimensions of the bobbin, removable shelf 415 may be secured to the surface of shelf 414.

Figure 10:
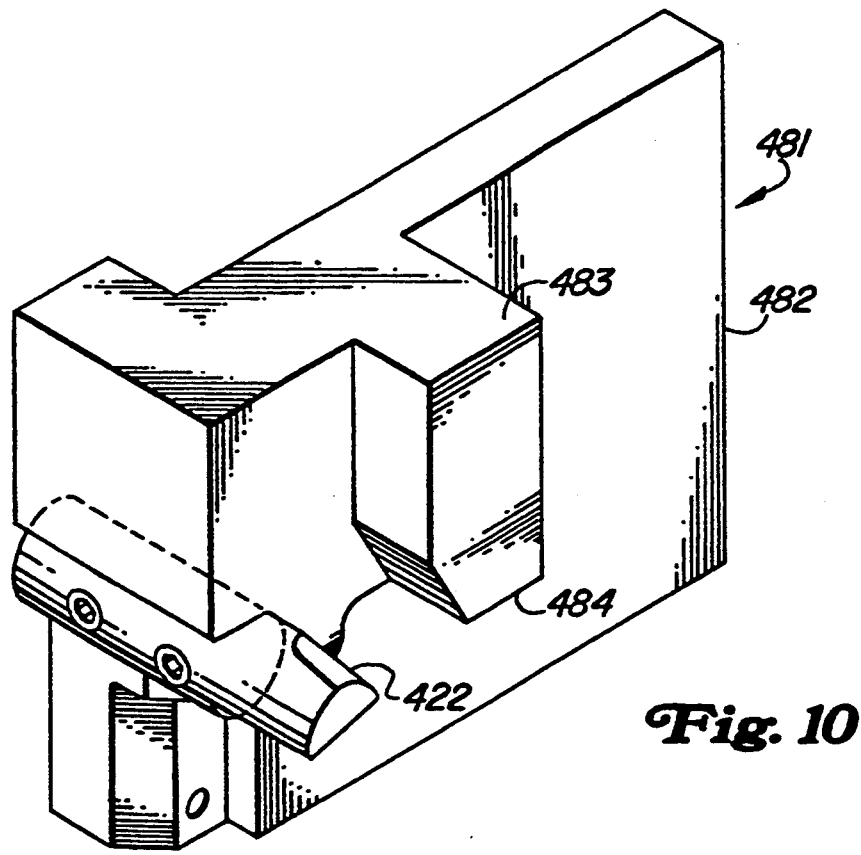
FIG. 10 is a view of the front clamping head block of the lead end nose clamp.
Figure 9:
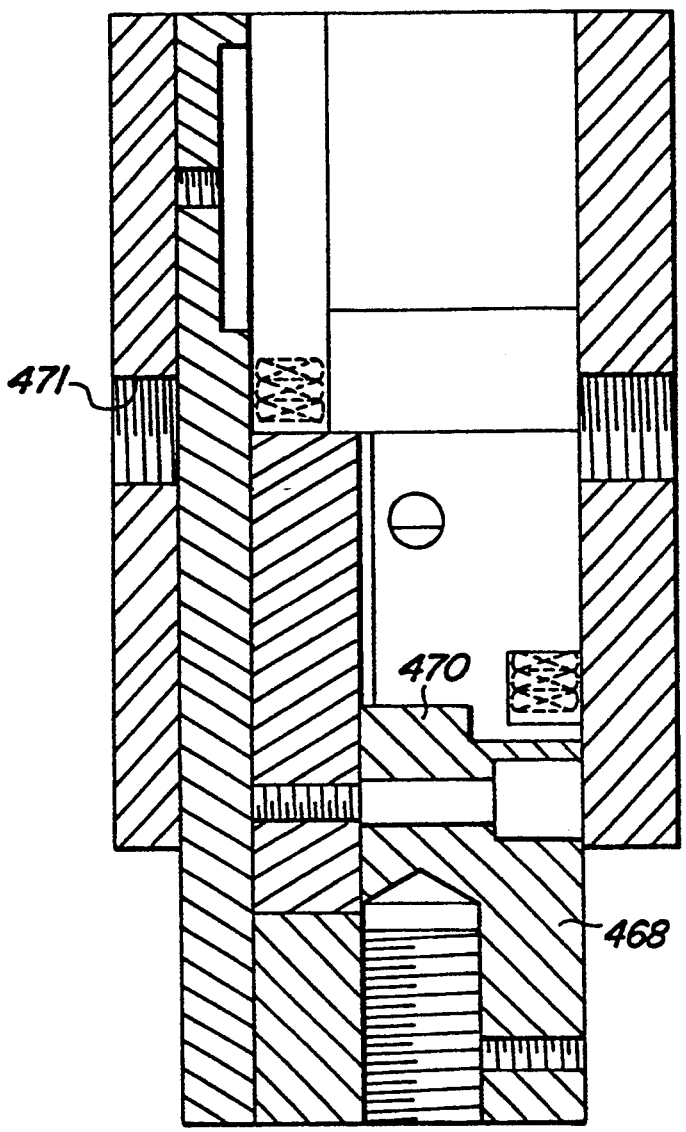
FIG. 9 is a sectional view of FIG. 6 taken along line X—X.

Lower half pin 420 of pin 421 is secured to block 401 upward of shelf 414 and removable shelf 415 a sufficient distance to provide room for the inner radius 120 of lead nose 106 to be placed around lower half pin 420 when the bobbin is initially placed in head block 400. Upper half pin 422 is secured to front clamping head block 481 as shown in FIG. 10 and mates with lower half pin 420 to form pin 421 when forming head clamp 400 is closed as shown in FIG. 8. The ends of lower half pin 420 and upper half pin 422 are rounded an amount sufficient to permit upper half pin 422 to slide into engagement with lower half pin 420 generally adjacent the inner radius 120 of lead end nose 106 without damaging the insulation of the copper wire or damaging the copper wire in the lead nose end of in bobbin 101.

Block 430 is secured to block 401 upward from lower half pin 421. The bottom portion 431 of block 401 partially defines slot 411. The side portion 432 of block 430 is generally cylindrical in shape and defines an opening when clamping block 481 is closed on block 401 for the nose end to be disposed about pin 421. The generally cylindrical shape side portion 432 provides a curved surface which aids in avoiding damage to the lead end nose 106 during coil forming operation.

Block 440 is movably mounted on the side portion 432 of block 430. Block 440 has arcuate wedge 441 extending outward from generally rounded surface 442. The arcuate wedge 441 and rounded surface contact the lead end nose 106 during coil forming operation and because of their respective configurations, do not damage the copper wire or insulation in the lead end nose 106. Block 440 may be moved up or down to accommodate bobbins having different dimensions.

Block 444 is secured to block 401 so that surface 445 is equiplanar with the surface of upper lead receiving slot 411. Surface 445 is provided with a generally curved downward slope. Surface 446, which is generally cylindrical in shape, extends upward from surface 445. Combined, surfaces 445 and 446 contact inner nose radius 106 and nose end arms 116 of bobbin 101 during coil forming operation, and the curved nature of their surfaces prevents damage to the wire or insulation of the bobbin.

Block 452 defines the upper edge of slot 410. Block 452 is secured to block 401 and may be interchanged with other similarly shaped blocks to alter the dimensions of slot 410 in accordance with the dimensions of the bobbin. Block 450 defines the lower edge of slot 410. Upper surface 451 of block 450 which defines slot 410 is widest at the end farthest from slide block slot 403, and that end is rounded and somewhat downwardly curved at the end furthest from slot 411. Upper surface 451 gradually narrows in an arcuate manner so that the narrowest part is the part closest to the slide block slot 403.

Slide block 402 is adapted to slide in slide block slot 403. Slide block 402 includes back wall 460. Side wall 461 projects at right angles from back wall 460 and is spaced from one side to define a lip 462 that fits in sliding engagement with slot 463 in block 401. The outer edge of wall 461 is configured to define a clearance cavity for the leads of the bobbin in conjunction with wall 412 of back head block 401 when slide block 402 is in its upper most position in back head block 401.

Slide block 402 also includes base plate 464, which is adapted to be secured to cylinder head 465. Flange 466 of block 401 is disposed perpendicular to base plate 464 and is adapted to butt against flange 466 of back head block 401 to stop upward movement of the slide block. Slide block 402 further includes means for securing additional tools, such as screw hole 467, for the purposes discussed below.

As mentioned above, cylinder 404 has base plate 465 secured to cylinder 404. Base plate 465 is also secured to base plate 464 of slide block 402, so that when cylinder 404 moves, it causes slide block 402 to move. Block 468 is secured to cylinder rod 469. Block 470 is secured to the back of block 468, and projects slightly upward of block 468. Optional back block 471 may be secured behind block 470. Cylinder rod 469 may advance blocks 468, 470 and 471 upward with respect to cylinder 404 and the attached slide block 402. Cylinder 404 is free floating, so when cylinder rod 469 is activated, it exerts a force on cylinder 404 and causes it and the slide block 402 attached to it to move in the opposite direction. Flange 472 of cylinder rod block 470 is adapted to restrict the downward movement of slide block 402 by striking flange 466 of block 401.

Front clamping head block 481 includes a cover plate 482, lead guide block 483 which is adapted so that its lower side 484 define the upper side of a portion of slot 411 when upper clamping head block closes on back head block 401. Half pin 422 is secured to cover plate 482 in such a manner that when clamping head block closes on back head block 401, half pin 422 mates with half pin 420 to form pin 421. The end of half pin 422 is rounded so that if half pin 422 touches inner nose radius 120 of inner lead end nose 106, the copper wire will slide off of the head of half pin 422 and neither the copper wire nor the insulation on the wire in that part of the bobbin will suffer any damage. Portion 485 of the end of cover plate 482 proximate to half pin 422 is generally cylindrically shaped so that the arm of the bobbin wire in proximity thereto during coil forming operation will not suffer any damage.

One example of how the leads can be bent to their desired shape can be appreciated from a comparison of FIGS. 6, 7 and 8. FIG. 7 shows the position of tools 468, 470 and 471 when cylinder rod 469 is in a retracted position. FIGS. 6 and 8 show the position of the same tools when cylinder rod 469 is in an extended position. When stop block 407 is inserted into slots 405 and 406, slide block 402 cannot move. When cylinder rod 469 is activated, it drives tools 468, 470 and 471 upward, and those tools bend lead wires 104 and 105 which are maintained in position in slots 410 and 411 and which project into the cavity into which tools 468, 470 and 471 are driven.

Referring back to FIG. 5, opposite lead end nose clamp assembly 507 includes tower frame 580 which is provided with tracks 581 and drive shaft means 582. Tower frame 580 includes a track riding unit 583 which is mounted in driving relationship on drive shaft means 584, which may be a screw or other suitable means known to those skilled in the art, and which is used to move tower frame toward or away from pivot point 520, depending on the dimensions of the bobbin. Encoding means, not shown but known to those skilled in the art, are disposed in tower frame 580 to indicate its position relative to pivot point 520.

Tower drive unit 590 is mounted in driving relationship with drive shaft means 582 and includes slot units 591 in locked sliding engagement with tracks 581. Tower drive unit 590 thus may be moved up and down tower frame 580 along the "X" axis, which runs through drive shaft 582. Position encoding means, not shown but known to those skilled in the art, are disposed to indicate the position of tower drive unit 590 on tower frame 580.

Tower drive unit 590 also includes a rotational drive shaft 593 mounted generally transverse to drive shaft means 582 and mounted parallel to the axis through pivot 520. Opposite lead end nose clamp housing 594 is rotationally mounted on rotational drive shaft 593. Lead end nose clamp housing 594 includes a hydraulic cylinder 595 or other suitable means for opening and closing upper clamping head block 601 on opposite lead end nose clamp 600. Position encoding means, not shown but known to those skilled in the art, are disposed to indicate the angular degree to which opposite lead end nose clamp housing assembly is rotated.

Figure 11:
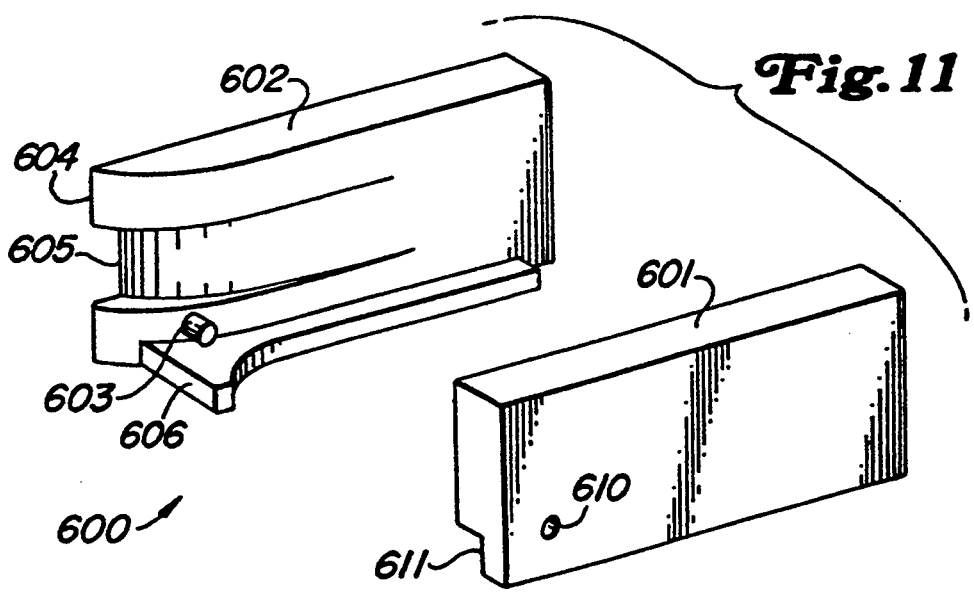
FIG. 11 is an elevational view of the opposite lead end clamp.

As is shown in FIG. 11, opposite lead end clamp 600 includes upper plate 601 and lower plate 602. Lower plate 602 includes pin 603 which is rounded at its end. Lower plate 602 has a generally cylindrical surface 604 at the end that is disposed closest to pivot 520, and has a cutout 605 to define a cavity into which arm 117 of bobbin 101 may fit when bobbin 101 is placed in the clamp. Shelf 606 is disposed underneath and spaced from pin 603 and provides a shelf on which arm 112 of bobbin 101 may rest when bobbin 101 is placed in the clamp. Upper plate 601 has a hole 610 adapted to receive pin 603 and has a cutout 611 adapted to define a space in conjunction with lower plate 602 in which arm 112 rests when bobbin 101 is placed in the clamp.

When the coil forming apparatus of this invention is operated, all clamps are open so that the bobbin may be properly placed in the clamps. As is described below, bobbin dimensions are provided to a control system, and the control system activates the means that turn drive shafts 564 and 584 which move tower frames 560 and 580, and therefore lead end clamp 400 and opposite lead end clamp 600 are moved into position so that opposite lead end nose 107 is placed in opposite nose end clamp 600 such that inner radius 121 of opposite lead end nose is placed snugly adjacent pin 603 and lead end nose 106 may be placed over lower half pin 120 and the leads set in slots 410 and 411. Straight length portion 115 of upper leg 103 of bobbin 101 is placed in upper leg clamps 531 which are disposed so that the rear face of each clamp 531 holds the outer edge of straight length portion 115 and the radius forming block 791 (FIGS. 12b and 18) is positioned to form the radii in the coil between the straight edge portion 115 and the nose end arms 116 and 117. Similarly, straight length portion 110 of lower leg 102 of bobbin 101 is placed in lower leg clamps 551 which are disposed so that the straight face 722 of each clamp 551 holds the outer edge of straight length portion 110 and the radius forming block 725 is positioned to form the radii in the coil between the straight edge portion and the nose end arms 111 and 112.

As is mentioned above upper and lower leg clamps 531 and 551 are equipped with radius forming blocks, which create the radii at the end of each straight end portion of each leg.

To spread the bobbin to form the coil, tower frame 510 which contains the upper clamp assembly, is pivoted outward to a prescribed angle about pivot 520, and tower frame 540, which contains the lower clamp assembly, is pivoted in the opposite direction to a prescribed angle about pivot 520. Thus, the bobbin legs are spread apart and are turned at the angle to which the tower frames are rotated. Pivot point 520 is located at the same distance from the bobbin legs in the clamps as the distance from the slots in the stator core in which the coil will be place is from the center of the stator core. Thus, the legs of the coil are positioned by the apparatus so as to fit exactly in the stator core.

As mentioned above, the lead end clamp 400 and opposite lead end clamp 600 hold the lead end nose and the opposite lead end nose. The assemblies which hold those clamps are allowed to free float during the operation which spreads the legs of the bobbin, except that about 15 pounds of pressure is applied by hydraulic means in an outward direction along axis "A" (shown in FIG. 5). Thus, when the legs of the bobbins are spread, lead end clamp 400 and opposite lead end clamp 600 are pulled toward the pivot point 520 of apparatus 501. When the legs of the bobbin are spread to the prescribed distance, nose end clamps 400 and 600 are rotated by drives 573 and 593 to give the noses the prescribed angle. In addition, if it is desired to raise either nose, either assembly 570 or assembly 590 may be moved upward by drives 562 or 582.

Figure 5A:
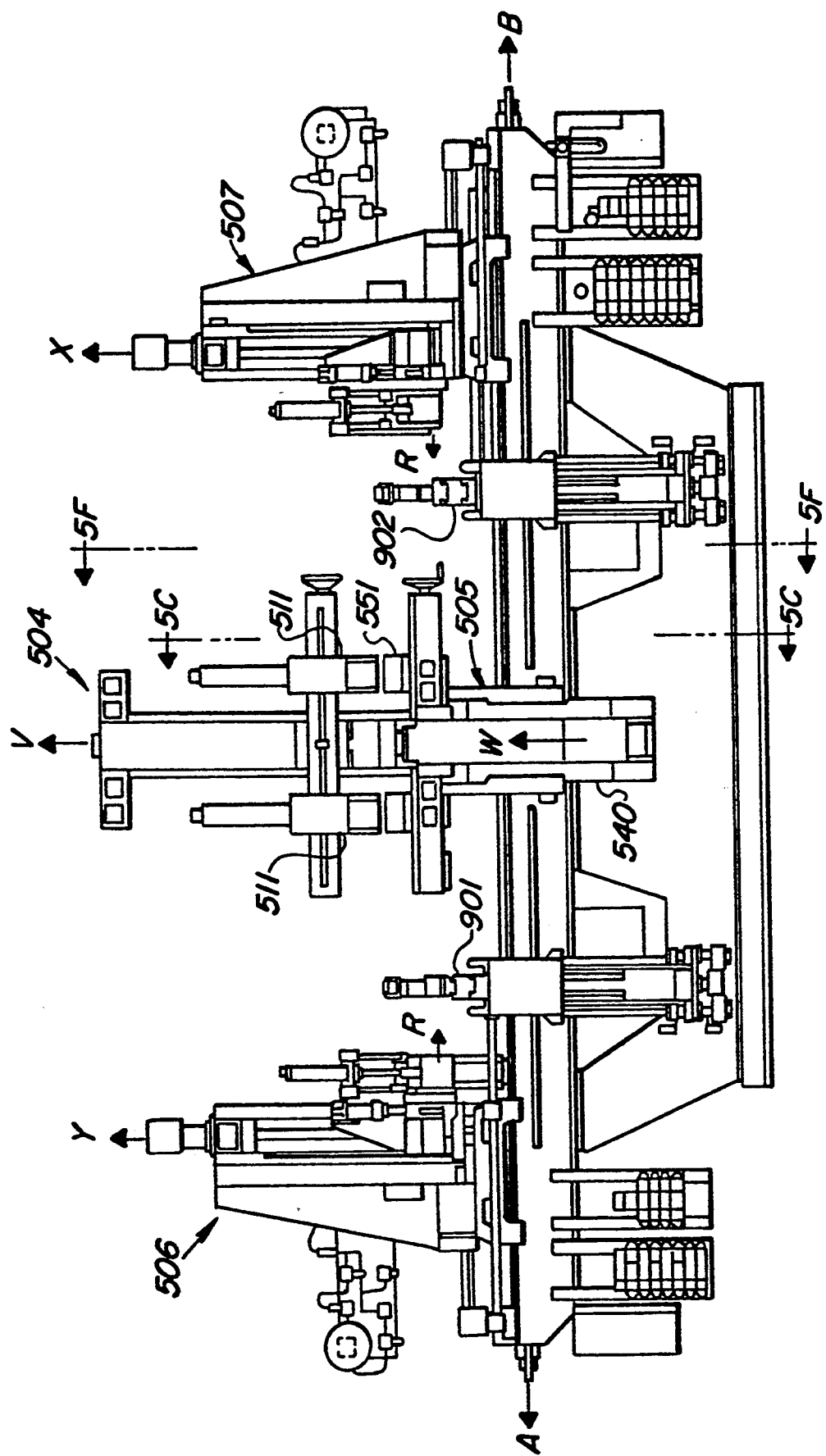
FIG. 5A is a front view showing the major components of another embodiment of an apparatus for the present invention.
Figure 5C:
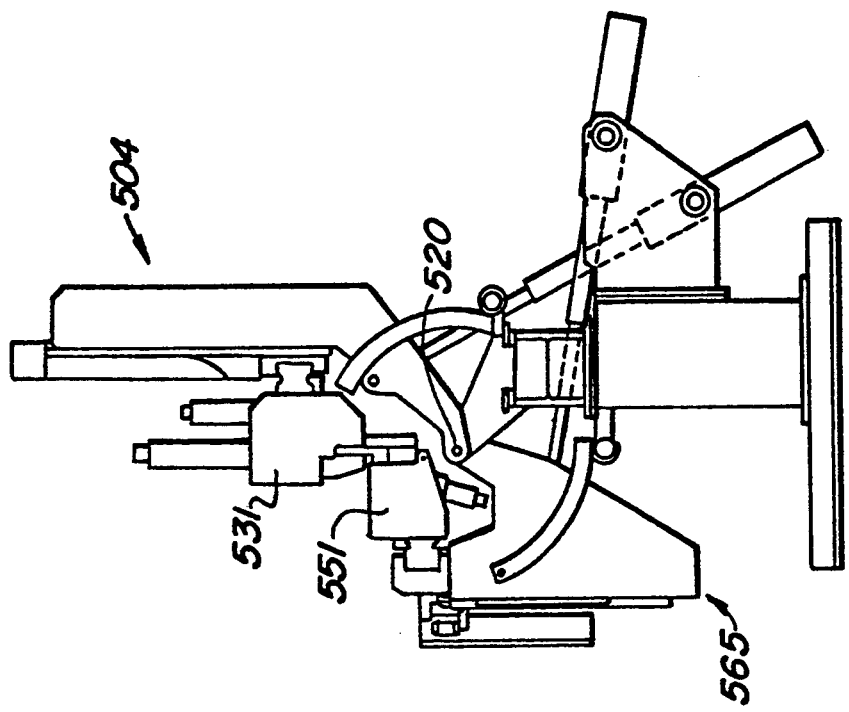
FIG. 5C is a side view through line A—A of FIG. 5A.
Figure 5B:
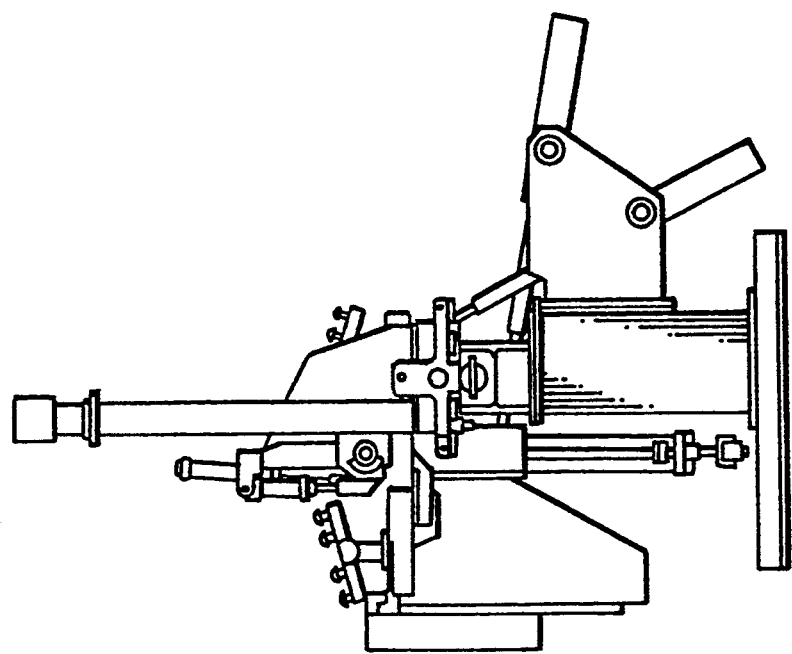
FIG. 5B is a side view of some of the components of the apparatus in FIG. 5A through line F—F.
Figure 15:
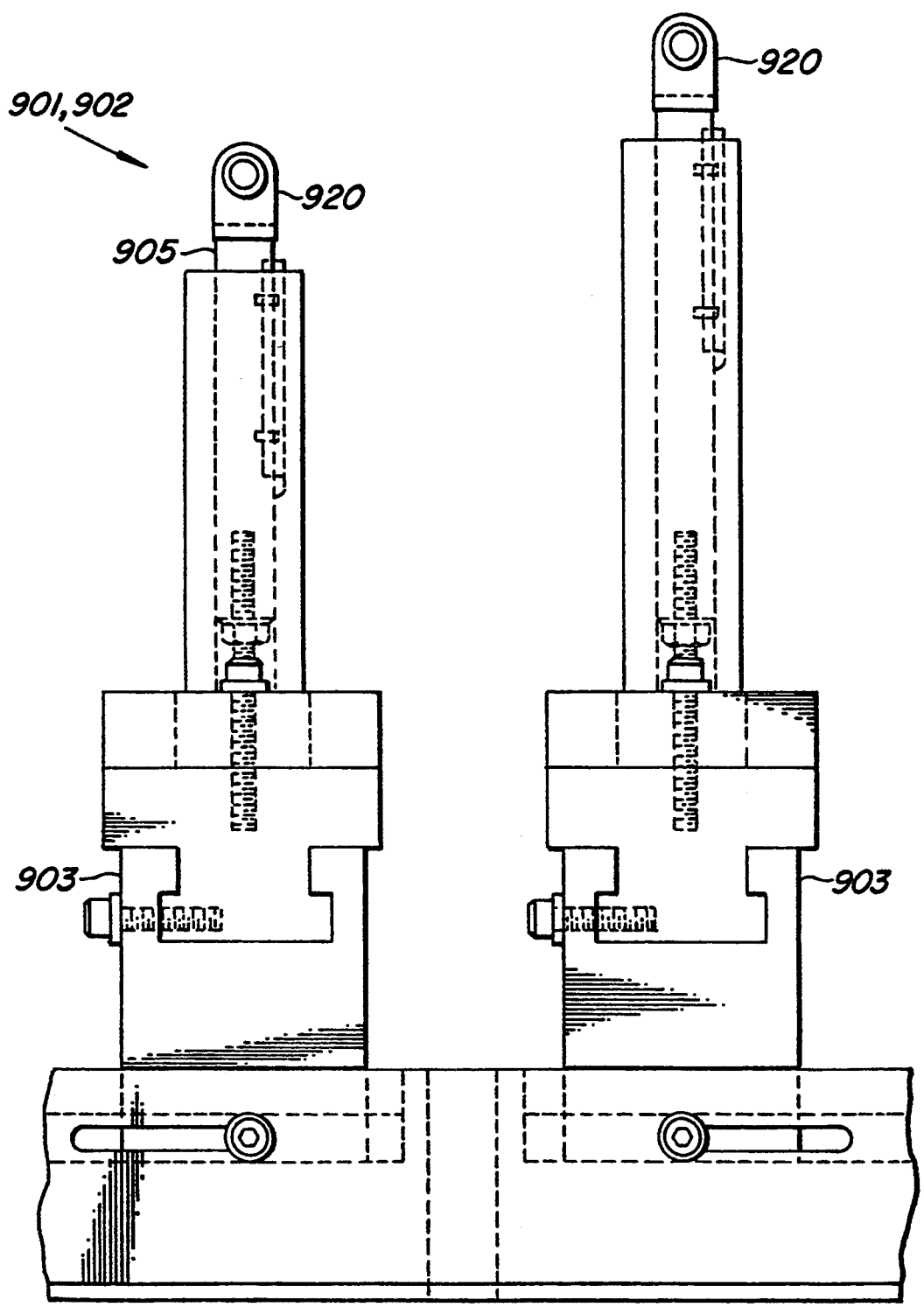
FIG. 15 is a front view of the arc formers for the nose end arms of the bobbin.
Figure 16:
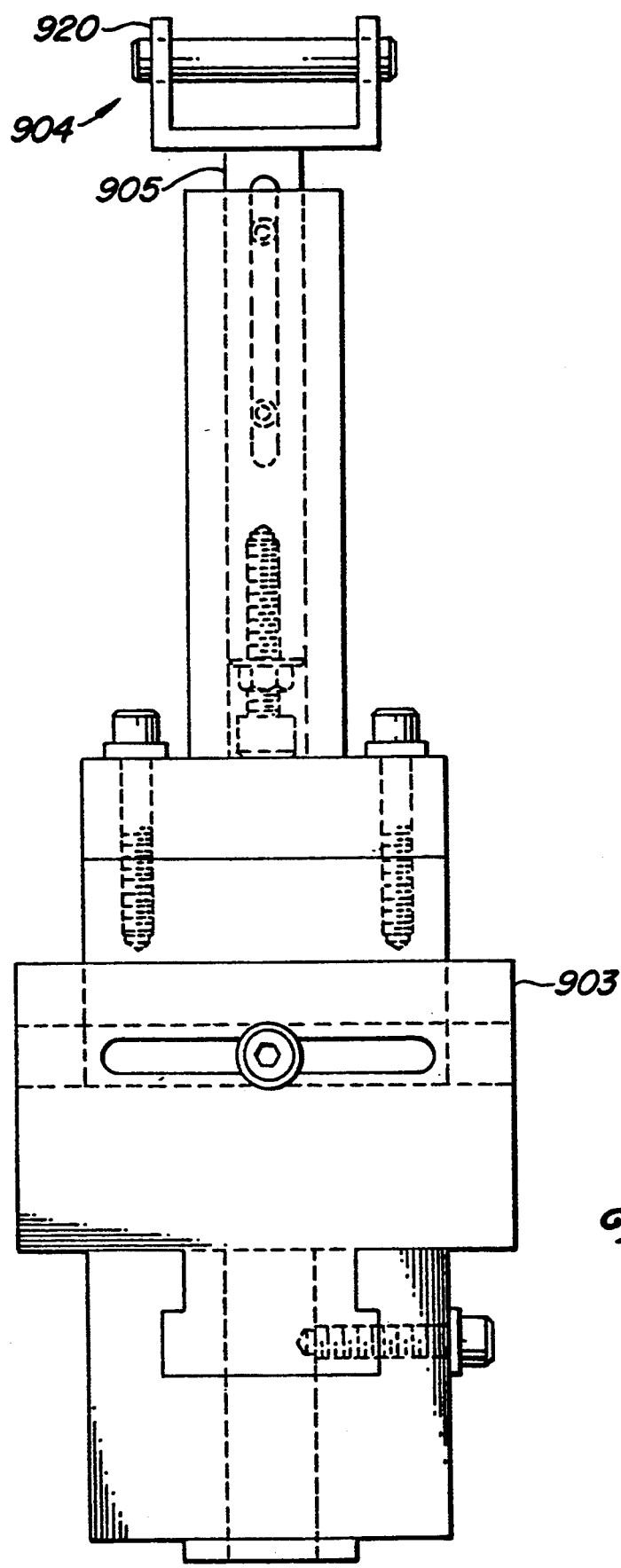
FIG. 16 is a side view of the arc formers for the nose end arms of the bobbin.

Finally, arc formers 901 and 902 shown diagrammatically in FIGS. 5 and shown in more detail in FIG. 5A and FIGS. 15 and 16, engage the arms of the bobbin and provide them with the desired radius. Visual position indication means or automated position encoding means, not shown but known to those skilled in the art, are disposed to indicate the position of the arc formers along the "A" and "B" axis. As is shown in FIGS. 15 and 16, arc formers 901 and 902 each consist of means 903 for engaging the tracks along the "A" and "B" axis shown in FIG. 5 for moving the arc formers along axis "A" and axis "B". It further consists of nose arm engaging means 904 for engaging the nose end arms. Each nose engaging means includes a cradle 920 mounted so that the surface of the cradle may engage with the nose arm. Rod 905 is engaged with suitable driving means, such as hydraulic means, for extending cradle 920 into a holding relationship with the nose arm and for bending the nose arm to the prescribed radius. Each arc former is positioned so that it engages its respective nose arm in a position to create a radius of the desired shape and configuration, as may be appreciated by those skilled in the art.

FIGS. 2–4 aid in understanding the operations of the apparatus described above. Each of upper leg clamps 531 and lower leg clamps 551, which spread legs 102 and 103, has a straight portion which is secured at the ends 110A and 110B and 115A and 115B of the straight end portions of the lower and upper legs 102 and 103 of the bobbin. Each of those clamps also has a radius forming portion which is positioned to form radii 130, 131, 132 and 133 when the legs are spread apart. Also, after the legs are spread to their predetermined position, arc formers engage coil nose arms 134, 135, 136 and 137 to form arcs 138 and 139, as can be seen by FIG. 4, which is an end view of the coil.

Lead nose end clamp 400 also forms outer nose radii 144 and 145 at the nose ends of nose end arms 134 and 135 and forms outer nose radii 146 and 147 of leads 105 and 104.

FIG. 3 shows the "drop" (the degree to which the arms are bent away from the stator core) which is formed after the legs are spread to their predetermined position by raising at least one nose end. The nose ends may be raised by raising lead nose end clamp 400 and/or opposite lead nose end clamp 600 (see FIG. 5). The nose end clamps also provide angular rotations 141 and 142 of nose ends 106 and 107 of the coil.

Thus, the apparatus of this invention can convert a bobbin to a finished formed stator coil in about 45 seconds.

The various means for moving the clamps in apparatus 501 may be powered by any suitable means. FIGS. 17-1 through 17-6 disclose one suitable hydraulic system which may be used, as will be understood by those skilled in the art. That system may be controlled by any suitable automatic control system. One suitable control system is a Mark Century 2000 Computer Numerical Control manufactured by the General Electric Company, which is a standard computer system for industrial applications. It may be programmed by those skilled in the art to control the movements of the clamps in the desired manner. One such program is attached to this specification as Appendix A.

As shown in FIG. 17-1, the encoders provide position feedback to the Mark Century 2000 Control, which provides commands to operate the valves in the hydraulic system.

APPENDIX A

```
PACKAGE fstmcl IS    -- start of package specification

PROCEDURE fast_mcl;

END fstmcl;    -- end of package specification

WITH wndone;    USE wndone;
WITH mcldat;    USE mcldat;
WITH wndtre;    USE wndtre;
WITH oemain;    USE oemain;

PACKAGE BODY fstmcl IS    -- start of package body

PROCEDURE fast_mcl IS

BEGIN

FOR index IN 1..actual_axes
       LOOP
          IF ldin(ref_lim_sw_off(index)) XOR open_on_ref_sw
             THEN    -- contact is closed
             IF (NOT old_ref_state(index))
                THEN    -- it wasn't last time
                   on_ref_switch(index);    -- tell axis manager
                   old_ref_state(index) := true;    -- and remember
                END IF;
          ELSIF old_ref_state(index)
             THEN
                old_ref_state(index) := false;
             END IF;
    ND LOOP;

--                oem's may add fast mcl code here
--

END fast_mcl;    -- procedure fast_mcl

END fstmcl;    -- end of package body
```

-- maxi package specification

PACKAGE maxi IS   -- start of maxi package specification

CLAMP_A : integer := 0;
CLAMP_B : integer := 0;

PROCEDURE maxi_init;    -- machine function initialization procedure

PROCEDURE maxi_clear;   -- machine function clear procedure

PROCEDURE maxi_cancel;  -- machine function cancel procedure

PROCEDURE maxi_main;    -- machine function logic procedure

END maxi;   -- end of maxi package specification

-- package body maxi

WITH wndone;    USE wndone;
WITH mcldat;    USE mcldat;
WITH mcllib;    USE mcllib;
WITH oemdec;    USE oemdec;
WITH wndtwo;    USE wndtwo;
WITH wndtre;    USE wndtre;
WITH wndmth;    USE wndmth;
WITH oemmst;    USE oemmst;

PACKAGE BODY maxi IS  -- start of maxi package body
upper_clamp_msg,lower_clamp_msg : boolean := false;
FORM_TIM_STARTED,FORM_ERR_TIMER,FORM_ERR_MSG,
UPPER_CLAMPED,LOWER_CLAMPED,HYD_FAULT_MSG : BOOLEAN := FALSE;
LFT_SHUT,RT_SHUT : INTEGER := 0;
FORMS_IN_POS,MAN_MODE_ENA,START_A : BOOLEAN := FALSE;
m_dly : boolean := false;

---------------------------------------------------------------

PROCEDURE maxi_init IS  -- start of maxi_init
BEGIN
MAXI_CLEAR;

END maxi_init;  -- end of maxi_init

---------------------------------------------------------------

PROCEDURE maxi_clear IS

BEGIN
if ldin(lft_form_up_ot) and ldin(rt_form_up_ot) then m_18 := true;end if;
if ldin(lft_form_dn_ot) and ldin(rt_form_dn_ot) then m_19 := true;end if;
hyd_fault_msg := false;
form_tim_started := false;
form_err_timer := false;
form_err_msg := false;
m_10 := false;
m_10_11_pre_req := false;
m_11 := false;
m_12 := false;
m_12_13_pre_req := false;
m_13 := false;
m_14 := false;
m_14_15_pre_req := false;
m_15 := true;
m_16 := false;
m_16_17_pre_req := false;
m_17 := TRUE;
m_18_19_pre_req := false;
M_18 := FALSE;
M_19 := FALSE;

m_25 := false;
m_26 := false;

LOWER_CLAMP_MSG := FALSE;
UPPER_CLAMP_MSG := FALSE;

END maxi_clear;

```
PROCEDURE maxi_cancel IS

BEGIN

NULL;

END maxi_cancel;

----------------------------------------------------------------------

PROCEDURE maxi_main IS

BEGIN

--*********************************************************************
--*                      MAIN HYDROLICS LOGIC                          *
--*********************************************************************

IF NC_STATUS(SERVO_STOP_ACTV) THEN LDOUT(HYD_MOT_STARTER) := FALSE;
ELSE LDOUT(HYD_MOT_STARTER) := TRUE;
END IF;

--*********************************************************************
--*            CLAMP   LOGIC    J. GUERREIN  2-20-89                   *
--*********************************************************************

CASE CLAMP_A IS

WHEN 0 =>
                IF ((man_mode_ena and ldin(cls_upper_clamps)
                    and not upper_clamped)) or m_25 THEN
                    ldout(uhz_jk_cl_lp_sol) := true;
                    ldout(uhz_jk_cl_hp_sol) := false;
                    ldout(uhz_jk_op_hp_sol) := false;
                    ldout(uvt_jk_cl_lp_sol) := false;
                    ldout(uvt_jk_cl_hp_sol) := false;
                    ldout(uvt_jk_op_hp_sol) := false;
                    m_25 := false;
                    CLAMP_A := CLAMP_A + 1;
                ELSIF (MAN_MODE_ENA AND LDIN(OPN_UPPER_CLAMPS)) OR
                        M_20 THEN
                    M_20 := FALSE;
                    ldout(uhz_jk_cl_lp_sol) := false;
                    ldout(uhz_jk_cl_hp_sol) := false;
                    ldout(uhz_jk_op_hp_sol) := true;
                    ldout(uvt_jk_cl_lp_sol) := false;
                    ldout(uvt_jk_cl_hp_sol) := false;
                    ldout(uvt_jk_op_hp_sol) := true;
                    upper_clamped := false;
                end if;

WHEN 1 =>

IF ldin(upr_horz_left_ps) and ldin(upr_horz_rt_ps) THEN
                    START_TIMER(CLAMP_ERR_1,1000);
                    CLAMP_A := CLAMP_A + 1;
                END IF;

WHEN 2 => ldout(uvt_jk_cl_lp_sol) := true;
                CLAMP_A := CLAMP_A + 1;

WHEN 3 =>

IF ldin(upr_vert_left_ps) and ldin(upr_vert_rt_ps) THEN
                    START_TIMER(CLAMP_ERR_1,100);
                    CLAMP_A := CLAMP_A + 1;
                END IF;

WHEN 4 =>
                if not timer_running(clamp_err_1) then
                    ldout(uvt_jk_cl_hp_sol) := true;
                    ldout(uhz_jk_cl_hp_sol) := true;
                    CLAMP_A := 0;
                    upper_clamped := true;
                end if;

WHEN OTHERS =>
                NULL;

END CASE;
```

```
CASE CLAMP_B IS

WHEN 0 =>

IF ((man_mode_ena and ldin(cls_lower_clamps)
                        and not lower_clamped)) or m_26 THEN
                        start_timer(clamp_err_2,1000);
                        ldout(lhz_jk_cl_lp_sol) := true;
                        ldout(lhz_jk_cl_hp_sol) := false;
                        ldout(lhz_jk_op_hp_sol) := false;
                        ldout(lvt_jk_cl_lp_sol) := false;
                        ldout(lvt_jk_cl_hp_sol) := false;
                        ldout(lvt_jk_op_hp_sol) := false;
                        m_26 := false;
                        CLAMP_B := CLAMP_B + 1;
                    ELSIF (MAN_MODE_ENA AND LDIN(OPN_lower_CLAMPS)) OR
                            M_21 THEN
                        M_21 := FALSE;
                        ldout(lhz_jk_cl_lp_sol) := false;
                        ldout(lhz_jk_cl_hp_sol) := false;
                        ldout(lhz_jk_op_hp_sol) := true;
                        ldout(lvt_jk_cl_lp_sol) := false;
                        ldout(lvt_jk_cl_hp_sol) := false;
                        ldout(lvt_jk_op_hp_sol) := true;
                        lower_clamped := false;
                    END IF;

WHEN 1 =>

IF ldin(low_horz_left_ps) and ldin(low_horz_rt_ps) THEN
                        START_TIMER(CLAMP_ERR_2,1000);

CLAMP_B := CLAMP_B + 1;
                    END IF;

WHEN 2 => ldout(lvt_jk_cl_lp_sol) := true;
                        START_TIMER(CLAMP_ERR_2,1000);
                        CLAMP_B := CLAMP_B + 1;

WHEN 3 =>

START_TIMER(CLAMP_ERR_2,1000);
                        CLAMP_B := CLAMP_B + 1;

WHEN 4 =>

IF ldin(low_vrt_left_ps) and ldin(low_vrt_rt_ps) THEN
                        START_TIMER(CLAMP_ERR_2,100);
                        CLAMP_B := CLAMP_B + 1;
                    END IF;

WHEN 5 =>
                    if not timer_running(clamp_err_2) then
                        ldout(lvt_jk_cl_hp_sol) := true;
                        ldout(lhz_jk_cl_hp_sol) := true;
                        CLAMP_B := 0;
                        LOWER_clamped := true;
                    end if;

WHEN OTHERS =>
                    NULL;

END CASE;

---------------------------------------------------------------- if ldout(lhz_jk_cl_hp_sol) then ldout(lhz_jk_cl_lp_sol) := false;end if;
if ldout(lvt_jk_cl_hp_sol) then ldout(lvt_jk_cl_lp_sol) := false;end if;
if ldout(uhz_jk_cl_hp_sol) then ldout(uhz_jk_cl_lp_sol) := false;end if;
if ldout(uvt_jk_cl_hp_sol) then ldout(uvt_jk_cl_lp_sol) := false;end if;

---------------------------------------------------------------- if (m_22 or m_23 or m_24) and not timer_running(m_code_dly) and not
m_dly then
start_timer(m_code_dly,100);
m_dly := true;
end if;
if not timer_running(m_code_dly) then
m_dly := false;
m_20 := false;
m_21 := false;
m_22 := false;
```

```
m_23 := false;
m_24 := false;
end if;
------------------------------------------------------------
if (NOT (NC_STATUS(FDHOLD_LT_ON))) AND
   (NOT NC_STATUS(SERVO_STOP_ACTV)) AND not nc_status(cyc_start_lt_on) THEN
    man_mode_ena := true;
else
    man_mode_ena := false;
end if;
------------------------------------------------------------ if man_mode_ena then            -- start of manual functions -- m_18 := false;
m_19 := false;

---------------------- SHUTTERS ------------------------ if not m_dly then
      LDOUT(LFT_SHUT_OPN_SOL) := FALSE;
      LDOUT(LFT_SHUT_CLS_SOL) := FALSE;
      LDOUT(RT_SHUT_OPN_SOL)  := FALSE;
      LDOUT(RT_SHUT_CLS_SOL)  := FALSE;
    end if;

IF LDIN(LFT_SHUT_OPN_PB) THEN
        LDOUT(LFT_SHUT_OPN_SOL) := TRUE;
        LDOUT(LFT_SHUT_CLS_SOL) := FALSE;
    ELSIF LDIN(LFT_SHUT_CLS_PB) THEN
        LDOUT(LFT_SHUT_CLS_SOL) := TRUE;
        LDOUT(LFT_SHUT_OPN_SOL) := FALSE;
    END IF;

IF LDIN(RT_SHUT_OPN_PB) THEN
        LDOUT(RT_SHUT_OPN_SOL) := TRUE;
        LDOUT(RT_SHUT_CLS_SOL) := FALSE;
    ELSIF LDIN(RT_SHUT_CLS_PB) THEN
        LDOUT(RT_SHUT_CLS_SOL) := TRUE;
        LDOUT(RT_SHUT_OPN_SOL) := FALSE;
    END IF;

---------------------- NOSES ------------------------------ if rrise(noses_rotate_pb) then
        if M_10 then
            M_10 := false;
            M_11 := true;
        else
            M_10 := true;
            M_11 := false;
        end if;
    end if;

------------------------ BENDING ---------------------------- if rrise(bending_pb) then
        if M_12 then
            M_12 := false;
            M_13 := true;
        else
            M_12 := true;
            M_13 := false;
        end if;
    end if;

---------------------- BACKPRESSURE ------------------------ if rrise(back_pressure_pb) then
        if M_14 then
            M_14 := false;
            M_15 := true;
        else
            M_14 := true;
            M_15 := false;
        end if;
    end if;

---------------------- DASHPOT ------------------------------ if rrise(dashpot_pb) then
        if M_16 then
```

```
            M_16 := false;
            M_17 := true;
        else
            M_16 := true;
            M_17 := false;
        end if;
    end if;

if (rdin(forms_up_pb) or ldin(form_u_pb)) then
        m_18 := true;
        m_19 := false;
    end if;
    if (rdin(forms_dn_pb) or ldin(form_d_pb)) then
        m_18 := false;
        m_19 := true;
    end if;

IF RDIN(87) THEN
    LDOUT(4) := FALSE;
    LDOUT(5) := TRUE;
ELSIF RDIN(88) THEN
    LDOUT(4) := TRUE;
    LDOUT(5) := FALSE;
END IF;
--------------------------------------------------------------------- end if;            -- end of manual functions

----------------------    SHUTTERS    --------------------------

IF M_22 THEN
        LDOUT(LFT_SHUT_OPN_SOL) := TRUE;
        LDOUT(LFT_SHUT_CLS_SOL) := FALSE;
        LDOUT(RT_SHUT_OPN_SOL) := TRUE;
        LDOUT(RT_SHUT_CLS_SOL) := FALSE;
        M_22 := FALSE;
    END IF;

-------------------------- RADIUS CLAMP ------------------------

IF M_23 THEN LDOUT(4) := TRUE;
                 LDOUT(5) := FALSE;
                 M_23 := FALSE;
    END IF;

IF M_24 THEN LDOUT(4) := FALSE;
                 LDOUT(5) := TRUE;
                 M_24 := FALSE;
    END IF;

----------------------- NOSES -------------------------------- if rrise(noses_rotate_pb) then
        if M_10 then
            M_10 := false;
            M_11 := true;
        ELSE
            M_10 := TRUE;
            M_11 := FALSE;
        END IF;
    END IF;
------------------------ forms in position ---------------------------
if m_18 and NOT (ldin(lft_form_up_ot) and ldin(rt_form_up_ot)) then
    forms_in_pos := FALSE;
elsif
    m_19 and NOT (ldin(lft_form_dn_ot) and ldin(rt_form_dn_ot)) then
    forms_in_pos := FALSE;
else
    forms_in_pos := TRUE;
end if;

IF NOT FORMS_IN_POS AND NOT FORM_TIM_STARTED THEN
    START_TIMER(FORM_ERR,MSD_INT_TABLE(134));
    FORM_TIM_STARTED := TRUE;
END IF;
IF FORMS_IN_POS THEN FORM_TIM_STARTED := FALSE;END IF;

-------------------------- block transfer ---------------------------
```

```
    m_10_11_pre_req then
 if    m_10_11_pre_req := false;
       start_timer(m_10_m_11,msd_int_table(130));
end if;
if not timer_running(m_10_m_11) then prelude_req_off(m_10_11_prelude); end if;

if m_12_13_pre_req then
       m_12_13_pre_req := false;
       start_timer(m_12_m_13,msd_int_table(131));
end if;
if not timer_running(m_12_m_13) then prelude_req_off(m_12_13_prelude); end if;

if m_14_15_pre_req then
       m_14_15_pre_req := false;
       start_timer(m_14_m_15,msd_int_table(132));
end if;
if not timer_running(m_14_m_15) then prelude_req_off(m_14_15_prelude); end if;

if m_16_17_pre_req then
       m_16_17_pre_req := false;
       start_timer(m_16_m_17,msd_int_table(133));
end if;
if not timer_running(m_16_m_17) then prelude_req_off(m_16_17_prelude); end if;

if forms_in_pos then prelude_req_off(m_18_19_prelude);
ELSE PRELUDE_REQUEST(M_18_19_PRELUDE);
end if;

------------------ solenoids ---------------------- ldout(noses_rotate_sol) := m_10;
   ldout(noses_reset_sol)  := m_11;
   ldout(bending_open_sol) := m_12;

ldout(bending_clsd_sol) := m_13;
   ldout(rt_back_pres_sol) := m_14;
   ldout(lt_back_pres_sol) := m_14;
   ldout(rt_dashpot_a_sol) := m_16;
   ldout(lt_dashpot_a_sol) := m_16;
   ldout(rt_dashpot_b_sol) := m_27;
   ldout(lt_dashpot_b_sol) := m_27;
   ldout(forms_up_sol)     := m_18;
   ldout(forms_dn_sol)     := m_19;

------------ OPERATOR   LIGHTS --------------

RDOUT(LT_SHUT_CLS_LT)    := LDOUT(LFT_SHUT_CLS_SOL);
RDOUT(RT_SHUT_CLS_LT)    := LDOUT(RT_SHUT_CLS_SOL);
RDOUT(BENDING_LT)        := M_12;
RDOUT(NOSES_ROTATED_LT)  := M_10;
RDOUT(BACK_PRESSURE_LT)  := M_14;
RDOUT(DASHPOT_LT)        := M_16;
RDOUT(FORMS_UP_LT) := (LDIN(LFT_FORM_UP_OT) AND LDIN(RT_FORM_UP_OT));
RDOUT(FORMS_DN_LT) := (LDIN(LFT_FORM_DN_OT) AND LDIN(RT_FORM_DN_OT));

----------------- FEEDHOLD -------------------------

IF NOT FORMS_IN_POS THEN
    IF MCL_FEEDHOLD_ON(1,FORMS_IN_POS_FH) = SUCCESS THEN NULL; END IF;
ELSE
    IF MCL_FEEDHOLD_OFF(1,FORMS_IN_POS_FH) = SUCCESS THEN NULL; END IF;
END IF;

------------   ERROR     MESSAGES ---------------

IF LDIN(HYD_MOT_OL)
THEN
   SERVO_STOP_ON(HYD_FAULT);
   IF NOT HYD_FAULT_MSG THEN
       PUT_MSG(6650,5,7);
       HYD_FAULT_MSG := TRUE;
   END IF;
ELSE
   SERVO_STOP_OFF(HYD_FAULT);
   IF HYD_FAULT_MSG THEN
       KILL_MSG(6650);
       HYD_FAULT_MSG := FALSE;
   END IF;
END IF;
IF NOT FORMS_IN_POS AND NOT FORM_ERR_MSG THEN
                       PUT_MSG(6651,5,7);
                       FORM_ERR_MSG := TRUE;
END IF;
IF FORMS_IN_POS AND FORM_ERR_MSG THEN
                       FORM_ERR_MSG := FALSE;
                       KILL_MSG(6651);
END IF;
```

```
if not upper_clamp_msg and not upper_clamped then put_msg(6660,5,7);
     upper_clamp_msg := true;
elsif upper_clamp_msg and upper_clamped then kill_msg(6660);
     upper_clamp_msg := false;
end if;

if not lower_clamp_msg and not lower_clamped then put_msg(6661,5,7);
     lower_clamp_msg := true;
elsif lower_CLAmp_msg and lower_clamped then kill_msg(6661);
     lower_clamp_msg := false;
end if;
---------------------------------------------------------------
IF LRISE(REM_FH_PB) THEN SET_BUSY(FEEDHOLD); END IF;

IF RDOUT(AUTO_LIGHT) AND NOT LDIN(PALMN_BUT) THEN
   IF MCL_FEEDHOLD_ON(1,PALM_FH) = SUCCESS THEN NULL; END IF;
ELSE
   IF MCL_FEEDHOLD_OFF(1,PALM_FH) = SUCCESS THEN NULL; END IF;
END IF;

END maxi_main;

END maxi;

PACKAGE mcccy IS ccy_tmr_1_period : integer;   -- canned cycle dwell iii x 10 msec
ccy_tmr_2_period : integer;   -- canned cycle dwell iv  x 10 msec PROCEDURE mcccy_clear;

PROCEDURE mcccy_cancel;

PROCEDURE mcccy_init;

PROCEDURE mcccy_main;

END mcccy;

PROCEDURE mcccy_main IS

BEGIN
   IF nc_status(ccy_prel_avail)
     THEN  -- a canned cycle is just beginning
        ccy_old_spin_dir := oem_spin_dir;  -- this is spin_dir to return to after
                                           -- ccy is finished
        ccy_spin_dir := oem_spin_dir;  -- current ccy spindle direction
   END IF;

IF nc_status(ccy_data_enc)
     THEN  -- some new mc_ccy request to handle

IF nc_status(ccy_start_tmr1)
          THEN  -- mcl dwell timers--
             IF ccy_tmr_1_period > 0
               THEN
                  ccy_timer_period := ccy_tmr_1_period;
                  ccy_state := ccy_timer_st_1;  -- start mcl dwell timer
             END IF;
        ELSIF nc_status(ccy_start_tmr2)
          THEN
             IF ccy_tmr_2_period > 0
               THEN
                  ccy_timer_period := ccy_tmr_2_period;
                  ccy_state := ccy_timer_st_1;  -- start mcl dwell timer
             END IF;

ELSIF nc_status(ccy_start_spin)
          THEN  -- spindle run control --
             oem_spin_dir := ccy_spin_dir;  -- new dir for spindle package
             ccy_state := ccy_sp_st_1;
        ELSIF nc_status(ccy_stop_spin)
          THEN
             oem_spin_dir := s_stop;  -- oemspn handles the spindle stop
             ccy_state := ccy_sp_st_1;
        ELSIF nc_status(ccy_rev_spin)
          THEN
             IF ccy_old_spin_dir = s_cw
               THEN
                  oem_spin_dir := s_ccw;  -- comand to oemspn package
                  ccy_spin_dir := s_ccw;
             ELSIF ccy_old_spin_dir = s_ccw
               THEN
                  oem_spin_dir := s_cw;
                  ccy_spin_dir := s_cw;
```

```
      ELSE
            oem_spin_dir := s_stop;
            ccy_spin_dir := s_stop;
      END IF;
      s_speed_ovride := true;   -- don't wait for up to speed
      ccy_state := ccy_sp_st_1;
   ELSIF nc_status(ccy_unrev_spin)
      THEN
         oem_spin_dir := ccy_old_spin_dir;   -- oemspn controls direction
         ccy_spin_dir := ccy_old_spin_dir;
         ccy_state := ccy_sp_st_1;

ELSIF nc_status(ccy_orient_spin)
      THEN  --spindle orient control--
         ccy_state := ccy_orient_st_1;
   ELSIF nc_status(ccy_oper_fdhold)
      THEN  --operator feedhold--
         ccy_state := ccy_fdhold_st_1;

END IF;   --end setup of ccy state for new status flag

IF nc_status(ccy_sso_100)
         THEN  -- sso control --
            oem_set_sso_100(ccy_sso_force);   -- oemspn forces 100% sso
      ELSIF nc_status(ccy_sso_100_done)
         THEN
            oem_clr_sso_100(ccy_sso_force);   -- oemspn removes sso force
      END IF;
END IF;   -- end of ccy_data_enc clause CASE ccy_state IS WHEN ccy_sp_st_1 =>   -- delay one mcl pass
      IF NOT s_speed_ovride
         THEN  --don't wait for spin rev
            prelude_on_ge(mc_ccy_prelude);
      END IF;
      ccy_state := ccy_sp_st_2;
   WHEN ccy_sp_st_2 =>   --waiting for spcont to complete action
      IF (oem_s_complete OR (spin_fault /= 0))
         THEN
         -- spcont package does message for a spin fault
            prelude_off_ge(mc_ccy_prelude);   -- we are done with this cmd
            s_speed_ovride := false;   --reset after spin reverse
            ccy_state := ccy_null_st;   --this action completed
      END IF;

WHEN ccy_orient_st_1 =>   -- cmd oemspn to start the spin orient
      prelude_on_ge(mc_ccy_prelude);
      oem_so_cmd := true;   -- starts the spin orient
      oem_spin_dir := s_stop;   --stop spin before orient
      ccy_state := ccy_orient_st_2;

WHEN ccy_orient_st_2 =>   -- waiting for orient function completion
      IF (oem_so_error OR oem_s_complete)
         THEN
            -- orient package does message for orient error
            prelude_off_ge(mc_ccy_prelude);   -- we are done with this cmd
            ccy_state := ccy_null_st;
      END IF;

WHEN ccy_timer_st_1 =>   -- start mcl timer 1 or 2
      prelude_on_ge(mc_ccy_prelude);
      start_timer_ge(mc_ccy_timer, ccy_timer_period);
      ccy_state := ccy_timer_st_2;

WHEN ccy_timer_st_2 =>   -- waiting for timer to finish
      IF NOT timer_running_ge(mc_ccy_timer)
         THEN
            prelude_off_ge(mc_ccy_prelude);
            ccy_state := ccy_null_st;   -- timer action completed
      END IF;

WHEN ccy_fdhold_st_1 =>   --initiate feedhold
      prelude_on_ge(mc_ccy_prelude);
      CASE oper_fdhold_on(1) IS
         WHEN success =>   -- get operator feedhold and
            ccy_state := ccy_fdhold_st_2;   --go wait for feedhold light
         WHEN failure =>   -- can't happen
            NULL;
         WHEN busy =>   -- try again (prelude is still asserted)
            NULL;
      END CASE;

WHEN ccy_fdhold_st_2 =>   -- wait for feedhold light
```

```
      IF nc_status(fdhold_lt_on)
         THEN
            prelude_off_ge(mc_ccy_prelude);
            ccy_state := ccy_null_st;
         END IF;

WHEN OTHERS =>
         NULL;   -- do nothing for ccy_null_st

END CASE;  -- ccy_state

END mcccy_main;

END mcccy;

WITH wndone;    USE wndone;    -- for nc_status and timers
WITH mcldat;    USE mcldat;
WITH wndtwo;    USE wndtwo;    -- for messages and routines
WITH wndtre;    USE wndtre;    -- for spin_ioc_run
WITH wndstd;    USE wndstd;    -- for oper_fdhold_on
WITH gedec;     USE gedec;     -- constant declarations
WITH mcllib;    USE mcllib;    -- for message utilities
WITH spcont;    USE spcont;    -- ge spindle control
WITH oemspn;    USE oemspn;    -- oem spindle control PACKAGE BODY mcccy IS TYPE ccy_states IS (ccy_sp_st_1, ccy_sp_st_2, ccy_orient_st_1, ccy_orient_st_2,
                    ccy_timer_st_1, ccy_timer_st_2, ccy_fdhold_st_1,
                    ccy_fdhold_st_2, ccy_null_st);

ccy_state         : ccy_states;
ccy_timer_period  : integer;

ccy_old_spin_dir  : s_spin_dirs;   -- what it was before the ccy started
ccy_spin_dir      : s_spin_dirs;   -- what it is now PROCEDURE mcccy_clear IS

BEGIN

-- clean up flags from ccy caused spindle errors --
   clear_timer_ge(mc_ccy_timer);
   ccy_state := ccy_null_st;
   prelude_off_ge(mc_ccy_prelude);    -- clear the hanging prelude
   oem_clr_sso_100(ccy_sso_force);    -- clear ccy forced sso END mcccy_clear;

PROCEDURE mcccy_cancel IS

BEGIN ccy_state := ccy_null_st;
   prelude_off_ge(mc_ccy_prelude);
   clear_timer_ge(mc_ccy_timer);
   -- oem should insert his custom code for cancel here.

END mcccy_cancel;

PROCEDURE mcccy_init IS

BEGIN ccy_state := ccy_null_st;
   ccy_spin_dir := s_stop;
   -- oem should insert his custom code for ccy initalization here.
   cy_tmr_1_period := 100;    -- one second time period
   cy_tmr_2_period := 200;    -- two second time period END mcccy_init;
WITH wndone;  USE wndone;
PACKAGE oemdec IS  -- start of declaration portion of package -- dio board 1    (byte_1 thru byte_5)
--                                        p12  pin number      Mach Wire No.
byte_1            : CONSTANT oemxor := 1;
AX_1_REF_SW       :constant oemin := 001;   --01
AX_2_REF_SW       :constant oemin := 002;   --02
AX_3_REF_SW       :constant oemin := 003;   --03
AX_4_REF_SW       :constant oemin := 004;   --04
AX_5_REF_SW       :constant oemin := 005;   --05
AX_6_REF_SW       :constant oemin := 006;   --06
AX_7_REF_SW       :constant oemin := 007;   --07
AX_8_REF_SW       :constant oemin := 008;   --08
```

```
byte_2              : CONSTANT oemxor := 2;
OPN_LOWER_CLAMPS    :constant oemin := 009; --09                741
CLS_LOWER_CLAMPS    :constant oemin := 010; --10                743
UPR_VRT_LFT_M_SW    :constant oemin := 011; --11                745
UPR_VRT_RT_M_SW     :constant oemin := 012; --12                747
UPR_VERT_LEFT_PS    :constant oemin := 013; --13                749
UPR_VERT_RT_PS      :constant oemin := 014; --14                751
UPR_HORZ_LEFT_PS    :constant oemin := 015; --15                753
UPR_HORZ_RT_PS      :constant oemin := 016; --16                755 byte_3              : CONSTANT oemxor := 3;
OPN_UPPER_CLAMPS    :constant oemin := 017; --17                757
CLS_UPPER_CLAMPS    :constant oemin := 018; --18                759
LOW_VRT_LFT_M_SW    :constant oemin := 019; --19                761
LOW_VRT_RT_M_SW     :constant oemin := 020; --20                763
HYD_MOT_OL          :constant oemin := 021; --21
LOW_VRT_LEFT_PS     :constant oemin := 022; --22                765
LOW_VRT_RT_PS       :constant oemin := 023; --23                767
LOW_HORZ_LEFT_PS    :constant oemin := 024; --24                769 byte_4              : CONSTANT oemxor := 4;
LOW_HORZ_RT_PS      :constant oemin := 025; --25                771
LFT_SHUT_OPN_PB     :constant oemin := 026; --26                351
LFT_SHUT_CLS_PB     :constant oemin := 027; --27                353
LFT_NOSE_UP_OT      :constant oemin := 028; --28                447
LFT_NOSE_DN_OT      :constant oemin := 029; --29                449
LFT_NOSE_IN_OT      :constant oemin := 030; --30                451
LFT_NOSE_OUT_OT     :constant oemin := 031; --31                423
RT_NOSE_UP_OT       :constant oemin := 032; --32                455 byte_5              : CONSTANT oemxor := 5;
RT_NOSE_DN_OT       :constant oemin := 033; --33                457
RT_NOSE_IN_OT       :constant oemin := 034; --34                461
RT_NOSE_OT_OT       :constant oemin := 035; --35                459
LFT_FORM_UP_OT      :constant oemin := 036; --36                463
LFT_FORM_DN_OT      :constant oemin := 037; --37                465
RT_FORM_DN_OT       :constant oemin := 038; --38                469
RT_FORM_UP_OT       :constant oemin := 039; --39                467
                    :constant oemin := 040; --40

-- dio board 2   (byte_6 thru byte_10)
--                                                       p12  pin number
byte_6              : CONSTANT oemxor := 6;
RT_SHUT_OPN_PB      :constant oemin := 041; --01
RT_SHUT_CLS_PB      :constant oemin := 042; --02
REMCYC_ST_PB        :constant oemin := 043; --03
FH_PB               :constant oemin := 044; --04
form_u_pb           :constant oemin := 045; --05
form_d_pb           :constant oemin := 046; --06
PALMN_BUT           :constant oemin := 047; --07
--                  :constant oemin := 048; --08 byte_7              : CONSTANT oemxor := 7;
--                  :constant oemin := 049; --09
--                  :constant oemin := 050; --10
--                  :constant oemin := 051; --11
--                  :constant oemin := 052; --12
--                  :constant oemin := 053; --13
--                  :constant oemin := 054; --14
--                  :constant oemin := 055; --15
--                  :constant oemin := 056; --16 byte_8              : CONSTANT oemxor := 8;
--                  :constant oemin := 057; --17
--                  :constant oemin := 058; --18
--                  :constant oemin := 059; --19
--                  :constant oemin := 060; --20
--                  :constant oemin := 061; --21
--                  :constant oemin := 062; --22
--                  :constant oemin := 063; --23
--                  :constant oemin := 064; --24 byte_9              : CONSTANT oemxor := 9;
--                  :constant oemin := 065; --25
--                  :constant oemin := 066; --26
--                  :constant oemin := 067; --27
--                  :constant oemin := 068; --28
--                  :constant oemin := 069; --29
--                  :constant oemin := 070; --30
--                  :constant oemin := 071; --31
--                  :constant oemin := 072; --32 byte_10             : CONSTANT oemxor := 10;
--                  :constant oemin := 073; --33
--                  :constant oemin := 074; --34
--                  :constant oemin := 075; --35
```

```
--                      :constant oemin := 076; --36
--                      :constant oemin := 077; --37
--                      :constant oemin := 078; --38
--                      :constant oemin := 079; --39
--                      :constant oemin := 080; --40

-- the following identifies dio board local output constants which the oem
-- mcl designer will use to declare his local digital outputs.  output
-- declarations are made in the same manner as inputs described above.

-- dio board 1
--                                              pll  pin number

HYD_MOT_STARTER         :constant oemout := 001; --02
LFT_SHUT_OPN_SOL        :constant oemout := 002; --03
LFT_SHUT_CLS_SOL        :constant oemout := 003; --04
                        :constant oemout := 004; --05
--                      :constant oemout := 005; --06
RT_SHUT_OPN_SOL         :constant oemout := 006; --07
RT_SHUT_CLS_SOL         :constant oemout := 007; --09
--                      :constant oemout := 008; --11
--                      :constant oemout := 009; --13
BENDING_OPEN_SOL        :constant oemout := 010; --14
BENDING_CLSD_SOL        :constant oemout := 011; --15
NOSES_RESET_SOL         :constant oemout := 012; --16
NOSES_ROTATE_SOL        :constant oemout := 013; --17
RT_BACK_PRES_SOL        :constant oemout := 014; --18
LT_BACK_PRES_SOL        :constant oemout := 015; --20
--                      :constant oemout := 016; --22
FORMS_DN_SOL            :constant oemout := 017; --24
LHZ_JK_CL_LP_SOL        :constant oemout := 018; --25
LVT_JK_CL_LP_SOL        :constant oemout := 019; --26
UHZ_JK_CL_HP_SOL        :constant oemout := 020; --27
LHZ_JK_OP_HP_SOL        :constant oemout := 021; --28
UVT_JK_CL_HP_SOL        :constant oemout := 022; --29
LVT_JK_OP_HP_SOL        :constant oemout := 023; --31
RT_DASHPOT_A_SOL        :constant oemout := 024; --33

-- dio board 2
--                                              pll  pin number

RT_DASHPOT_B_SOL        :constant oemout := 025; --02
LT_DASHPOT_A_SOL        :constant oemout := 026; --03
LT_DASHPOT_B_SOL        :constant oemout := 027; --04
FORMS_UP_SOL            :constant oemout := 028; --05
UHZ_JK_CL_LP_SOL        :constant oemout := 029; --06
UVT_JK_CL_LP_SOL        :constant oemout := 030; --07
LHZ_JK_CL_HP_SOL        :constant oemout := 031; --09
UHZ_JK_OP_HP_SOL        :constant oemout := 032; --11
LVT_JK_CL_HP_SOL        :constant oemout := 033; --13
UVT_JK_OP_HP_SOL        :constant oemout := 034; --14
--                      :constant oemout := 035; --15
                        :constant oemout := 036; --16
                        :constant oemout := 037; --17
                        :constant oemout := 038; --18
--                      :constant oemout := 039; --20
--                      :constant oemout := 040; --22
--                      :constant oemout := 041; --24
--                      :constant oemout := 042; --25
--                      :constant oemout := 043; --26
--                      :constant oemout := 044; --27
--                      :constant oemout := 045; --28
--                      :constant oemout := 046; --29
--                      :constant oemout := 047; --31
--                      :constant oemout := 048; --33

-- the following are constants for the 24 inputs from the customer device
-- panel.
--                                      1mcx3p1  pin number -- rbyte_9              :constant mcsxor:= 9;
AX_1_NEG_PB             :constant mcsin := 065; --01
AX_2_NEG_PB             :constant mcsin := 066; --02
AX_3_NEG_PB             :constant mcsin := 067; --03
AX_4_NEG_PB             :constant mcsin := 068; --04
AX_5_NEG_PB             :constant mcsin := 069; --05
AX_6_NEG_PB             :constant mcsin := 070; --06
AX_7_NEG_PB             :constant mcsin := 071; --07
AX_8_NEG_PB             :constant mcsin := 072; --08 rbyte_10             :constant mcsxor : 10;
AX_1_POS_PB             :constant mcsin := 073; --09
AX_2_POS_PB             :constant mcsin := 074; --10
AX_3_POS_PB             :constant mcsin := 075; --11
```

```
AX_4_POS_PB        :constant mcsin := 076; --12
AX_5_POS_PB        :constant mcsin := 077; --13
AX_6_POS_PB        :constant mcsin := 078; --14
AX_7_POS_PB        :constant mcsin := 079; --15
AX_8_POS_PB        :constant mcsin := 080; --16

- rbyte_11         :constant mcsxor := 11;
FORMS_UP_PB        :constant mcsin := 081; --17
FORMS_DN_PB        :constant mcsin := 082; --18
NOSES_ROTATE_PB    :constant mcsin := 083; --19
BENDING_PB         :constant mcsin := 084; --20
BACK_PRESSURE_PB   :constant mcsin := 085; --21
DASHPOT_PB         :constant mcsin := 086; --22
--                 :constant mcsin := 087; --23
--                 :constant mcsin := 088; --24
```

-- the following are constants for the 24 customer device panel outputs.
-- they are declared the same as local digital inputs.

```
--                           lmcx3p1   pin number
AX_1_NEG_LT        :constant mcsout := 049; --25
AX_2_NEG_LT        :constant mcsout := 050; --26
AX_3_NEG_LT        :constant mcsout := 051; --27
AX_4_NEG_LT        :constant mcsout := 052; --28
AX_5_NEG_LT        :constant mcsout := 053; --29
AX_6_NEG_LT        :constant mcsout := 054; --30
AX_7_NEG_LT        :constant mcsout := 055; --31
AX_8_NEG_LT        :constant mcsout := 056; --32

AX_1_POS_LT        :constant mcsout := 057; --33
AX_2_POS_LT        :constant mcsout := 058; --34
AX_3_POS_LT        :constant mcsout := 059; --35
AX_4_POS_LT        :constant mcsout := 060; --36
AX_5_POS_LT        :constant mcsout := 061; --37
AX_6_POS_LT        :constant mcsout := 062; --38
AX_7_POS_LT        :constant mcsout := 063; --39
AX_8_POS_LT        :constant mcsout := 064; --40

FORMS_UP_LT        :constant mcsout := 065; --41
FORMS_DN_LT        :constant mcsout := 066; --42
NOSES_ROTATED_LT   :constant mcsout := 067; --43
BENDING_LT         :constant mcsout := 068; --44
BACK_PRESSURE_LT   :constant mcsout := 069; --45
DASHPOT_LT         :constant mcsout := 070; --46
LT_SHUT_CLS_LT     :constant mcsout := 071; --47
RT_SHUT_CLS_LT     :constant mcsout := 072; --48
```

--the following constants are assigned by the oem to indentify the 16
--preludes that he can assign for window procedures prelude_request and
--prelude_req_off. next line modified for scr 1558

```
oem_sp_prel       : CONSTANT pre_oem_in := 01;
m_10_11_prelude   :constant pre_oem_in := 02;
m_12_13_prelude   :constant pre_oem_in := 03;
m_14_15_prelude   :constant pre_oem_in := 04;
m_16_17_prelude   :constant pre_oem_in := 05;
m_18_19_prelude   :constant pre_oem_in := 06;
--                :constant pre_oem_in := 07;
--                :constant pre_oem_in := 08;
--                :constant pre_oem_in := 09;
                  :constant pre_oem_in := 10;
                  :constant pre_oem_in := 11;
```

--the following constants are assigned by the oem to indentify the 16
--postludes that he can assign for window procedures postlude_request
--and postlude_req_off.

```
oem_sp_post       : CONSTANT post_oem_in := 01;
--                :constant post_oem_in := 02;
--                :constant post_oem_in := 03;
                  :constant post_oem_in := 04;
                  :constant post_oem_in := 05;
-                 :constant post_oem_in := 06;
--                :constant post_oem_in := 07;
--                :constant post_oem_in := 08;
```

--the following constants are assigned by the oem to identify the 16
--servo stops that he can assign for window procedures servo_stop_on and
--servo_stop_off.

```
ovrtrv_s_stop     :constant servo_oem_in := 01;
HYD_FAULT         :constant servo_oem_in := 02;
--                :constant servo_oem_in := 03;
--                :constant servo_oem_in := 04;
--                :constant servo_oem_in := 05;
```

```
--the following constants are assigned by the oem to indentify the 8
--css disable elements that he can assign for window procedures
--css_disable and css_enable.
sp_oem_css        : CONSTANT css_oem_in := 01;  --m58/m59 used in oemmst --the following constants are assigned by the oem to indentify the 32
--timers that he can assign.

ovrtrv_delay      :constant oem_timer_id := 01;
clamp_err_1       :constant oem_timer_id := 02;
clamp_err_2       :constant oem_timer_id := 03;
m_10_m_11         :constant oem_timer_id := 04;
m_12_m_13         :constant oem_timer_id := 05;
m_14_m_15         :constant oem_timer_id := 06;
m_6_m_17          :constant oem_timer_id := 07;
form_err          :constant oem_timer_id := 08;

--the following constants are assigned by the oem to identify the 5 feedholds
--that may be assigned for window functions mcl_feedhold_on and
--mcl_feedhold_off.

forms_in_pos_fh   :constant integer := 03;
--                :constant integer := 04;
--                :constant integer := 05;
PALM_FH           :constant integer := 06;
m_code_dly        :constant integer := 07;

END oemdec;

PACKAGE oem1 IS   -- start of package specification

PROCEDURE mcl_1_oem;

END oem1;   -- end of package specification

-- package body oem1

WITH wndone;    USE wndone;
WITH mcldat;    USE mcldat;
WITH mcllib;    USE mcllib;
WITH ovrtrv;    Use ovrtrv;
with oemdec;    use oemdec;

PACKAGE BODY oem1 IS   -- start of package body

PROCEDURE mcl_1_oem IS

BEGIN ovrtrv_main;
                    --*****************************************************
                    -- add oem's code here.  location of logic
                    -- to remote, inhibit, or force the mcs pushbuttons
                    --***************************************************** if ldin(rem_cyc_st_pb) then rrise(cycle_start) :=true;
                            rdin(cycle_start) := true;
    if;

END mcl_1_oem;

END oem1;   -- end package body

PACKAGE oem2 IS   -- start of oem2 package specification

PROCEDURE mcl_2_oem;

END oem2;   -- end of oem2 package specification

WITH wndone;    USE wndone;
WITH mcldat;    USE mcldat;
WITH mcllib;    USE mcllib;
WITH maxi;      USE maxi;
WITH pwrup;     USE pwrup;
WITH spcont;    USE spcont;
WITH oemspn;    USE oemspn;
WITH mcccy;     USE mcccy;
WITH orient;    USE orient;
WITH tgcomp;    USE tgcomp;
```

```
PACKAGE BODY oem2 IS

PROCEDURE mcl_2_oem IS

BEGIN

--   if power_up_done then    -- note: this flag must be declared in pwrup.spc and
                               -- set true in pwrup_main after all   conditions
                               -- have been met before any of the following
                               -- procedures will be called in the order specified
                               -- below or else only pwrup_main will run.
                               -- you must remember to remove the -- in front of
                               -- if, else and end if statements inorder to
                               -- activate the use of this flag.  if you do not
                               -- wish to utilize this flag then pwrup_main should
                               -- be moved to the top of the call list as shown below.
     maxi_main;
     mcccy_main;       --ge canned cycle interface package ge orient code
     oemspn_main;      -- ge provided oem spindle interface package
     orient_main;      -- ge orient code scr 1558
     tgcomp_main;      -- ge temperature growth
   --else pwrup_main;       -- after this routine has finished running the
                       -- power_up_done flag should be set true inorder
                       -- to allow the above routines to run in the
                       -- specificed order.

--   end if;

END mcl_2_oem;

END oem2;   -- end of oem2 package body
WITH wndone;    USE wndone;
WITH mcldat;    USE mcldat;
PACKAGE oemdsp IS PROCEDURE mcl_get_ge_data(elem : IN integer;
                             argument_type : OUT integer;
                             left_digits : OUT integer;
                             right_digits : OUT integer;
                             integer_arg : OUT integer;
                             float_arg : OUT float;
                             ascii_arg : OUT str64;
                             boolean_arg : OUT boolean);

PROCEDURE mcl_get_oem_data(elem : IN integer;
                             argument_type : OUT integer;
                             left_digits : OUT integer;
                             right_digits : OUT integer;
                             integer_arg : OUT integer;
                             float_arg : OUT float;
                             ascii_arg : OUT str64;
                             boolean_arg : OUT boolean);

END oemdsp;
WITH wndone;    USE wndone;
WITH mcldat;    USE mcldat;
WITH wndstd;    USE wndstd;
WITH wndtwo;    USE wndtwo;
WITH wndtre;    USE wndtre;
WITH wndmth;    USE wndmth;
WITH spcont;    USE spcont;
WITH oemspn;    USE oemspn;
--
PACKAGE BODY oemdsp IS --
elem_9_val         : CONSTANT integer := 12;
--
--argumemt type are defined as follows
bad_oem_arg        : CONSTANT integer := 0;
boolean_val        : CONSTANT integer := 1;
asc_string         : CONSTANT integer := 2;
float_num          : CONSTANT integer := 3;
integ_num_sup      : CONSTANT integer := 4;
integ_num_disp     : CONSTANT integer := 5;
--
spin_horsepower    : float := 0.0;
--
```

```
PROCEDURE mcl_get_ge_data(elem : IN integer;
                          argument_type : OUT integer;
                          left_digits : OUT integer;
                          right_digits : OUT integer;
                          integer_arg : OUT integer;
                          float_arg : OUT float;
                          ascii_arg : OUT str64;
                          boolean_arg : OUT boolean) IS loop_index : integer RANGE 1..64;
temp_float : float;
temp_int   : integer;
tool_digits : integer;

--
-- this procedure retrieves data for the displays subsystem.
-- the list of standard displayed items is not expandable.
-- only elements 12 and 13 may be modified by the oem, to enable spindle
-- power display and determine format.
-- all others are reserved for *general electric* use only!!!!!!!!!!!!
--

BEGIN

CASE elem IS
    WHEN 0 =>   -- parts counter
      argument_type := integ_num_sup;
      left_digits := 4;
      integer_arg := parts_counter;
    WHEN 1 =>   -- lots count
      argument_type := integ_num_sup;
      left_digits := 4;

integer_arg := lot_parts_count;

WHEN 2 =>   -- active tool digits status page display field
  argument_type := float_num;
  right_digits := 0;
  tool_digits := msd_int_table(msd_tl_code_fmt) / 10;
  temp_float := int_to_float(active_tool(most_sig_digs)) * float_10000;
  temp_float := temp_float + int_to_float(active_tool(least_sig_digs));
  IF ((opt_control = lathe) AND (tool_digits <= 4))
    THEN
      temp_int := trunc(temp_float / float_100);
      float_arg := int_to_float(temp_int);
      left_digits := tool_digits - 2;
  ELSE
      float_arg := temp_float;
      left_digits := tool_digits;
  END IF;
WHEN 4 =>   -- pre selected tool digits
  argument_type := float_num;
  right_digits := 0;
  tool_digits := msd_int_table(msd_tl_code_fmt) / 10;
  temp_float := int_to_float(pre_sel_tool(most_sig_digs)) * float_10000;
  temp_float := temp_float + int_to_float(pre_sel_tool(least_sig_digs));
  IF ((opt_control = lathe) AND (tool_digits <= 4))
    THEN
      float_arg := temp_float / float_100;
      left_digits := tool_digits - 2;
  ELSE
      float_arg := temp_float;
      left_digits := tool_digits;
  END IF;
WHEN 6 =>   -- tool in spindle tool digits
  argument_type := float_num;
  right_digits := 0;
  tool_digits := msd_int_table(msd_tl_code_fmt) / 10;
  temp_float := int_to_float(tool_in_spindle(most_sig_digs)) * float_10000;
  temp_float := temp_float + int_to_float(tool_in_spindle(least_sig_digs));
  IF ((opt_control = lathe) AND (tool_digits <= 4))
    THEN
      float_arg := temp_float / float_100;
      left_digits := tool_digits - 2;
  ELSE
      float_arg := temp_float;
      left_digits := tool_digits;
  END IF;
WHEN 8 =>   -- maximum speed allowed for chuck
  argument_type := float_num;
  right_digits := 1;
  left_digits := 4;
  float_arg := chuck_max_speed;
WHEN 9 =>
  argument_type := integ_num_sup;
  right_digits := 0;
  left_digits := 3;
  integer_arg := elem_9_val;   -- used by cutask module
```

```
WHEN 10 =>
  argument_type := asc_string;
  left_digits := 20;
  FOR loop_index IN 1..32
    LOOP
      ascii_arg(loop_index) := std_mcl_version(loop_index);
  END LOOP;
WHEN 11 =>
  argument_type := asc_string;
  left_digits := 20;
  ascii_arg :=

"44S723802-G01R10                                                      ";
    WHEN 12 =>
           -- change left_digits to true value to enable hp display
           -- be sure to assign value to spin_horsepower
      argument_type := asc_string;
      left_digits := 0;
      ascii_arg :=
         "SPINDLE HP                                                         ";
    WHEN 13 =>
      argument_type := float_num;
      left_digits := 3;
      right_digits := 1;
      float_arg := spin_horsepower;
    WHEN OTHERS =>
      argument_type := bad_oem_arg;
  END CASE;

END mcl_get_ge_data;

--
-- this procedure is for the oem and is used for building displays
--

PROCEDURE mcl_get_oem_data(elem : IN integer;
                          argument_type : OUT integer;
                          left_digits : OUT integer;
                          right_digits : OUT integer;
                          integer_arg : OUT integer;
                          float_arg : OUT float;
                          ascii_arg : OUT str64;
                          boolean_arg : OUT boolean) IS -
-  this procedure retrieves data for the displays subsystem.
-  the list of displayed items is  expandable
-- or modifiable by the oem,
--
BEGIN -- oem display items are added here as a case
                        -- as in mcl_get_ge_data
  FOR index IN 3..8
    LOOP
      ascii_arg(index) := ' ';
  END LOOP;
  CASE elem IS
    WHEN 0 =>
      argument_type := asc_string;
      left_digits := 64;
      ascii_arg :=
         " I.S.E. ID NO 324S0360 FOR MAXEI MACHINE BY J. GUERREIN ERIE PA.";
    WHEN 1 =>  -- aux gear selected
      argument_type := asc_string;
      left_digits := 3;
      IF aux_gear_sel
        THEN
           ascii_arg(1) := 'Y';
           ascii_arg(2) := 'E';
           ascii_arg(3) := 'S';
        ELSE
           ascii_arg(1) := 'N';
           ascii_arg(2) := 'O';
      END IF;
    WHEN 2 =>  -- active gear
      argument_type := integ_num_sup;
      left_digits := 2;
      integer_arg := active_gear;
    WHEN 3 =>  -- commanded gear
      argument_type := integ_num_sup;
      left_digits := 2;
      integer_arg := commanded_gear;
    WHEN 4 =>  -- active spindle direction
      argument_type := asc_string;
      left_digits := 4;
```

```
    CASE s_active_dir IS
      WHEN s_cw =>
        ascii_arg(1) := 'C';
        ascii_arg(2) := 'W';
      WHEN s_ccw =>
        ascii_arg(1) := 'C';
        ascii_arg(2) := 'C';
        ascii_arg(3) := 'W';
      WHEN s_stop =>
        ascii_arg(1) := 'S';
        ascii_arg(2) := 'T';
        ascii_arg(3) := 'O';
        ascii_arg(4) := 'P';
    END CASE;

WHEN 5 =>  -- spindle mode
    argument_type := asc_string;
    left_digits := 5;
    CASE s_mode IS
      WHEN s_jog =>
        ascii_arg(1) := 'J';
        ascii_arg(2) := 'O';
        ascii_arg(3) := 'G';
      WHEN s_run =>
        IF nc_status(css_active)
          THEN
            ascii_arg(1) := 'C';
            ascii_arg(2) := 'S';
            ascii_arg(3) := 'S';
        ELSE
            ascii_arg(1) := 'R';
            ascii_arg(2) := 'P';
            ascii_arg(3) := 'M';
        END IF;
      WHEN s_hold =>
        ascii_arg(1) := 'H';
        ascii_arg(2) := 'O';
        ascii_arg(3) := 'L';
        ascii_arg(4) := 'D';
      WHEN s_mesh =>
        ascii_arg(1) := 'M';
        ascii_arg(2) := 'E';
        ascii_arg(3) := 'S';
        ascii_arg(4) := 'H';
      WHEN s_creep =>
        ascii_arg(1) := 'C';
        ascii_arg(2) := 'R';
        ascii_arg(3) := 'E';
        ascii_arg(4) := 'E';
        ascii_arg(5) := 'P';
    END CASE;
  WHEN 6 =>  -- command spindle speed
    argument_type := float_num;
    right_digits := 1;
    left_digits := 4;
    float_arg := s_cmd_speed;
  WHEN 7 =>  -- spindle prelude active
    argument_type := asc_string;
    left_digits := 3;
    IF spin_pre
      THEN
        ascii_arg(1) := 'Y';
        ascii_arg(2) := 'E';
        ascii_arg(3) := 'S';
    ELSE
        ascii_arg(1) := 'N';
        ascii_arg(2) := 'O';
    END IF;

WHEN 8 =>  -- spindle postlude active
    argument_type := asc_string;
    left_digits := 3;
    IF spin_post
      THEN
        ascii_arg(1) := 'Y';
        ascii_arg(2) := 'E';
        ascii_arg(3) := 'S';
    ELSE
        ascii_arg(1) := 'N';
        ascii_arg(2) := 'O';
    END IF;
  WHEN 9 =>  -- chuck active
    argument_type := integ_num_sup;
    left_digits := 2;
    integer_arg := chuck_actv;
```

```
      WHEN 10 =>  -- minimum spindle speed
        argument_type := float_num;
        right_digits := 1;
        left_digits := 4;
        float_arg := s_min_rpm;
      WHEN 11 =>  -- maximum spindle speed
        argument_type := float_num;
        right_digits := 1;
        left_digits := 4;
        float_arg := s_max_rpm;
      WHEN 12 =>  -- actual orient angle
        argument_type := float_num;
        right_digits := 1;
        left_digits := 3;
        float_arg := fdbk_device_psn(s_axis_no, true);
      WHEN 13 =>  -- programmed orient angle
        argument_type := float_num;
        right_digits := 1;
        left_digits := 3;
        float_arg := oem_so_angle;
      WHEN OTHERS =>
        argument_type := bad_oem_arg;
    END CASE;
  END mcl_get_oem_data;

END oemdsp;

PACKAGE oemgrp IS  -- start of package specification

PROCEDURE mcl_disp_chng;

PROCEDURE mcl_disp_update;

END oemgrp;  -- end of package specification

-- oemgrp package body

WITH wndone;   USE wndone;
WITH graph;    USE graph;
WITH mcldat;   USE mcldat;
WITH wndtwo;   USE wndtwo;

PACKAGE BODY oemgrp IS  -- start of package body

PROCEDURE mcl_disp_chng IS

BEGIN

NULL;
--
--           oem's may use the procedures in the
--           'graph' package to display graphics
--

END mcl_disp_chng;  -- procedure mcl_disp_chng

PROCEDURE mcl_disp_update IS
    BEGIN

NULL;
--
--           oem's may use the procedures in the
--           'graph' package to display graphics
--

END mcl_disp_update;  -- procedure mcl_disp_update

END oemgrp;  -- end of package body

PACKAGE oemmst IS  -- start of package specification

PROCEDURE set_m_flags(misc_code : IN integer);

M_10,M_11,M_12,M_13 : BOOLEAN := FALSE;
M_14,M_15,M_16,M_17 : BOOLEAN := FALSE;
m_27,m_28,M_18,M_19,M_20,M_21,M_22,M_23,M_24,M_25,M_26 : BOOLEAN := FALSE;
m_10_11_pre_req,m_12_13_pre_req,m_14_15_pre_req,
m_16_17_pre_req,m_18_19_pre_req : boolean := false;

END oemmst;  -- end of package specification
```

```
WITH wndone;    USE wndone;
WITH mcldat;    USE mcldat;
WITH mcllib;    USE mcllib;
WITH wndtre;    USE wndtre;
WITH oemdec;    USE oemdec;
WITH spcont;    USE spcont;
WITH oemspn;    USE oemspn;

PACKAGE BODY oemmst IS  -- start of package body

PROCEDURE set_m_flags(misc_code : IN integer) IS

BEGIN

CASE misc_code IS

WHEN 2 | 30 =>
      post_stop := eop_stop;
      postlude_request(oem_sp_post);

WHEN 10 =>
      M_10 := TRUE;
      M_11 := FALSE;
      prelude_request(m_10_11_prelude);
      m_10_11_pre_req := true;

WHEN 11 =>
      M_11 := TRUE;
      M_10 := FALSE;
      prelude_request(m_10_11_prelude);
      m_10_11_pre_req := true;

WHEN 12 =>
      M_12 := TRUE;
      M_13 := FALSE;
      prelude_request(m_12_13_prelude);
      m_12_13_pre_req := true;

WHEN 13 =>
      M_13 := TRUE;
      M_12 := FALSE;
      prelude_request(m_12_13_prelude);
      m_12_13_pre_req := true;

WHEN 14 =>
      M_14 := TRUE;
      M_15 := FALSE;
      prelude_request(m_14_15_prelude);
      m_14_15_pre_req := true;

WHEN 15 =>
      M_15 := TRUE;
      M_14 := FALSE;
      prelude_request(m_14_15_prelude);
      m_14_15_pre_req := true;

WHEN 16 =>
      M_16 := TRUE;
      M_17 := FALSE;
      prelude_request(m_16_17_prelude);
      m_16_17_pre_req := true;

WHEN 17 =>
      M_17 := TRUE;
      M_16 := FALSE;
      prelude_request(m_16_17_prelude);
      m_16_17_pre_req := true;

WHEN 18 =>
      M_18 := TRUE;
      M_19 := FALSE;
      prelude_request(m_18_19_prelude);
      m_18_19_pre_req := true;

WHEN 19 =>
      M_19 := TRUE;
      M_18 := FALSE;
      prelude_request(m_18_19_prelude);
      m_18_19_pre_req := true;

WHEN 20 =>
      M_20 := TRUE;

WHEN 21 =>
      M_21 := TRUE;
```

```
        WHEN 22 =>
          M_22 := TRUE;

WHEN 23 =>
          M_23 := TRUE;

WHEN 24 =>
          M_24 := TRUE;

WHEN 25 =>
          m_25 := true;

WHEN 26 =>
          M_26 := true;

when 27 =>
          m_27 := true;

when 28 =>
          m_27 := false;

WHEN OTHERS =>        NULL;

END CASE;

END set_m_flags;

END oemmst;  -- end package body

WITH spcont;    USE spcont;

PACKAGE oemspn IS

TYPE post_stops IS (no_stop, m05_stop, eop_stop);
    post_stop       : post_stops := no_stop;
    oem_spin_dir    : s_spin_dirs;   --type in spcont
    oem_s_complete  : boolean := true;
    oem_so_cmd      : boolean := false;  --cmd oemspn to prepare for orient
    oem_so_permit   : boolean := false;
    oem_so_done     : boolean := true;
    oem_so_error    : boolean := false;
    oem_so_angle    : float;
    -- the following constants are id's for forcing 100 % sso
    -- the number must not exceed the size of oem_sso_100_arr in the body
    ccy_sso_force   : CONSTANT integer := 1;

PROCEDURE oem_set_sso_100(sso_100_id : IN integer);

PROCEDURE oem_clr_sso_100(sso_100_id : IN integer);

PROCEDURE oemspn_init;

PROCEDURE oemspn_clear;

PROCEDURE oemspn_main;

END oemspn;

WITH wndone;    USE wndone;
  WITH mcldat;    USE mcldat;
  WITH wndtwo;    USE wndtwo;
  WITH wndtre;    USE wndtre;
  WITH oemdec;    USE oemdec;
  WITH spcont;    USE spcont;

PACKAGE BODY oemspn IS

--allow two modules to control sso forcing
    --index constants to be declared in the spc
    oem_sso_100_arr : ARRAY (1..2) OF boolean;

-- enumerated types

--scr 1558 changed oem_sp_states
    TYPE oem_sp_states IS (s_srvo_ok, s_oem_setup, oem_s_orient_1, oem_s_orient_2,
                           oem_s_new_dir_1, oem_s_open_lp);

oem_sp_state   : oem_sp_states := s_srvo_ok;
    --   used in oemspn_main to select the active spindle task.

PROCEDURE sp_oem_setup;

PROCEDURE sp_srvo_ok;
       scr 1558

PROCEDURE oem_sp_orient_1;

PROCEDURE oem_sp_orient_2;
```

```
PROCEDURE oem_sp_open_lp;

PROCEDURE oem_sp_new_dir_1;

FUNCTION sp_monitor_ok RETURN boolean;

PROCEDURE oemspn_init IS  --                                              [1]
--***************************************************************
-- 1 force gear 1 active on power up

BEGIN commanded_gear := 1;
  selected_gear := 1;

oem_spin_dir := s_stop;   --scr 1558
  oem_so_angle := float_0;  --default spindle orient angle = 0 scr 1558
  oem_sso_100_arr(1) := false;  --no one is forcing sso here
  oem_sso_100_arr(2) := false;

END oemspn_init;

PROCEDURE monitor_clear IS

--clears all spindle direction variables
--to stop the spindle

BEGIN prog_spin_dir := s_stop;
  man_spin_dir := s_stop;
  oem_spin_dir := s_stop;
  s_mode := s_run;
  oem_sp_state := s_srvo_ok;
  s_close_loop := s_loop_closed;

END monitor_clear;
--

PROCEDURE oemspn_clear IS  --                                             [2]

--***************************************************************

BEGIN post_stop := no_stop;
  postlude_req_off(oem_sp_post);
  monitor_clear;
  oem_s_complete := true;
  oem_so_angle := float_0;
  oem_so_cmd := false;
  oem_so_permit := false;
  oem_so_done := true;
  oem_so_error := false;
  prelude_req_off(oem_sp_prel);

oemspn_clear;

PROCEDURE oemspn_main IS  --                                              [4]

--***************************************************************

BEGIN

IF sp_monitor_ok
    THEN
      CASE oem_sp_state IS
        WHEN s_srvo_ok =>
          sp_srvo_ok;

--scr 1558
        WHEN oem_s_orient_1 =>
          oem_sp_orient_1;
        WHEN oem_s_orient_2 =>
          oem_sp_orient_2;
        WHEN oem_s_open_lp =>
          oem_sp_open_lp;
        WHEN oem_s_new_dir_1 =>
          oem_sp_new_dir_1;
```

```
            WHEN s_oem_setup =>
                sp_oem_setup;
        END CASE;
    ELSE
        monitor_clear;
    END IF;

END oemspn_main;

PROCEDURE sp_oem_setup IS --                                              [5]

--***************************************************************

BEGIN

IF (post_stop /= no_stop) AND (nc_status(blk_post_active))
      THEN
        postlude_req_off(oem_sp_post);
        oem_spin_dir := s_stop;
        IF post_stop = eop_stop
          THEN
            prog_s := float_0;
            oem_so_angle := float_0;
            clear_nc_s_data;
        END IF;
        post_stop := no_stop;
    END IF;

--scr 1558
    IF ((oem_spin_dir /= s_stop) AND (s_loop_closed))
      THEN
        prelude_request(oem_sp_prel);
        oem_s_complete := false;
        s_close_loop := false;   -- open loop command to spcont
        oem_sp_state := oem_s_open_lp;
    ELSIF (oem_spin_dir /= prog_spin_dir)
      THEN
        IF NOT s_speed_ovride
          THEN
            oem_s_complete := false;
            oem_sp_state := oem_s_new_dir_1;
        END IF;
        prog_spin_dir := oem_spin_dir;
    ELSIF oem_so_cmd
      THEN
        oem_s_complete := false;
        oem_sp_state := oem_s_orient_1;
    END IF;

--end scr 1558

END sp_oem_setup;

PROCEDURE sp_srvo_ok IS --                                                [14]

--***************************************************************

-- 1 set spindle enable
-- 2 set oem spindle state to apply brake

BEGIN spindle_enable := true;
    oem_sp_state := s_oem_setup;

END sp_srvo_ok;

PROCEDURE oem_sp_orient_1 IS

- ***************************************************************

BEGIN

IF s_cmd_complete
      THEN
        IF s_loop_closed
          THEN
            oem_so_permit := true;
            oem_sp_state := oem_s_orient_2;
        ELSE
            s_close_loop := true;   --close the loop
        END IF;
    END IF;

END oem_sp_orient_1;
```

```
PROCEDURE oem_sp_orient_2 IS

--****************************************************************

BEGIN

IF oem_so_done
      THEN
         IF NOT oem_so_error
            THEN
               prelude_req_off(oem_sp_prel);
         END IF;
         oem_so_cmd := false;
         oem_so_permit := false;
         oem_s_complete := true;
         oem_sp_state := s_oem_setup;
   END IF;

END oem_sp_orient_2;
--

PROCEDURE oem_sp_open_lp IS

--****************************************************************

BEGIN

IF NOT s_loop_closed
      THEN
         oem_sp_state := s_oem_setup;
   END IF;

END oem_sp_open_lp;
--

PROCEDURE oem_sp_new_dir_1 IS

--****************************************************************

BEGIN

IF NOT s_cmd_complete
      THEN
         oem_s_complete := false;
   ELSIF oem_so_cmd
      THEN
         oem_sp_state := s_oem_setup;
   ELSIF NOT s_loop_closed
      THEN
         prelude_req_off(oem_sp_prel);
         oem_s_complete := true;
         oem_sp_state := s_oem_setup;
   ELSIF oem_spin_dir = s_stop
      THEN
         oem_s_complete := true;
         oem_sp_state := s_oem_setup;
   END IF;

END oem_sp_new_dir_1;

FUNCTION sp_monitor_ok RETURN boolean IS  --                    [15]

--**************************************************************** sp_monitor : boolean;

BEGIN sp_monitor := true;
   IF nc_status(servo_stop_actv)
      THEN
         sp_monitor := false;
   ELSE
      IF (spin_fault /= 0)
         THEN
            sp_monitor := false;
      END IF;
   END IF;
   RETURN sp_monitor;

END sp_monitor_ok;

PROCEDURE oem_set_sso_100(sso_100_id : IN integer) IS

--****************************************************************
```

```
BEGIN oem_sso_100_arr(sso_100_id) := true;   --remember who is forcing
   mcl_sso_value(1.0);
   oem_controls_sso := true;   --prevent ge_mcl from updating sso
   mcl_sso_on;

END oem_set_sso_100;
--
--
PROCEDURE oem_clr_sso_100(sso_100_id : IN integer) IS

--*************************************************************** temp_bool : boolean;
id_index : integer;

BEGIN oem_sso_100_arr(sso_100_id) := false;
   temp_bool := false;
   FOR Id_index IN 1..2
     LOOP
        temp_bool := temp_bool OR oem_sso_100_arr(id_index);
   END LOOP;
   IF NOT temp_bool
     THEN
        oem_controls_sso := false;   -- allow ge_mcl to control sso
        mcl_sso_off;
   END IF;

END oem_clr_sso_100;
--
END oemspn;
PACKAGE oemain IS   -- start of package specification FUNCTION ax_on_reference(ax_no : IN integer) RETURN boolean;

PROCEDURE mst;

PROCEDURE oem_mcl_1;

PROCEDURE oem_mcl_2;

PROCEDURE select_mcs;

PROCEDURE oem_mcl_clear;

PROCEDURE oem_mcl_cancel;

PROCEDURE oem_mcl_init;

open_on_ref_sw  : boolean;   -- this flag is used to determine the state of the
                             -- reference zero switch when tripped. if the switch
                             -- "opens" when tripped, the flag will be set true,
                             -- else it will be set false. the flag is looked at
                             -- in procedure fast_mcl.

END oemain;   -- end of package specification
WITH wndone;    USE wndone;
WITH mcldat;    USE mcldat;
WITH mcllib;    USE mcllib;
WITH wndtwo;    USE wndtwo;
WITH wndstd;    USE wndstd;
WITH oemdec;    USE oemdec;
WITH ovrtrv;    USE ovrtrv;
WITH maxi;      USE maxi;
WITH pwrup;     USE pwrup;
WITH oem1;      USE oem1;
WITH oem2;      USE oem2;
WITH oemmst;    USE oemmst;
WITH spcont;    USE spcont;
WITH oemspn;    USE oemspn;
WITH mcccy;     USE mcccy;
WITH orient;    USE orient;
WITH tgcomp;    USE tgcomp;
```

```
PACKAGE BODY oemain IS  -- start of oemain package body ref_sw_trip_low  : CONSTANT integer := 105;  -- index into msd boolean table
    ------------------------------------------------------------------------

FUNCTION ax_on_reference(ax_no : IN integer) RETURN boolean IS

BEGIN

IF ldin(ref_lim_sw_off(ax_no)) XOR open_on_ref_sw
          THEN
              RETURN true;  -- ref switch is tripped
          ELSE
              RETURN false;  -- ref switch not tripped
       END IF;

END ax_on_reference;
    ------------------------------------------------------------------------

PROCEDURE mst IS

BEGIN

IF nc_status(t_enc)
          THEN  -- nc status flag
       -- t_code returns the programmed tool code as its value
              pre_sel_tool := t_code;   -- type is tool_code
              active_tool := pre_sel_tool;
              tool_in_spindle := pre_sel_tool;
              tool_man_active := true;  -- if this flag is used in the oem's mcl then
                                        -- it the responsibility of the mcl designer to
                                        -- clear it after using the t-code
       END IF;

--scr 1558
       IF nc_status(orient_angle_enc)
          THEN oem_so_angle := orient_angle;  -- window function
       END IF;  -- angle used in orient package FOR index IN 1..3
          LOOP
              m_codes(index) := 0;
          END LOOP;
       m_count := 0;

IF nc_status(m1_enc)
          THEN  -- nc status flag
              m_codes(1) := m_code_1;  -- pc/nc window function
              set_m_flags(m_codes(1));  -- call to oem's m decode routine
              m_count := 1;
              IF nc_status(m2_enc)
                 THEN  -- nc status flag
                     m_codes(2) := m_code_2;  -- pc/nc window function
                     set_m_flags(m_codes(2));  -- call to oem's m decode routine
                     m_count := 2;
                     IF nc_status(m3_enc)
                        THEN  -- nc status flag
                            m_codes(3) := m_code_3;  -- pc/nc window function
                            set_m_flags(m_codes(3));  -- call to oem's m decode routine
                            m_count := 3;
                     END IF;
              END IF;
       END IF;

END mst;
    ------------------------------------------------------------------------

PROCEDURE oem_mcl_1 IS

BEGIN sp_mcl1;  -- call to ge spindle control package
       mcl_1_oem;  -- call to the oems package where his logic that is to run
                   -- prior to the gemcl and oem_mcl_2 will be located.
                   -- it is procedure mcl_1_oem (located in package oem1)
                   -- in which the logic to alter the state of the mcs
                   -- pushbuttons before the gemcl uses them to control their
                   -- associated activities would be located.
```

```
END oem_mcl_1;
----------------------------------------------------------------------

PROCEDURE oem_mcl_2 IS

BEGIN mcl_2_oem;   -- call to oems package where his logic that is to run
               -- after both oem_mcl_1 and gemcl has run.
               -- it is mcl_2_oem that the oem would place calls to the
               -- procedures that contain the logic for the different
               -- machine functions and the order they are to execute.
  sp_mcl2;     -- call to ge spindle control package.

END oem_mcl_2;

PROCEDURE oem_mcl_init IS

BEGIN
-- set up offset lights.

offset_type_sel := no_offset_sel;

IF opt_control = lathe
     THEN -- setup lathe offset type pb's
        offset_but_types(1) := no_offset_sel;
        offset_but_types(2) := tool_offset;
        offset_but_types(3) := setup_offset;

offset_lights(tool_radius)   := unused_light_1;
        offset_lights(tool_offset)   := offset_light_2;
        offset_lights(tool_length)   := unused_light_1;
        offset_lights(fixture_offset) := unused_light_1;
        offset_lights(setup_offset)  := offset_light_3;
        offset_lights(no_offset_sel) := unused_light_1;

ELSE  --setup machining center offset type pb's offset_but_types(1) := tool_radius;
        offset_but_types(2) := tool_length;
        offset_but_types(3) := setup_offset;

offset_lights(tool_radius)   := offset_light_1;
        offset_lights(tool_offset)   := unused_light_1;
        offset_lights(tool_length)   := offset_light_2;
        offset_lights(fixture_offset) := unused_light_1;
        offset_lights(setup_offset)  := offset_light_3;
        offset_lights(no_offset_sel) := unused_light_1;

END IF;

lathe button style version

-- constant arrays for combined axis and direction lights comb_ax_buttons := true;

FOR index IN 0..maxaxes
     LOOP
        axis_buttons(index)(neg_dir) := no_button;
        axis_buttons(index)(pos_dir) := no_button;

axis_lights(index)(neg_dir) := no_button;
        axis_lights(index)(pos_dir) := no_button;
  END LOOP;

--the code below configures the jog pb's on the mcs for g10, g11, or g12
--type jog legends. refer to applications manual 3-26. change this code
--if jog legend purchased is not one of these.

axis_buttons(1)(neg_dir) := AX_1_NEG_PB;
  axis_buttons(1)(pos_dir) := AX_1_POS_PB;
  axis_buttons(2)(neg_dir) := AX_2_NEG_PB;
  axis_buttons(2)(pos_dir) := AX_2_POS_PB;
  axis_buttons(3)(neg_dir) := AX_3_NEG_PB;
  axis_buttons(3)(pos_dir) := AX_3_POS_PB;
  axis_buttons(4)(neg_dir) := AX_4_NEG_PB;
  axis_buttons(4)(pos_dir) := AX_4_POS_PB;
  axis_buttons(5)(neg_dir) := AX_5_NEG_PB;
  axis_buttons(5)(pos_dir) := AX_5_POS_PB;
  axis_buttons(6)(neg_dir) := AX_6_NEG_PB;
  axis_buttons(6)(pos_dir) := AX_6_POS_PB;
  axis_buttons(7)(neg_dir) := AX_7_NEG_PB;
  axis_buttons(7)(pos_dir) := AX_7_POS_PB;
  axis_buttons(8)(neg_dir) := AX_8_NEG_PB;
```

```
   axis_buttons(8)(pos_dir) := AX_8_POS_PB;

axis_lights(1)(neg_dir) := AX_1_NEG_LT;
   axis_lights(1)(pos_dir) := AX_1_POS_LT;
   axis_lights(2)(neg_dir) := AX_2_NEG_LT;
   axis_lights(2)(pos_dir) := AX_2_POS_LT;
   axis_lights(3)(neg_dir) := AX_3_NEG_LT;
   axis_lights(3)(pos_dir) := AX_3_POS_LT;
   axis_lights(4)(neg_dir) := AX_4_NEG_LT;
   axis_lights(4)(pos_dir) := AX_4_POS_LT;
   axis_lights(5)(neg_dir) := AX_5_NEG_LT;
   axis_lights(5)(pos_dir) := AX_5_POS_LT;
   axis_lights(6)(neg_dir) := AX_6_NEG_LT;
   axis_lights(6)(pos_dir) := AX_6_POS_LT;
   axis_lights(7)(neg_dir) := AX_7_NEG_LT;
   axis_lights(7)(pos_dir) := AX_7_POS_LT;
   axis_lights(8)(neg_dir) := AX_8_NEG_LT;
   axis_lights(8)(pos_dir) := AX_8_POS_LT;

-- set up in_position light
   in_pos_light := c_c_axis_light;

-- these are used between fast and normal mcl
                               -- offset into ldin array
   ref_lim_sw_off(1)  := 1;  -- first byte on first local dio board
   ref_lim_sw_off(2)  := 2;
   ref_lim_sw_off(3)  := 3;
   ref_lim_sw_off(4)  := 4;
   ref_lim_sw_off(5)  := 5;
   ref_lim_sw_off(6)  := 6;
   ref_lim_sw_off(7)  := 7;
   ref_lim_sw_off(8)  := 8;
   ref_lim_sw_off(9)  := 41;  -- first byte on second local dio board
   ref_lim_sw_off(10) := 42;
   ref_lim_sw_off(11) := 43;
   ref_lim_sw_off(12) := 44;

FOR index IN 1..actual_axes
     LOOP
       old_ref_state(index) := false;
   END LOOP;
   open_on_ref_sw := msd_bool_table(ref_sw_trip_low);  -- sets flag to indicate
                                                       -- state of ref switch when tripped
                                                       -- true = opened at trip time
                                                       -- false = closed at trip time -- calls to the oem's initialization routines go here
-- edit in any calls to new machine initialization procedures and/or
-- remove calls to machine routines not used maxi_init;
   ovrtrv_init;
   pwrup_init;
   sp_init;     -- ge spindle init call
   oemspn_init; -- ge oem spindle init call
   mcccy_init;
   orient_init;
   tgcomp_init; -- ge temperature growth init END oem_mcl_init;

------------------------------------------------------------------------------

PROCEDURE oem_mcl_clear IS

BEGIN

-- edit in any calls to new machine clear routines and/or remove calls to
-- machine routines not used.

maxi_clear;
   ovrtrv_clear;
   sp_clear;    -- ge spindle clear procedure call
   oemspn_clear; -- ge oem spindle clear procedure call
   mcccy_clear; -- scr 1558
   orient_clear; -- scr 1558
   oem_mcl_cancel;

END oem_mcl_clear;

------------------------------------------------------------------------------

PROCEDURE oem_mcl_cancel IS

BEGIN
```

```
-- edit in any calls to new machine cancel procedures and/or remove calls
-- to machine routines not used.
   maxi_cancel;
   ovrtrv_cancel;
   sp_cancel;     -- ge spindle cancel procedure call
   mcccy_cancel;
   orient_cancel;

END oem_mcl_cancel;

PROCEDURE select_mcs IS

BEGIN
   NULL
   NULL;

END select_mcs;

END oemain;

PACKAGE orient IS

TYPE oem_orient_dir IS (so_cw, so_ccw, so_shortest);
TYPE spin_or_states IS (orient_ready, orient_move_wait, orient_move_act);
   s_orient_rate   : float;
   s_orient_dir    : oem_orient_dir;
   s_orient_state  : spin_or_states;
   s_dist_to_go    : float;

PROCEDURE orient_main;

PROCEDURE orient_cancel;

PROCEDURE orient_clear;

PROCEDURE orient_init;

END orient;

WITH wndone;    USE wndone;
WITH mcldat;    USE mcldat;
WITH wndtwo;    USE wndtwo;
WITH wndtre;    USE wndtre;
WITH mcllib;    USE mcllib;
WITH spcont;    USE spcont;
WITH oemspn;    USE oemspn;
WITH oemdec;    USE oemdec;

PACKAGE BODY orient IS msg_orient_fail  : CONSTANT integer := 6986;  --forced move failed
s_orient_can     : boolean;
go_to_marker     : boolean;   -- run spindle encoder one revolution
temp_orient_rate : float;
s_orient_angle   : float;   -- copy of oem_so_angle at start of orient
half_rev         : float;   -- half_rev is 180.0 for degree programming
full_rev         : float;   -- full_rev is  360.0
dist_in_psn      : float;
shortest_dist    : float;
                                    --orient init PROCEDURE orient_init IS

BEGIN

- oem may change the default orient rate and direction here
   s_orient_rate  := float_10;   -- default rpm rate
   s_orient_dir   := so_shortest;  -- default shortest rotary path
   s_orient_state := orient_ready;
   s_dist_to_go   := float_0;

END orient_init;
                                    --orient clear

PROCEDURE orient_clear IS

BEGIN s_orient_can := true;   -- do the orient cancel for clear
   kill_msg(msg_orient_fail);

END orient_clear;
                                    --orient cancel

PROCEDURE orient_cancel IS
```

```
BEGIN s_orient_can := true;   -- cancel occurs on next call to orient_main

END orient_cancel;

PROCEDURE spin_orient IS

BEGIN

CASE s_orient_state IS
 WHEN orient_ready =>
   s_orient_angle := oem_so_angle;
   oem_so_error := false;
   oem_so_done := false;
   half_rev := 180.0;   --   degree programming
   full_rev := 360.0;
   dist_in_psn := full_rev / msd_axis_float(s_axis_no, axis_5);
   temp_orient_rate := full_rev * s_orient_rate;
   IF marker_found(s_axis_no)
     THEN
        go_to_marker := false;
        IF s_orient_angle < float_0
          THEN  -- change to + angle
            s_orient_angle := s_orient_angle + full_rev;
        END IF;
        s_dist_to_go := mach_psn_mcl(s_axis_no);
        IF s_dist_to_go < float_0
          THEN
            s_dist_to_go := s_dist_to_go + full_rev;
        END IF;
        IF msd_bool_table(100)
          THEN  --cw is positive
            s_dist_to_go := s_orient_angle - s_dist_to_go;
          ELSE  -- cw is negative
            s_dist_to_go := s_orient_angle - (full_rev - s_dist_to_go);
        END IF;
-- this calculation will be in the correct units    --
-- orient angle must be programmed in degrees --

--compute the shortest distance to orient position
        shortest_dist := s_dist_to_go;
        IF (shortest_dist > half_rev)
          THEN
            shortest_dist := shortest_dist - full_rev;
        ELSIF (shortest_dist < - half_rev)
          THEN
            shortest_dist := shortest_dist + full_rev;
        END IF;
--spindle is in orient position if within the range +/- dist_in_psn
        IF (shortest_dist <= dist_in_psn) AND (shortest_dist >=
           (- dist_in_psn))
          THEN
            oem_so_done := true;
            s_orient_state := orient_ready;
          ELSE
            CASE s_orient_dir IS
              WHEN so_shortest =>
                s_dist_to_go := shortest_dist;
              WHEN so_cw =>
                IF (s_dist_to_go < float_0)
                  THEN
                    s_dist_to_go := s_dist_to_go + full_rev;
                END IF;
              WHEN so_ccw =>
                IF (s_dist_to_go > float_0)
                  THEN
                    s_dist_to_go := s_dist_to_go - full_rev;
                END IF;
            END CASE;

s_orient_state := orient_move_wait;
        END IF;
     ELSE
        s_dist_to_go := full_rev + 0.1 * full_rev;
        go_to_marker := true;
        s_orient_state := orient_move_wait;

END IF;
--invert distance to go if cw and ccw are not same polarity and cw is negative
   IF msd_bool_table(100) = msd_bool_table(101)
     THEN
        oem_so_error := true;
   ELSIF NOT msd_bool_table(100)
     THEN
```

```
            s_dist_to_go := - s_dist_to_go;
      END IF;

WHEN orient_move_wait =>
      IF NOT oem_so_error
         THEN
            CASE axis_move_forced(s_axis_no, false, temp_orient_rate, s_dist_to_go
                    ) IS
               WHEN busy =>
                  NULL;   -- try again next sweep
               WHEN failure =>
                  oem_so_error := true;
               WHEN success =>
                  s_orient_state := orient_move_act;
            END CASE;
      END IF;
      IF oem_so_error
         THEN
            put_msg(msg_orient_fail, 5, 3);   -- "can't orient spindle"
            s_orient_state := orient_ready;
            oem_so_done := true;
      END IF;

WHEN orient_move_act =>
      CASE axis_status(s_axis_no) IS
         WHEN request_pending | request_accepted =>
            NULL;
         WHEN request_rejected | action_cancelled =>
            put_msg(msg_orient_fail, 5, 3);
            oem_so_error := true;
            oem_so_done := true;
            s_orient_state := orient_ready;
         WHEN action_complete =>
            IF (NOT marker_found(s_axis_no))
               THEN
                  put_msg(msg_orient_fail, 5, 3);
                  oem_so_error := true;
            END IF;
            oem_so_done := oem_so_error OR (NOT go_to_marker);
            s_orient_state := orient_ready;
      END CASE;
   END CASE;

END spin_orient;

--

PROCEDURE spin_orient_can IS

BEGIN

IF s_orient_state = orient_move_act
      THEN
         CASE axis_stop(s_axis_no) IS
            WHEN busy =>
               NULL;   -- try again next sweep
            WHEN failure =>
               NULL;
            WHEN success =>
               s_orient_can := false;
         END CASE;
      ELSE
         s_orient_can := false;
   END IF;
   IF NOT s_orient_can
      THEN
         s_orient_state := orient_ready;
         oem_so_done := true;
         oem_so_error := false;
         oem_so_permit := false;
         IF oem_so_cmd
            THEN
               oem_so_cmd := false;
               prelude_req_off(oem_sp_prel);
         END IF;
   END IF;

END spin_orient_can;

--

PROCEDURE orient_main IS

--*******************************************
-- monitors permit and cancel flags
-- called from oem_2_mcl
--*******************************************
```

```
BEGIN

IF s_orient_can
    THEN -- cancel may be active for more than one pass
       spin_orient_can;
  LSIF oem_so_permit
    THEN -- permit controlled by oemspn package
       spin_orient;
  END IF;

END orient_main;

END orient;

PACKAGE OVRTRV IS

TYPE OVRTRV_STATES IS (FIND_LEGAL_PB, WAIT_S_STOP_ON, ENABLE_BYPASS,
WAIT_S_STOP_OFF, STOP_OFF_DELAY, ALLOW_JOG_OFF, RESET_OVRTRV);

OVRTRV_STATE : OVRTRV_STATES := FIND_LEGAL_PB;

AXIS_OT_INPUT : ARRAY (1..8) OF INTEGER;

JOG_OFF_PB : INTEGER := 0; --LEGAL PB WHEN ACTIVE

PROCEDURE OVRTRV_INIT;

PROCEDURE OVRTRV_CLEAR;

PROCEDURE OVRTRV_CANCEL;

PROCEDURE OVRTRV_MAIN;

END OVRTRV;

with WNDONE;   use WNDONE;
with MCLDAT;   use MCLDAT;
with WNDTWO;   use WNDTWO;
with MCLLIB;   use MCLLIB;
with OEMDEC;   use OEMDEC;
with PWRUP;    use PWRUP;

package body OVRTRV is

AXIS_1_NEG_OT : CONSTANT OEMIN := 28;  -- overtravel switch assignments
AXIS_1_POS_OT : CONSTANT OEMIN := 29;  --      "         "        "
AXIS_2_POS_OT : CONSTANT OEMIN := 30;  --      "         "        "
AXIS_2_NEG_OT : CONSTANT OEMIN := 31;  --      "         "        "
AXIS_5_NEG_OT : CONSTANT OEMIN := 32;  --      "         "        "
AXIS_5_POS_OT : CONSTANT OEMIN := 33;  --      "         "        "
AXIS_6_POS_OT : CONSTANT OEMIN := 34;
AXIS_6_NEG_OT : CONSTANT OEMIN := 35;

AX_1_POS_OT_MSG : CONSTANT INTEGER := 6106; --1/24/84
BYPASS_OVRTRV : CONSTANT OEMOUT := 48;
LAST_OT_SWITCH : CONSTANT INTEGER := 08;
JOG_OFF_DIR_PB : INTEGER := 0;
OVRTRV_MSG : INTEGER := 6100;

procedure CLR_JOG_PBS (INCLUDE_LEGAL : IN BOOLEAN ) IS
begin for index in B_L_AXIS..T_R_AXIS loop
      IF include_legal
      OR ((index /= JOG_OFF_PB) and (index /= JOG_OFF_DIR_PB)) THEN
         rrise (index) := false;
      end if;
   end loop;
end CLR_JOG_PBS;

procedure GET_LEGAL_PB is
begin for index in 1..LAST_OT_SWITCH loop
   if not ldin (AXIS_OT_INPUT(INDEX)) then case index is when 1 => JOG_OFF_PB := AXIS_BUTTONS(1)(NEG_DIR);--MSG 6106 --1/24/84
      when 2 => JOG_OFF_PB := AXIS_BUTTONS(1)(POS_DIR);--MSG 6107 --1/24/84
      when 3 => JOG_OFF_PB := AXIS_BUTTONS(2)(NEG_DIR);--MSG 6108 --1/24/84
      when 4 => JOG_OFF_PB := AXIS_BUTTONS(2)(POS_DIR);--MSG 6109 --1/24/84
      when 5 => JOG_OFF_PB := AXIS_BUTTONS(5)(NEG_DIR);--MSG 6110 -- 3-20-88
      when 6 => JOG_OFF_PB := AXIS_BUTTONS(5)(POS_DIR);--MSG 6111 -- 3-20-88
```

```
        when 7 =>  JOG_OFF_PB := AXIS_BUTTONS(6)(NEG_DIR);--MSG 6112 -- 3-20-88
        when 8 =>  JOG_OFF_PB := AXIS_BUTTONS(6)(POS_DIR);--MSG 6113 -- 3-20-88
        when others => NULL;

end case;

JOG_OFF_DIR_PB := 0;
        OVRTRV_MSG := (AX_1_POS_OT_MSG -1) + index;
        exit;

end if;
    end loop;

end GET_LEGAL_PB;

procedure OVRTRV_INIT is
begin
     AXIS_OT_INPUT(1)  := AXIS_1_POS_OT;
     AXIS_OT_INPUT(2)  := AXIS_1_NEG_OT;
     AXIS_OT_INPUT(3)  := AXIS_2_POS_OT;
     AXIS_OT_INPUT(4)  := AXIS_2_NEG_OT;
     AXIS_OT_INPUT(5)  := AXIS_5_POS_OT;
     AXIS_OT_INPUT(6)  := AXIS_5_NEG_OT;
     AXIS_OT_INPUT(7)  := AXIS_6_POS_OT;
     AXIS_OT_INPUT(8)  := AXIS_6_NEG_OT;

end OVRTRV_INIT;

procedure OVRTRV_CLEAR is
begin ldout(BYPASS_OVRTRV) := false;
   OVRTRV_STATE := FIND_LEGAL_PB;
   SERVO_STOP_OFF(OVRTRV_S_STOP);
IF ovrtrv_msg /= 0 THEN
   kill_msg (ovrtrv_msg);
   CASE delete_file_msg(ovrtrv_msg) is
      WHEN failure | success | busy =>
        null;
   END CASE;
END IF;

OVRTRV_CLEAR;

procedure OVRTRV_CANCEL is
begin
     ldout(BYPASS_OVRTRV) := false;
     OVRTRV_STATE := FIND_LEGAL_PB;
end OVRTRV_CANCEL;

procedure OVRTRV_MAIN is
INC_LEGAL : CONSTANT BOOLEAN := TRUE;
NOT_LEGAL : CONSTANT BOOLEAN := FALSE;

BEGIN
 IF (NOT (LDIN(28) AND LDIN(29) AND LDIN(30) AND LDIN(31) AND
LDIN(32) AND LDIN(33) AND LDIN(34) AND LDIN(35))
OR (OVRTRV_STATE/=FIND_LEGAL_PB)) THEN
    CASE OVRTRV_STATE is
      when FIND_LEGAL_PB =>
         servo_stop_on(OVRTRV_S_STOP);
         GET_LEGAL_PB;
         OVRTRV_STATE := WAIT_S_STOP_ON;
         clr_jog_pbs(inc_legal);

when WAIT_S_STOP_ON =>
         clr_jog_pbs(INC_LEGAL);
         IF nc_status(SERVO_STOP_ACTV) THEN
            put_msg(OVRTRV_MSG,5,1);
            OVRTRV_STATE := ENABLE_BYPASS;
         END IF;

when ENABLE_BYPASS =>
         IF rdin(JOG_OFF_PB) AND (COMB_AX_BUTTONS OR rdin(JOG_OFF_DIR_PB)) THEN
             ldout(BYPASS_OVRTRV) := TRUE;
             OVRTRV_STATE := WAIT_S_STOP_OFF;
             servo_stop_off(OVRTRV_S_STOP);
         END IF;
           clr_jog_pbs(INC_LEGAL);

when WAIT_S_STOP_OFF =>
         IF rdin(JOG_OFF_PB) AND (COMB_AX_BUTTONS OR rdin(JOG_OFF_DIR_PB)) THEN
            IF (NOT nc_status(SERVO_STOP_ACTV)) AND (POWER_UP_DONE) THEN
```

```
                    start_timer(OVRTRV_DELAY,50);
                    OVRTRV_STATE := STOP_OFF_DELAY;
                END IF;
            ELSE
                OVRTRV_STATE := RESET_OVRTRV;
            END IF;
            clr_jog_pbs(INC_LEGAL);

when STOP_OFF_DELAY =>
            IF rdin(JOG_OFF_PB) and (COMB_AX_BUTTONS OR rdin(JOG_OFF_DIR_PB)) THEN
                IF NOT timer_running(OVRTRV_DELAY) THEN
                    rrise(JOG_OFF_PB) := TRUE;
                    rrise(JOG_OFF_DIR_PB) := TRUE;
                    clr_jog_pbs(NOT_LEGAL);
                    OVRTRV_STATE := ALLOW_JOG_OFF;
                ELSE
                    clr_jog_pbs(INC_LEGAL);
                END IF;
            END IF;

when ALLOW_JOG_OFF =>
            IF rdin(JOG_OFF_PB) and (COMB_AX_BUTTONS or rdin(JOG_OFF_DIR_PB)) THEN
                clr_jog_pbs(NOT_LEGAL);
            ELSE
                clr_jog_pbs(INC_LEGAL);
                OVRTRV_STATE := RESET_OVRTRV;
            END IF;

when RESET_OVRTRV =>
            ldout(BYPASS_OVRTRV) := FALSE;
            kill_msg(OVRTRV_MSG);
            OVRTRV_STATE := FIND_LEGAL_PB;
                CASE delete_file_msg(OVRTRV_MSG) is
                    when failure | success | busy =>
                        null;
                END CASE;

when others => null;
    end CASE;
END IF;
end OVRTRV_MAIN;

end OVRTRV;

-- package specification pwrup

PACKAGE pwrup IS  -- start of pwrup package specification

PROCEDURE pwrup_init;

PROCEDURE pwrup_clear;

PROCEDURE pwrup_cancel;

PROCEDURE pwrup_main;

power_up_done   : boolean := false;  -- used by mcl_2_oem
                                     -- set true in pwrup_main after all power up
                                     -- conditions have been met.  remains true
                                     -- the control is turned off then will be
                                     -- reset to false by pwrup_init.
END pwrup;

-- package body pwrup
-- location of pwrup_init, pwrup_clear, pwrup_cancel and pwrup_main
WITH wndone;    USE wndone;
WITH mcldat;    USE mcldat;     -- by placing a with/use statement here all
WITH mcllib;    USE mcllib;     -- information that is located in the with/use'd
                                -- package spec is available for the package body
                                -- to access.
PACKAGE BODY pwrup IS  -- start of pwrup package body PROCEDURE pwrup_init IS

BEGIN

NULL;

power_up_done := false;  -- when false indicates that power up has not run yet
END pwrup_init;
```

```
PROCEDURE pwrup_clear IS

BEGIN

NULL;

END pwrup_clear;

PROCEDURE pwrup_cancel IS

BEGIN

NULL;

END pwrup_cancel;

PROCEDURE pwrup_main IS

BEGIN

NULL;

power_up_done:= true;  -- remains set until control is powered down

END pwrup_main;

END pwrup;  -- end of package body

PACKAGE spcont IS

TYPE s_modes IS (s_hold, s_mesh, s_creep, s_jog, s_run);
s_mode          : s_modes := s_run;

TYPE s_spin_dirs IS (s_cw, s_ccw, s_stop);

prog_spin_dir   : s_spin_dirs := s_stop;

man_spin_dir    : s_spin_dirs := s_stop;

aux_gear_sel    : boolean := false;
SUBTYPE s_gears IS integer RANGE 0..6;
selected_gear   : s_gears := 0;
spindle_enable  : boolean := false;
SUBTYPE s_chucks IS integer RANGE 0..10;
chuck_actv      : s_chucks := 1;
s_close_loop    : boolean := false;
s_cmd_dir       : s_spin_dirs := s_stop;
s_cmd_speed     : float := 0.0;
s_speed_ovride  : boolean := false;
s_strobe        : boolean := false;
commanded_gear  : s_gears := 0;
prog_s          : float := 0.0;
active_gear     : s_gears := 0;
s_cmd_complete  : boolean := true;
s_loop_closed   : boolean := false;
spin_fault      : integer := 0;
s_axis_no       : integer;
chuck_max_speed : float := 20000.0;
s_min_rpm       : float := 0.0;
s_max_rpm       : float := 0.0;
s_active_dir    : s_spin_dirs := s_stop;
s_active_speed  : float := 0.0;
spin_pre        : boolean := false;
spin_post       : boolean := false;
auto_gear_decode : boolean;

PROCEDURE sp_init;    -- [1]

PROCEDURE sp_clear;   -- [2]

PROCEDURE sp_cancel;  -- [2a]

PROCEDURE sp_mcl1;    -- [3]

PROCEDURE sp_mcl2;    -- [4]

PROCEDURE spin_run;   -- [7]

END spcont;

WITH wndone;   USE wndone;
WITH mcldat;   USE mcldat;
WITH wndtwo;   USE wndtwo;
WITH wndtre;   USE wndtre;
WITH wndmth;   USE wndmth;
```

```
WITH wndstd;    USE wndstd;
WITH mcllib;    USE mcllib;
WITH gedec;     USE gedec;

PACKAGE BODY spcont IS old_cmd_spd        : float;
   ignore_css         : boolean := false;
   spin_dir           : spindle_dirs;
   use_lowest_gear    : boolean;
   time_is_acc_dec    : boolean;
   acc_dec_time       : integer;
   at_speed_time      : float;

TYPE s_cont_states IS (s_setup, s_at_speed, s_psn_loop, s_psn_loop_wait);
   spin_cont_state    : s_cont_states := s_setup;

s_is_rpm           : boolean;
   s_format           : integer;
   s_fh_control       : boolean;
   s_up_to_speed_in   : integer;
   s_at_speed_level   : boolean;
   s_stop_level       : boolean;
   s_stop_in          : integer;

TYPE speed_indicate IS (no_s_ind, use_oem_input, use_fb);
   s_speed_indicate   : speed_indicate;

s_cw_is_plus       : boolean;
   s_ccw_is_plus      : boolean;
   max_spin_time      : integer;
   s_zro_prmt         : boolean;
   chuck_chk_prmt     : boolean;
   chuck_old          : s_chucks := 0;
   old_mode           : s_modes := s_run;
   old_aux_gear       : boolean := false;
   s_rpm_at_max_da    : float;
   s_mesh_rpm         : float;
   s_creep_rpm        : float;
   s_jog_rpm          : float;
   max_speed_limit    : float;
   max_speed_msg      : boolean := false;
   s_run_rpm          : float;
   time_to_max_da     : integer;
   temp_speed         : float;
   temp_speed_mod     : float;
   temp_rpm           : float;
   cancel_s_faults    : boolean;
   spin_style         : CONSTANT integer := 4;
   spin_priority      : CONSTANT integer := 5;

PROCEDURE spin_gear_select;   --[8]

PROCEDURE gear_table_init;    --[9]

PROCEDURE spin_run_setup;     --[10]

CEDURE sp_at_speed;        --[11]

PROCEDURE sp_psn_loop;        --[12]

PROCEDURE sp_psn_loop_wait;   --[13]

PROCEDURE sp_init IS   --[1]

BEGIN gear_table_init;
   s_is_rpm := msd_bool_table(21);
   auto_gear_decode := msd_bool_table(106);
   s_fh_control := msd_bool_table(107);
   s_cw_is_plus := msd_bool_table(100);
   s_ccw_is_plus := msd_bool_table(101);
   s_zro_prmt := msd_bool_table(109);
   chuck_chk_prmt := msd_bool_table(110);
   cancel_s_faults := msd_bool_table(111);
   time_is_acc_dec := msd_bool_table(112);
   use_lowest_gear := msd_bool_table(113);
   s_up_to_speed_in := msd_int_table(102);
   IF s_up_to_speed_in < 0
      THEN
         s_up_to_speed_in := - s_up_to_speed_in;
         s_at_speed_level := false;
      ELSE
```

```
         s_at_speed_level := true;
   END IF;
   s_stop_in := msd_int_table(101);
   IF s_stop_in < 0
      THEN
         s_stop_in := - s_stop_in;
         s_stop_level := false;
      ELSE
         s_stop_level := true;
   END IF;
   s_axis_no := msd_int_table(100);
   max_spin_time :=(msd_int_table(110) * 100);
   chuck_max_speed := msd_float_table(180);
   s_format := msd_int_table(2);
   chuck_actv := 1;
   IF msd_bool_table(108)
      THEN
         IF s_up_to_speed_in = 0
            THEN
               s_speed_indicate := use_fb;
            ELSE
               s_speed_indicate := use_oem_input;
         END IF;
      ELSE
         s_speed_indicate := no_s_ind;
   END IF;
   old_cmd_spd := float_0;

sp_init;

PROCEDURE sp_clear IS   --[2]

BEGIN

IF spin_fault /= 0
      THEN
         kill_msg(spin_fault);
         spin_fault := 0;
   END IF;
   max_speed_msg := false;
   spin_cont_state := s_setup;
   s_cmd_complete := true;
   IF (auto_gear_decode) AND (active_gear /= 0)
      THEN
         commanded_gear := active_gear;
   END IF;
   spin_pre := false;
   spin_post := false;
   prelude_off_ge(s_pre);
   blk_post_off_ge(s_post);
   prog_s := float_0;
   clear_nc_s_data;

END sp_clear;

PROCEDURE sp_cancel IS  --[2a]

BEGIN

IF (cancel_s_faults) AND (spin_fault /= 0)
      THEN
         sp_clear;
   END IF;

END sp_cancel;

PROCEDURE sp_mcll IS   --[3]
offset_max_msd : integer;
max_spd_offset : integer;
gr_index : integer;
min_grchg_st : boolean;
gear_found : boolean;

BEGIN

IF nc_status(spin_speed_enc) OR (aux_gear_sel /= old_aux_gear)
      THEN
         IF s_is_rpm
            THEN
               IF nc_status(spin_speed_enc)
                  THEN
                     prog_s := s_code;
                     s_active_speed := - 1.0;
                     s_strobe := true;
               END IF;
--             IF s_format < 50
```

```
                        THEN
                    IF auto_gear_decode
                      THEN
                        IF aux_gear_sel
                          THEN
                            offset_max_msd := 148;
                          ELSE
                            offset_max_msd := 112;
                        END IF;
                        IF use_lowest_gear
                          THEN
                            gr_index := 0;
                          ELSE
                            gr_index := commanded_gear - 1;
                            min_grchg_st := true;
                        END IF;
                        gear_found := false;
                        WHILE (NOT gear_found) AND (gr_index < 6)
                          LOOP
                            max_spd_offset :=(offset_max_msd + (gr_index * 6));
                            IF ((msd_float_table(max_spd_offset) >= prog_s) AND
                                (msd_float_table(max_spd_offset - 1) <= prog_s))
                              THEN
                                gear_found := true;
                                gr_index := gr_index + 1;
                              ELSE
                                IF (NOT use_lowest_gear) AND (min_grchg_st)
                                  THEN
                                    gr_index := 0;
                                    min_grchg_st := false;
                                  ELSE
                                    gr_index := gr_index + 1;
                                END IF;
                            END IF;
                        END LOOP;
                        IF gear_found
                          THEN
                            commanded_gear := gr_index;
                        END IF;
                    END IF;
--              ELSE
--                  commanded_gear := 0;
--                  WHILE (prog_s >= 10000.0)
--                    LOOP
--                      prog_s := prog_s - 10000.0;
                        commanded_gear := commanded_gear + 1;
                    END LOOP;
                END IF;
        END IF;
      ELSE
          s_strobe := false;
      END IF;

END sp_mcl1;

PROCEDURE sp_mcl2 IS  --[4]

BEGIN

CASE spin_cont_state IS
    WHEN s_psn_loop_wait =>
      sp_psn_loop_wait;
    WHEN s_psn_loop =>
      sp_psn_loop;
    WHEN s_at_speed =>
      sp_at_speed;
    WHEN s_setup =>
      IF spindle_enable
        THEN
          IF NOT (s_close_loop OR s_loop_closed)
            THEN
              IF old_mode /= s_mode
                THEN
                  old_mode := s_mode;
                  IF s_mode /= s_run
                    THEN
                      blk_post_on_ge(s_post);
                      spin_post := true;
                      ignore_css := true;
                    ELSE
                      ignore_css := false;
                      IF spin_fault = 0
                        THEN
                          blk_post_off_ge(s_post);
                          spin_post := false;
```

```
                            END IF;
                        END IF;
                    END IF;
                    IF chuck_chk_prmt AND nc_status(reqd_ref_done)
                        THEN
                            IF chuck_actv /= chuck_old
                                THEN
                                    IF (chuck_actv = 0) OR (chuck_actv > 10)
                                        THEN
                                            chuck_actv := 1;
                                    END IF;
                                    chuck_old := chuck_actv;
                                    chuck_max_speed := msd_float_table(179 + chuck_actv);
                                    spin_gear_select;
                                    chuck_selected(chuck_actv);
                            END IF;
                    END IF;
                    CASE s_mode IS
                        WHEN s_hold =>
                            s_cmd_dir := s_stop;
                            s_cmd_speed := float_0;
                        WHEN s_mesh =>
                            s_cmd_dir := man_spin_dir;
                            s_cmd_speed := s_mesh_rpm;
                        WHEN s_creep =>
                            s_cmd_dir := man_spin_dir;
                            s_cmd_speed := s_creep_rpm;
                        WHEN s_jog =>
                            s_cmd_dir := man_spin_dir;
                            s_cmd_speed := s_jog_rpm;
                        WHEN s_run =>
                            s_cmd_dir := prog_spin_dir;
                            s_cmd_speed := prog_s;
                    END CASE;
                    IF (selected_gear /= active_gear) OR (aux_gear_sel /= old_aux_gear
                      )
                        THEN
                            spin_gear_select;
                    END IF;
                    IF (s_cmd_dir /= s_active_dir)
                        THEN
                            spin_run_setup;
                    ELSE
                        IF ((s_cmd_dir /= s_stop) AND (s_cmd_speed /= s_active_speed))
                            THEN
                                spin_run_setup;
                        END IF;
                    END IF;
            ELSE
                IF s_close_loop /= s_loop_closed
                    THEN
                        start_timer_ge(spin_time, max_spin_time);
                        spin_cont_state := s_psn_loop;
                        blk_post_on_ge(s_post);
                        spin_post := true;
                        reqed_normal_run;
                END IF;
            END IF;
        END IF;
    END CASE;

END sp_mcl2;

PROCEDURE spin_run IS  --[7]
speed_error : boolean;

BEGIN

CASE s_cmd_dir IS
        WHEN s_stop =>
            spin_dir := spin_stop;
            s_cmd_speed := float_0;
        WHEN s_ccw =>
            IF s_ccw_is_plus
                THEN
                    spin_dir := spin_pos;
            ELSE
                    spin_dir := spin_neg;
            END IF;
        WHEN s_cw =>
            IF s_cw_is_plus
                THEN
                    spin_dir := spin_pos;
            ELSE
                    spin_dir := spin_neg;
            END IF;
    END CASE;
```

```
speed_error := false;
IF s_mode = s_run
   THEN
      IF (NOT nc_status(css_active)) AND (s_cmd_dir /= s_stop)
         THEN
            IF s_cmd_speed > max_speed_limit
               THEN
                  speed_error := true;
               ELSE
                  IF ((s_cmd_speed < s_min_rpm) AND ((s_cmd_speed > float_0) OR
                     ((s_cmd_speed < 0.1) AND (NOT s_zro_prmt))))
                     THEN
                        speed_error := true;
                  END IF;
            END IF;
      END IF;
END IF;
IF speed_error
   THEN
      IF NOT max_speed_msg
         THEN
            max_speed_msg := true;
            spin_fault := 6991;
            put_msg(spin_fault, spin_priority, spin_style);
      END IF;
      spin_cont_state := s_setup;
   ELSE
      start_timer_ge(spin_time, max_spin_time);
      s_run_rpm :=(s_cmd_speed / s_rpm_at_max_da);
      IF s_axis_no = 0
         THEN
            spin_ioc_run(s_run_rpm, spin_dir, ignore_css);
         ELSE
            spin_axis_run(s_run_rpm, spin_dir, acc_dec_time, ignore_css);
      END IF;
      s_active_dir := s_cmd_dir;
      s_active_speed := s_cmd_speed;
END IF;
s_cmd_complete := false;

END spin_run;

PROCEDURE spin_gear_select IS   --[8]
   base_offset : integer;

BEGIN

IF (spin_fault = 0)
      THEN
         base_offset :=(selected_gear * 6);
         IF aux_gear_sel
            THEN
               base_offset :=(138 + base_offset);
            ELSE
               base_offset :=(102 + base_offset);
         END IF;
         old_aux_gear := aux_gear_sel;
         IF (selected_gear < 1) OR (selected_gear > 6)
            THEN
               spin_fault := 6990;
               put_msg(spin_fault, spin_priority, spin_style);
               blk_post_on_ge(s_post);
               spin_post := true;
               commanded_gear := active_gear;
               selected_gear := active_gear;
            ELSE
               s_rpm_at_max_da := msd_float_table(base_offset + 5);
               s_mesh_rpm := msd_float_table(base_offset);
               s_creep_rpm := msd_float_table(base_offset + 1);
               s_jog_rpm := msd_float_table(base_offset + 2);
               s_min_rpm := msd_float_table(base_offset + 3);
               s_max_rpm := msd_float_table(base_offset + 4);
               time_to_max_da := msd_int_table(102 + selected_gear);
               IF time_is_acc_dec
                  THEN
                     acc_dec_time := time_to_max_da;
                  ELSE
                     acc_dec_time := 0;
               END IF;
               at_speed_time := int_to_float(time_to_max_da * 100);
               IF s_max_rpm > chuck_max_speed
                  THEN
                     max_speed_limit := chuck_max_speed;
                  ELSE
                     max_speed_limit := s_max_rpm;
               END IF;
```

```
                min_max_rpm(s_min_rpm, max_speed_limit, s_rpm_at_max_da);
                active_gear := selected_gear;
                spin_run_setup;
          END IF;
    END IF;

END spin_gear_select;

PROCEDURE gear_table_init IS   --[9]

BEGIN s_rpm_at_max_da := float_0;
    s_mesh_rpm := float_0;
    s_creep_rpm := float_0;
    s_jog_rpm := float_0;
    s_min_rpm := float_0;
    s_max_rpm := float_0;
    time_to_max_da := 0;

END gear_table_init;

PROCEDURE spin_run_setup IS   --[10]
new_cmd_spd : float;
speed_diff : float;

BEGIN new_cmd_spd := s_cmd_speed;
    IF (s_cmd_dir = s_ccw)
      THEN
        new_cmd_spd := - new_cmd_spd;
    ELSIF (s_cmd_dir = s_stop)
      THEN
        new_cmd_spd := float_0;
    END IF;
    speed_diff :=(new_cmd_spd - old_cmd_spd);
    IF speed_diff < float_0
      THEN
        speed_diff := - speed_diff;
    END IF;
    start_timer_ge(s_speed_timer, round((speed_diff / s_rpm_at_max_da) *
                   at_speed_time));
    old_cmd_spd := new_cmd_spd;
    IF (s_fh_control) AND NOT s_speed_ovride AND (s_cmd_dir /= s_stop) AND
       ((NOT nc_status(traverse_active)) OR ((opt_control = mc) AND
       (NOT active_g_code(80))))
      THEN
        prelude_on_ge(s_pre);
        spin_pre := true;
    END IF;
    blk_post_on_ge(s_post);
    spin_post := true;
    spin_cont_state := s_at_speed;
    reqed_normal_run;
    spin_run;

END spin_run_setup;

PROCEDURE sp_at_speed IS   --[11]

BEGIN

IF NOT s_speed_ovride AND NOT nc_status(css_active)
      THEN
        IF (s_active_dir /= s_stop) OR ((s_active_dir = s_stop) AND
           (s_stop_in = 0))
          THEN
            CASE s_speed_indicate IS
              WHEN no_s_ind =>
                IF NOT timer_running_ge(s_speed_timer)
                  THEN
                    s_cmd_complete := true;
                END IF;
              WHEN use_oem_input =>
                IF (ldIn(s_up_to_speed_in) = s_at_speed_level) AND NOT
                   timer_running_ge(s_speed_timer)
                  THEN
                    s_cmd_complete := true;
                END IF;
              WHEN use_fb =>
                IF NOT timer_running_ge(s_speed_timer)
                  THEN
                    temp_speed :=(nc_sso_value * s_active_speed);
                    temp_rpm := spindle_rpm;
```

```
                    temp_speed_mod :=((temp_speed * 0.2) + 5.0);
                    IF temp_speed < float_10
                       THEN
                          IF temp_rpm < 12.0
                             THEN
                                s_cmd_complete := true;
                             END IF;
                       ELSE
                          IF (temp_rpm < (temp_speed_mod + temp_speed)) AND
                             (temp_rpm > (temp_speed - temp_speed_mod))
                             THEN
                                s_cmd_complete := true;
                             END IF;
                       END IF;
                 END CASE;
              ELSE
                 IF (ldin(s_stop_in) = s_stop_level) AND (NOT timer_running_ge
                     (s_speed_timer))
                    THEN
                       s_cmd_complete := true;
                    END IF;
              END IF;
           ELSE
              s_cmd_complete := true;
           END IF;
           IF NOT s_cmd_complete
              THEN
                 IF NOT timer_running_ge(spin_time)
                    THEN
                       spin_fault := 6992;
                       spin_cont_state := s_setup;
                       put_msg(spin_fault, spin_priority, spin_style);
                    END IF;
              ELSE
                 IF (spin_fault = 0)
                    THEN
                       prelude_off_ge(s_pre);
                       spin_pre := false;
                       IF old_mode = s_run
                          THEN
                             blk_post_off_ge(s_post);
                             spin_post := false;
                          END IF;
                    END IF;
                 spin_cont_state := s_setup;
              END IF;
           reqed_normal_run;

END sp_at_speed;

PROCEDURE sp_psn_loop IS  --[12]

BEGIN

IF (spin_fault = 0)
              THEN
                 IF s_axis_no > 0
                    THEN
                       IF s_close_loop
                          THEN
                             IF spindle_rpm < float_10
                                THEN
                                   CASE close_psn_loop(s_axis_no) IS
                                      WHEN success =>
                                         spin_cont_state := s_psn_loop_wait;

WHEN busy | failure =>
                                         NULL;
                                   END CASE;
                                ELSE
                                   IF NOT timer_running_ge(spin_time)
                                      THEN
                                         spin_fault := 6993;
                                         put_msg(spin_fault, spin_priority, spin_style);
                                      END IF;
                                END IF;
                          ELSE
                             IF axis_inposition(s_axis_no)
                                THEN
                                   CASE open_psn_loop(s_axis_no, true, false) IS
                                      WHEN success =>
                                         spin_cont_state := s_psn_loop_wait;
                                      WHEN busy | failure =>
                                         NULL;
                                   END CASE;
```

```
                END IF;
            END IF;
            reqed_normal_run;
        ELSE
            spin_fault := 6994;
            put_msg(spin_fault, spin_priority, spin_style);
        END IF;
    END IF;

END sp_psn_loop;

PROCEDURE sp_psn_loop_wait IS   --[13]

BEGIN

CASE axis_status(s_axis_no) IS
        WHEN request_rejected =>
            spin_fault := 6995;
            spin_cont_state := s_setup;
            put_msg(spin_fault, 4, 4);
        WHEN action_cancelled =>
            spin_cont_state := s_setup;
        WHEN action_complete =>
            s_loop_closed := s_close_loop;
            spin_cont_state := s_setup;
            blk_post_off_ge(s_post);
            spin_post := false;
        WHEN OTHERS =>
            NULL;
    END CASE;
    reqed_normal_run;

END sp_psn_loop_wait;

END spcont;

-- tgcomp package specification

PACKAGE tgcomp IS   -- start of tgcomp package specification

PROCEDURE tgcomp_init;   -- initialization of temperature growth

PROCEDURE tgcomp_main;   -- mcl temperature growth logic
--
--
old_temp_adc     : integer;
--

END tgcomp;   -- end of tgcomp package specification

-- package body tgcomp

WITH wndone;    USE wndone;
WITH mcldat;    USE mcldat;
WITH wndtwo;    USE wndtwo;

PACKAGE BODY tgcomp IS   -- start of tgcomp package body
-- max_jitter       : CONSTANT integer := 3;
--

PROCEDURE tgcomp_init IS   -- start of tgcomp_init
--

BEGIN old_temp_adc := ain(optional_pot_1);
    enter_temp_comp(old_temp_adc);

END tgcomp_init;   -- end of tgcomp_init
--

PROCEDURE tgcomp_main IS   -- start of tgcomp_main jitter : integer;
temp_adc : integer;

BEGIN temp_adc := ain(optional_pot_1);
    IF (temp_adc /= old_temp_adc)
        THEN
            IF temp_adc > old_temp_adc
                THEN
```

```
            jitter := temp_adc - old_temp_adc;
    ELSE
            jitter := old_temp_adc - temp_adc;
    END IF;

IF jitter > max_jitter
      THEN
          old_temp_adc := temp_adc;
          enter_temp_comp(temp_adc);
    END IF;
  END IF;

END tgcomp_main;   -- end of tgcomp_main

END tgcomp;   -- end of tgcomp package body

-- tool package specification

PACKAGE tool IS   -- start of tool package specification

POT_POSITION : FLOAT := 0.0;
ABS_DIST_TO_GO : FLOAT := 0.0;
TYPE DIRECTION IS (plu,min);
RESOLVER_OFFSET,SLOWDOWN_ZONE,IN_POS_ZONE,DIST_TO_GO : FLOAT := 0.0;
TOL_ERR : BOOLEAN := FALSE;
TYPE TOOL_ENUM IS (IDLE,MOVE,SLOW,STOP,CMPLETE,ERROR);
TOOL_STATE : TOOL_ENUM := IDLE;
OLD_CMD : FLOAT := 0.0;
TOOL_MOT_PMT : BOOLEAN := FALSE;
TOOL_ERR_MSG : BOOLEAN := FALSE;
TOOL_IN_POS  : BOOLEAN := FALSE;

PROCEDURE tool_init;   -- machine function initialization procedure

PROCEDURE tool_clear;   -- machine function clear procedure

PROCEDURE tool_cancel;   -- machine function cancel procedure

PROCEDURE tool_main;   -- machine function logic procedure

FUNCTION PATH RETURN DIRECTION;

END tool;   -- end of tool package specification

-- package body TOOL

WITH wndone;    USE wndone;
WITH mcldat;    USE mcldat;
WITH mcllib;    USE mcllib;
WITH WNDTWO;    USE WNDTWO;
WITH WNDMTH;    USE WNDMTH;
WITH OEMDEC;    USE OEMDEC;
WITH REL5;      USE REL5;
WITH WNDTRE;    USE WNDTRE;

PACKAGE BODY tool IS   -- start of tool package body

LEFT_AXIS_NO      : CONSTANT INTEGER := 7;
RIGHT_AXIS_NO     : CONSTANT INTEGER := 8;
COUNTS_PER_REV    :   FLOAT;  --   NUMBER OF FEEDBACK COUNTS PER REVOLUTION
STOP_COUNTS       : FLOAT := 0.0;
AXIS_POS_ERROR    : CONSTANT INTEGER := 6153;
TRACK_LEFT        : BOOLEAN := FALSE;   -- FLAG USED TO TURN ON AXIS TRACK_LEFTING
TRACK_RIGHT       : BOOLEAN := FALSE;
STEP_LEFT         : INTEGER;
STEP_RIGHT        : INTEGER;
ASK_LEFT          : INTEGER := 0;
ASK_RIGHT         : INTEGER := 0;
TRACK_LEFT_MSG    : BOOLEAN := FALSE;
TRACK_RIGHT_MSG   : BOOLEAN := FALSE;

-----------------------------------------------------------------

PROCEDURE tool_init IS   -- start of tool_init

BEGIN

COUNTS_PER_REV := MSD_AXIS_FLOAT(LEFT_AXIS_NO,AXIS_5);

END tool_init;   -- end of tool_init
```

```
PROCEDURE tool_clear IS   -- start of tool_clear

BEGIN

AXIS_STATE  := IDLE;
   AXIS_CHECK  := FALSE;
   TRACK_LEFT  := FALSE;
   TRACK_RIGHT := FALSE;

END tool_clear;   -- end of tool_clear

PROCEDURE tool_cancel IS   -- start of tool_cancel

BEGIN

NULL;

END tool_cancel;   -- end of tool_cancel

PROCEDURE tool_main IS   -- start of tool_main

BEGIN

IF TRACK_LEFT_MSG OR AXIS_ERR_MSG THEN AXIS_LEFT_ERR := TRUE;
ELSE AXIS_LEFT_ERR := FALSE;
END IF;

IF TRACK_RIGHT_MSG OR AXIS_ERR_MSG THEN AXIS_RIGHT_ERR := TRUE;
ELSE AXIS_RIGHT_ERR := FALSE;
END IF;

--*****************************************************************
--*              AXIS TRACK_LEFTING IS COMMANDED HERE              *
--*****************************************************************
IF NC_STATUS(SERVO_STOP_ACTV) THEN
     TRACK_LEFT := FALSE;
       ASK_LEFT := 0;
         IF TRACK_LEFT_MSG THEN TRACK_LEFT_MSG := FALSE;
            KILL_MSG(6603);
         END IF;

ELSIF NOT TRACK_LEFT THEN   -- IF THE AXIS ISN'T TRACK_LEFTING
    IF TRACK_LEFTING_ON(LEFT_AXIS_NO) = SUCCESS  THEN  -- COMMAND TRACK_LEFTING
       TRACK_LEFT := TRUE;
       ASK_LEFT := 0;
       IF TRACK_LEFT_MSG THEN TRACK_LEFT_MSG := FALSE;
          KILL_MSG(6603);
       END IF;
    ELSE ASK_LEFT := ASK_LEFT + 1;
         IF ASK_LEFT = 101 THEN ASK_LEFT := 100;
             IF NOT TRACK_LEFT_MSG THEN PUT_MSG(6603,5,5);
                TRACK_LEFT_MSG := TRUE;
             END IF;
         END IF;
    END IF;
END IF;

IF NC_STATUS(SERVO_STOP_ACTV) THEN
    TRACK_RIGHT := FALSE;
      ASK_RIGHT := 0;
        IF TRACK_RIGHT_MSG THEN TRACK_RIGHT_MSG := FALSE;
           KILL_MSG(6604);
        END IF;

ELSIF NOT TRACK_RIGHT THEN   -- IF THE AXIS ISN'T TRACK_LEFTING
    IF TRACK_LEFTING_ON(RIGHT_AXIS_NO) = SUCCESS  THEN  -- COMMAND TRACKING
       TRACK_RIGHT := TRUE;
       ASK_RIGHT := 0;
       IF TRACK_RIGHT_MSG THEN TRACK_RIGHT_MSG := FALSE;
         KILL_MSG(6604);
       END IF;
    ELSE ASK_RIGHT := ASK_RIGHT + 1;
         IF ASK_RIGHT = 101 THEN ASK_RIGHT := 100;
             IF NOT TRACK_RIGHT_MSG THEN PUT_MSG(6604,5,5);
                TRACK_RIGHT_MSG := TRUE;
             END IF;
         END IF;
    END IF;
END IF;

--*****************************************************************
```

```
--*            OPERATOR SAFETY LOGIG RESIDES HERE                      *
--***********************************************************************

IF NOT LDIN(AXIS_DOOR_CSD_SW) THEN -- INHIBIT THE AXISS
       AXIS_MOT_PMT := FALSE;
         DOOR_OPEN := TRUE;
       IF NOT DOOR_MSG THEN   -- AND PUT UP A MESSAGE
          PUT_MSG(AXIS_DOOR_MSG,5,5);
          DOOR_MSG := TRUE;
       END IF;
   ELSE        -- ALLOW MOTION
       AXIS_MOT_PMT := TRUE;
       IF DOOR_MSG THEN    -- TAKE DOWN THE MESSAGE
          KILL_MSG(AXIS_DOOR_MSG);
            DOOR_OPEN := FALSE;
          DOOR_MSG := FALSE;
       END IF;
   END IF;
   IF NC_STATUS(SERVO_STOP_ACTV) OR NC_STATUS(FDHOLD_LT_ON)
   THEN   --   IF SERVO STOP OR FEEDHOLD THEN STOP THE AXISS
   AXIS_MOT_PMT := FALSE;
   END IF;

--***********************************************************************
--*                  DETERMIN VARITABLES TO BE USED                      *
--***********************************************************************

STOP_COUNTS              :=       MSD_FLOAT_TABLE(255);
   NO_OF_AXISS              :=       MSD_FLOAT_TABLE(250);
   RESOLVER_OFFSET          := MSD_FLOAT_TABLE(251);        -- USED FOR SETUP
   DIST_BETWEEN_AXIS        :=       COUNTS_PER_REV / NO_OF_AXISS;
   SLOWDOWN_ZONE            :=       DIST_BETWEEN_AXIS * MSD_FLOAT_TABLE(252);
   IN_POS_ZONE              :=       DIST_BETWEEN_AXIS * MSD_FLOAT_TABLE(253);
   AXIS_POSITION_LEFT       :=       FDBK_DEVICE_PSN(LEFT_AXIS_NO,FALSE) +
   LEFT_RESOLVER_OFFSET;
   IF AXIS_POSITION <  0.0  THEN            -- MAKE SHURE POSITION DOESN'T GO NEGATI
       AXIS_POSITION:= AXIS_POSITION + COUNTS_PER_REV;
   ELSIF
       AXIS_POSITION > COUNTS_PER_REV THEN --  MAKE SHURE IT DOESNT EXCEED THE COUNT
       AXIS_POSITION := AXIS_POSITION - COUNTS_PER_REV;
   END IF;
   CMD_AXIS_POS     :=      (AXIS_CMD - 1.0) * (COUNTS_PER_REV / NO_OF_AXISS);
   IF AXIS_POSITION <= COUNTS_PER_REV / 2.0 THEN
       DIST_TO_GO   :=      CMD_AXIS_POS - AXIS_POSITION;
   ELSE
       DIST_TO_GO := AXIS_POSITION - CMD_AXIS_POS;
   END IF;
   IF DIST_TO_GO < 0.0   THEN
       ABS_DIST_TO_GO := DIST_TO_GO * (-1.0);
   ELSE
       ABS_DIST_TO_GO := DIST_TO_GO;
   END IF;
   IF ABS_DIST_TO_GO > COUNTS_PER_REV / 2.0 THEN
       ABS_DIST_TO_GO := COUNTS_PER_REV - ABS_DIST_TO_GO;
   END IF;

IF OLD_CMD = 0.0 THEN   -- POSITION THE AXISS TO THE NEAREST POSITION ON POWER UP
       AXIS_CMD := AXIS_POSITION / DIST_BETWEEN_AXIS;
       STEP_LEFT := ROUND(AXIS_CMD);   -- ROUND OFF THE AXIS POSITION
       AXIS_CMD := INT_TO_FLOAT(STEP_LEFT) +1.0;
       OLD_CMD := NO_OF_AXISS + 1.0;
   END IF;

IF AXIS_MOT_PMT AND TRACK_LEFT AND NOT AXIS_CHG_ACTIVE       -- INHIBIT IF NOT R
       AND (AXIS_STATE /= STOP) AND (AXIS_STATE /= CMPLETE) THEN
    IF (ABS_DIST_TO_GO - (DIST_BETWEEN_AXIS / 4.0)) < SLOWDOWN_ZONE THEN
     IF RDIN(AXIS_INDEX_CW_PB) OR LDIN(CARSL_CW_SS) THEN -- COMMAND A CW INDEX
         AXIS_CMD := AXIS_CMD + 1.0;
     ELSIF
         RDIN(AXIS_INDX_CCW_PB) OR LDIN(CARSL_CCW_SS) THEN
         AXIS_CMD := AXIS_CMD - 1.0;
     END IF;
    END IF;

IF AXIS_CMD > NO_OF_AXISS THEN   -- CHECK MAXIMUM AXIS COMMAND
       AXIS_CMD := 1.0;
   ELSIF
       AXIS_CMD = 0.0 THEN
       AXIS_CMD := NO_OF_AXISS;       -- CHEAK FOR MINIMUM
   END IF;
   END IF;
--***********************************************************************
--      AXIS CASE STATEMENT FOLLOWS AND TAKES CARE OF ALL STATES
--***********************************************************************
```

```
CASE AXIS_STATE IS

WHEN IDLE       =>

IF (AXIS_CMD /= OLD_CMD) OR AXIS_CHECK  THEN
AXIS_IN_POS := FALSE;   -- REMEMBER THE MOVE POSITION IS NOW CHANGED
       AXIS_STATE := MOVE;
END IF;

WHEN MOVE       =>

REQED_NORMAL_RUN;
       AXIS_CHECK := FALSE;
       IF AXIS_MOT_PMT AND TRACK_LEFT THEN    -- DON'T ALLOW MOTION IF INHIBITED
              IF AXIS_ERR_MSG THEN-- KILL THE POSITION ERROR MESSAGE IF IT'S UP
                     KILL_MSG(AXIS_POS_ERROR);
                     AXIS_ERR_MSG := FALSE;   -- AND RESET THE ERROR FLAG
              END IF;

IF ABS_DIST_TO_GO <= IN_POS_ZONE THEN   --SEE IF IN POSITION ZONE
                     AXIS_STATE := STOP;
              ELSIF ABS_DIST_TO_GO <= SLOWDOWN_ZONE THEN   -- SEE IF IN SLOWDOWN ZONE
                     AXIS_STATE := SLOW;
              ELSIF (PATH = CW) THEN   -- SEE IF AXIS SHOULD INDEX CW
                     T_DIR := T_CW;
                     ACOUT(CAR_CW_SOL):= TRUE;
                     ACOUT(CAR_CCW_SOL):= FALSE;   -- IF SO SET THE APPROPRIATE SOLENOIDS
                     ACOUT(CAR_RAPID_SOL):= TRUE;
                     ACOUT(CAR_CLUTCH_RLY):=TRUE;
              ELSIF  (PATH =CCW) THEN   -- SEE IF AXIS SHOULD INDEX CCW
                     T_DIR := T_CCW;
                     ACOUT(CAR_CW_SOL):= FALSE;
                     ACOUT(CAR_CCW_SOL):= TRUE;   -- IF SO SET THE APPROPRIATE SOLENOIDS
                     ACOUT(CAR_RAPID_SOL):= TRUE;
                     ACOUT(CAR_CLUTCH_RLY):=TRUE;
              END IF;
       ELSE
              T_DIR := T_STOP;
              ACOUT(CAR_CW_SOL) := FALSE;
              ACOUT(CAR_CCW_SOL) :=.FALSE;   -- STOP THE AXIS RACK IF INHIBITED
              ACOUT(CAR_RAPID_SOL) := FALSE;
              ACOUT(CAR_CLUTCH_RLY) := FALSE;

END IF;

WHEN SLOW       =>

REQED_NORMAL_RUN;   -- KEEP COMMING BACK TO READ THE POSITION
              IF AXIS_MOT_PMT AND TRACK_LEFT THEN
                     IF ABS_DIST_TO_GO < STOP_COUNTS THEN  --  STOP THE AXISS WHEN IN POSI
                            AXIS_STATE := STOP;
                     ELSIF (PATH = CW) THEN      -- GO CLOCKWISE
                            T_DIR := T_CW;
                            ACOUT(CAR_CW_SOL) := TRUE;
                            ACOUT(CAR_CCW_SOL) := FALSE;
                            ACOUT(CAR_RAPID_SOL) := FALSE;
                            ACOUT(CAR_CLUTCH_RLY):= TRUE;
                     ELSIF (PATH = CCW) THEN     -- GO COUNTERCLOCKWISE
                            T_DIR := T_CCW;
                            ACOUT(CAR_CW_SOL) := FALSE;
                            ACOUT(CAR_CCW_SOL) := TRUE;
                            ACOUT(CAR_RAPID_SOL):= FALSE;
                            ACOUT(CAR_CLUTCH_RLY) := TRUE;
                     END IF;
              ELSE
                     T_DIR := T_STOP;
                     ACOUT(CAR_CW_SOL) := FALSE;   --  STOP IF INHIBITED
                     ACOUT(CAR_CCW_SOL):= FALSE;
                     ACOUT(CAR_RAPID_SOL):=FALSE;
                     ACOUT(CAR_CLUTCH_RLY) := FALSE;
              END IF;

WHEN  STOP      =>
              T_DIR := T_STOP;
              ACOUT(CAR_CW_SOL):= FALSE;
              ACOUT(CAR_CCW_SOL) := FALSE;
              ACOUT(CAR_RAPID_SOL) := FALSE;
              ACOUT(CAR_CLUTCH_RLY) := TRUE;
              START_TIMER(AXIS_SETLG_TIME,MSD_INT_TABLE(159));
              AXIS_STATE := CMPLETE;

WHEN CMPLETE    =>
              IF NOT TIMER_RUNNING(AXIS_SETLG_TIME) THEN   -- CHECK POSITION AGAIN
                     IF ABS_DIST_TO_GO > IN_POS_ZONE  THEN    -- IF ITS NO GOOD REPORT THE
              AXIS_STATE := ERROR;
                     ELSE
```

```
                AXIS_STATE := IDLE;
                OLD_CMD := AXIS_CMD;
                AXIS_IN_POS := TRUE;
            END IF;
         END IF;

WHEN ERROR       =>
            IF NOT AXIS_ERR_MSG THEN    -- PUT UP A AXIS ERROR MESSAGE
               PUT_MSG(AXIS_POS_ERROR,5,7);
               AXIS_ERR_MSG := TRUE;
            END IF;
   END CASE;
--*****************************************************************
--*          LOGIC TO CONTROL INDICATING LIGHTS RESIDES HERE       *
--*****************************************************************

RDOUT(AXIS_IND_CW_LT) := FALSE;
   RDOUT(AXIS_IND_CCW_LT) := FALSE;

IF T_DIR = T_CW THEN   ---    LIGHT THE CW PUSHBUTTON
      RDOUT(AXIS_IND_CW_LT) := TRUE;
   ELSIF T_DIR = T_CCW  THEN    -- LIGHT THE CCW PUSHBUTTON

RDOUT(AXIS_IND_CCW_LT) := TRUE;
   END IF;

END IF; --****** FROM MAIN START TO DISABLE PACKAGE ******

END tool_main;   -- end of tool_main

FUNCTION PATH RETURN DIRECTION IS     --  THIS FUNCTION DETERMINES THE CLOSEST
                                      --  PATH FOR THE AXIS.IT RETURNS CW,CCW
DIR:DIRECTION;

BEGIN
  IF AXIS_POSITION <= COUNTS_PER_REV / 2.0 THEN
    IF DIST_TO_GO > 0.0 AND DIST_TO_GO < COUNTS_PER_REV /2.0 THEN
       DIR := CW;
    ELSE
         DIR := CCW;
    END IF;
  ELSE
    IF DIST_TO_GO > 0.0 AND DIST_TO_GO < COUNTS_PER_REV / 2.0 THEN
       DIR := CCW;
     ELSE
       DIR := CW;
     END IF;
  END IF;
  RETURN DIR;
END PATH;

END tool;   -- end of tool package body

MARK CENTURY 2000 LINKER Version 1.0    -   6/4/84
OUTPUT FILE: PC.LNK
INVOKED BY:
   MCL LINKERSTDPC.LNK,  &
   FSTMCL.OBJ, &
   OEM1.OBJ,   &
   OEM2.OBJ,   &
   OEMMST.OBJ, &
   OEMDSP.OBJ, &
   OEMGRP.OBJ, &
   OEMAIN.OBJ, &
   SPCONT.OBJ, &
   maxi.OBJ,   &
   ovrtrv.OBJ, &
   PWRUP.OBJ,  &
   OEMSPN.OBJ, &
   ORIENT.OBJ, &
   MCCCY.OBJ,  &
   TGCOMP.OBJ  &
   TO PC.LNK
   ==> Pass 1 - Process Definitions
Processing input file STDPC.LNK
Processing input file FSTMCL
Processing input file OEM1
Processing input file OEM2
Processing input file OEMMST
```

```
Processing input file OEMDSP
Processing input file OEMGRP
Processing input file OEMAIN
Processing input file SPCONT
Processing input file MAXI
Processing input file OVRTRV
Processing input file PWRUP
Processing input file OEMSPN
Processing input file ORIENT
Processing input file MCCCY
Processing input file TGCOMP
==> Pass 2 - Process Code & Data
Processing input file STDPC.LNK
Processing input file FSTMCL
Processing input file OEM1
Processing input file OEM2
Processing input file OEMMST
Processing input file OEMDSP
Processing input file OEMGRP
Processing input file OEMAIN
Processing input file SPCONT
Processing input file MAXI
Processing input file OVRTRV
Processing input file PWRUP
Processing input file OEMSPN
Processing input file ORIENT
Processing input file MCCCY
Processing input file TGCOMP
SUCCESSFUL COMPLETION MARK CENTURY 2000 LOCATER Version 1.0    -   6/4/84
OUTPUT FILE: PC.SYS
INVOKED BY:

MCL LOCATER PC.LNK TO PC.SYS NOIC &
   RESERVE(0 TO 40FFFH,54800H TO FFFFFH) OBJECTCONTROLS(PURGE) &
   ORDER( SEGMENTS(DGROUP_LOCATION,DATA,CONST,STACK,HEAP,NC_DATA) ) &
   PRINTCONTROLS(PUBLICS) SORT
      Processing input file: PC
WARNING: Segment placed in RESERVED area
    Absolute segment: NC_DATA
    Address of segment: 54800H
WARNING: Segment placed in RESERVED area
    Absolute segment: NC_CODE
    Address of segment: 80000H
WARNING: Segment placed in RESERVED area
    Absolute segment: PCWINTAB
    Address of segment: 40800H
SEGMENT MAP
```

| START ADDRESS | END ADDRESS | AREA LENGTH | AREA KIND | SEGMENT .....NAME...... | CLASS .....NAME...... |
|---|---|---|---|---|---|
| 00000H | 407FFH | 40800H | *RESERVED* | | |
| 40800H | 40F16H | 00717H | ABSOLUTE | PCWINTAB | CODE |
| 40F17H | 40FFFH | 000E9H | *RESERVED* | | |
| 41000H | 41000H | 00000H | RELOCATABLE | ??SEG | |
| 41000H | 41004H | 00005H | RELOCATABLE | START_ADDRESS | CODE |
| 41005H | 4100FH | 0000BH | -- FREE -- | | |
| 41010H | 41033H | 00024H | RELOCATABLE | MCLDAT_CODE | CODE |
| 41034H | 4103FH | 0000CH | -- FREE -- | | |
| 41040H | 41325H | 002E6H | RELOCATABLE | MCLINT_CODE | CODE |
| 41326H | 4132FH | 0000AH | -- FREE -- | | |
| 41330H | 416C5H | 00396H | RELOCATABLE | MCLLIB_CODE | CODE |
| 416C6H | 416CFH | 0000AH | -- FREE -- | | |
| 416D0H | 42E08H | 01739H | RELOCATABLE | MANUAL_CODE | CODE |
| 42E09H | 42E0FH | 00007H | -- FREE -- | | |
| 42E10H | 437B7H | 009A8H | RELOCATABLE | ZERO_CODE | CODE |
| 437B8H | 437BFH | 00008H | -- FREE -- | | |
| 437C0H | 44831H | 01072H | RELOCATABLE | STDMCL_CODE | CODE |
| 44832H | 4483FH | 0000EH | -- FREE -- | | |
| 44840H | 448BFH | 00080H | RELOCATABLE | FSTMCL_CODE | CODE |
| 448C0H | 448ECH | 0002DH | RELOCATABLE | OEM1_CODE | CODE |
| 448EDH | 448EFH | 00003H | -- FREE -- | | |
| 448F0H | 44924H | 00035H | RELOCATABLE | OEM2_CODE | CODE |
| 44925H | 4492FH | 0000BH | -- FREE -- | | |
| 44930H | 44AFBH | 001CCH | RELOCATABLE | OEMMST_CODE | CODE |
| 44AFCH | 44AFFH | 00004H | -- FREE -- | | |
| 44B00H | 4531DH | 0081EH | RELOCATABLE | OEMDSP_CODE | CODE |
| 4531EH | 4531FH | 00002H | -- FREE -- | | |
| 45320H | 45341H | 00022H | RELOCATABLE | OEMGRP_CODE | CODE |
| 45342H | 4534FH | 0000EH | -- FREE -- | | |
| 45350H | 45740H | 003F1H | RELOCATABLE | OEMAIN_CODE | CODE |
| 45741H | 4574FH | 0000FH | -- FREE -- | | |
| 45750H | 464D1H | 00D82H | RELOCATABLE | SPCONT_CODE | CODE |

| | | | | | | |
|---|---|---|---|---|---|---|
| 464D2H | 464DFH | 0000EH | -- FREE -- | | | |
| 464E0H | 46E12H | 00933H | RELOCATABLE | MAXI_CODE | CODE | |
| 46E13H | 46E1FH | 0000DH | -- FREE -- | | | |
| 46E20H | 471D3H | 003B4H | RELOCATABLE | OVRTRV_CODE | CODE | |
| 471D4H | 471DFH | 0000CH | -- FREE -- | | | |
| 471E0H | 47221H | 00042H | RELOCATABLE | PWRUP_CODE | CODE | |
| 47222H | 4722FH | 0000EH | -- FREE -- | | | |
| 47230H | 47585H | 00356H | RELOCATABLE | OEMSPN_CODE | CODE | |
| 47586H | 4758FH | 0000AH | -- FREE -- | | | |
| 47590H | 47AD1H | 00542H | RELOCATABLE | ORIENT_CODE | CODE | |
| 47AD2H | 47ADFH | 0000EH | -- FREE -- | | | |
| 47AE0H | 47DA5H | 002C6H | RELOCATABLE | MCCCY_CODE | CODE | |
| 47DA6H | 47DAFH | 0000AH | -- FREE -- | | | |
| 47DB0H | 47E1EH | 0006FH | RELOCATABLE | TGCOMP_CODE | CODE | |
| 47E1FH | 52FFFH | 0B1E1H | -- FREE -- | | | |
| 53000H | 53000H | 00000H | ABSOLUTE | DGROUP_LOCATION | START_DATA | |
| 53000H | 53519H | 0051AH | ABSOLUTE | DATA | DATA | |
| 5351AH | 536B1H | 00198H | ABSOLUTE | CONST | CONST | |
| 536B2H | 536B2H | 00000H | ABSOLUTE | STACK | STACK | |
| 536B2H | 536B2H | 00000H | ABSOLUTE | HEAP | HEAP | |
| 536B2H | 547FFH | 0114EH | -- FREE -- | | | |
| 54800H | 55071H | 00872H | ABSOLUTE | NC_DATA | END_DATA | |
| 55072H | 7FFFFH | 2AF8EH | *RESERVED* | | | |
| 80000H | 80000H | 00000H | ABSOLUTE | NC_CODE | CODE | |
| 80000H | FFFFFH | 80000H | *RESERVED* | | | |

GROUP MAP

| GROUP ADDRESS | GROUP NAME | MODULE NAME | SEGMENT NAMES |
|---|---|---|---|
| 53000H | DGROUP | PCTONC | |

PUBLICS MAP

| BASE | OFFSET | ...PUBLIC NAME.. | BASE | OFFSET | ...PUBLIC NAME.. |
|---|---|---|---|---|---|
| 4080H | 04B5H | ABSRQQ | 5480H | 066AH | ACIN |
| 5480H | 06F2H | ACOUT | 5480H | 06AAH | ACRISE |
| 4080H | 0690H | ACTIVE_CC_AX_NUM | 4080H | 0050H | ACTIVE_CSS_LIMIT |
| 4080H | 0055H | ACTIVE_CSS_RPM | 4080H | 005AH | ACTIVE_DISP_PAGE |
| 4080H | 005FH | ACTIVE_FEEDRATE | 5300H | 03A6H | ACTIVE_GEAR |
| 4080H | 0064H | ACTIVE_G_CODE | 5300H | 0152H | ACTIVE_JOG_DIR |
| 5300H | 0176H | ACTIVE_JOG_RATE | 5300H | 01D6H | ACTIVE_JOG_STAT |
| 5300H | 016AH | ACTIVE_JOG_TYPE | 5300H | 010EH | ACTIVE_TOOL |
| 5300H | 0244H | ACTUAL_AXES | 4080H | 004BH | ACT_SEQUENCE_NUM |
| 5480H | 06EAH | ACXOR | 4080H | 04BAH | ADDRQQ |
| 4080H | 04BFH | ADDSQQ | 4080H | 0069H | ADD_TABLE_FLOAT |
| 4080H | 006EH | ADD_TABLE_INT | 5480H | 01F0H | AIN |
| 4080H | 061DH | AIO_READ | 4080H | 0622H | AIO_READ_SETUP |
| 4080H | 0627H | AIO_WRITE | 4080H | 062CH | AIO_WRITE_SETUP |
| 5480H | 058AH | ANIN | 4080H | 04C4H | ANNRQQ |
| 5480H | 05CAH | ANOUT | 4080H | 0073H | ARCCOS |
| 4080H | 0078H | ARCSIN | 4080H | 007DH | ARCTAN |
| 4080H | 04C9H | ASMGQQ | 4080H | 04CEH | ASNGQQ |
| 4080H | 04D3H | AT2RQQ | 4080H | 0082H | AT_ERROR_LIMIT |
| 5300H | 03D6H | AUTO_GEAR_DECODE | 4080H | 0087H | AUTO_MODE_SELECT |
| 5300H | 0384H | AUX_GEAR_SEL | 4080H | 066BH | AUX_MFO_VALUE |
| 5300H | 004CH | AXIS_BUTTONS | 4080H | 008CH | AXIS_FDBK_PSN |
| 4080H | 0703H | AXIS_GP_TRANSFER | 4080H | 0091H | AXIS_INPOSITION |
| 4080H | 0096H | AXIS_INTEGRAND | 4080H | 009BH | AXIS_INZONE |
| 4080H | 00A0H | AXIS_LAG | 5300H | 0080H | AXIS_LIGHTS |
| 4080H | 00A5H | AXIS_MOVE_ABS | 4080H | 00AAH | AXIS_MOVE_FORCED |
| 4080H | 0708H | AXIS_MOVE_PRG | 4080H | 00AFH | AXIS_MOVING |
| 5300H | 0488H | AXIS_OT_INPUT | 4080H | 00B4H | AXIS_OUT_OF_SYNC |
| 4080H | 00B9H | AXIS_REFERENCED | 4080H | 0618H | AXIS_REP_COUNT |
| 4080H | 00BEH | AXIS_STATUS | 4080H | 00C3H | AXIS_STOP |
| 4535H | 0001H | AX_ON_REFERENCE | 4080H | 00C8H | BCD_TO_BINARY |
| 4080H | 00CDH | BINARY_TO_BCD | 4080H | 00D2H | BLK_POST_OFF_GE |
| 4080H | 00D7H | BLK_POST_ON_GE | 4080H | 00DCH | BLOCK_DELETE_OFF |
| 4080H | 00E1H | BLOCK_DELETE_ON | 5300H | 0112H | BLOCK_DEL_STATE |
| 4080H | 00EBH | BOOLS_TO_INT | 4080H | 00E6H | BOOL_8_TO_INT |
| 4080H | 0672H | BOOT | 5300H | 0002H | BUSY_CONTACTS |
| 5300H | 001AH | BUSY_COUNT | 4080H | 00F0H | BYTE_TO_FLOAT |
| 4080H | 00F5H | CANCEL_INITIATE | 5300H | 011EH | CANCEL_IN_PROG |
| 4080H | 00FAH | CCY_MCL_STEP_NUM | 4080H | 050AH | CCY_TMR_1_PERIOD |
| 5300H | 050CH | CCY_TMR_2_PERIOD | 4080H | 04D8H | CEQRQQ |
| 4080H | 00FFH | CHANGE_AXIS_GAIN | 4080H | 0631H | CHANGE_BACKGRND |
| 4080H | 0636H | CHANGE_DATA | 4080H | 0104H | CHANGE_EOT_LIMIT |
| 4080H | 0109H | CHANGE_ERROR_LIM | 416DH | 028CH | CHANGE_MOVE_TYPE |
| 4080H | 010EH | CHGE_IN_PSN_ZONE | 4080H | 0677H | CHG_PUNCH_TIMES |
| 4080H | 06C7H | CHR | 5300H | 038AH | CHUCK_ACTV |
| 5300H | 03B0H | CHUCK_MAX_SPEED | 4080H | 0113H | CHUCK_SELECTED |
| 4080H | 04DDH | CINSQQ | 5300H | 0464H | CLAMP_A |

| | | | | | |
|---|---|---|---|---|---|
| 5300H | 0466H | CLAMP_B | 4133H | 0371H | CLEAR_ALL_MSGS |
| 4080H | 0118H | CLEAR_INITIATE | 5300H | 011CH | CLEAR_IN_PROG |
| 4080H | 011DH | CLEAR_NC_S_DATA | 4080H | 0122H | CLEAR_TIMER |
| 4080H | 0127H | CLEAR_TIMER_GE | 4080H | 04E2H | CLERQQ |
| 4080H | 0582H | CLOSE | 4080H | 012CH | CLOSE_PSN_LOOP |
| 4080H | 069FH | CLOSE_SER_PORT | 5300H | 0120H | CLR_CAN_DONE |
| 4080H | 04E7H | CLTRQQ | 5300H | 00B4H | COMB_AX_BUTTONS |
| 5300H | 039CH | COMMANDED_GEAR | 4080H | 04ECH | CONLQQ |
| 4080H | 06B3H | CONV_CHAR_TO_FLT | 4080H | 06AEH | CONV_CHAR_TO_INT |
| 4080H | 06BDH | CONV_FLT_TO_CHAR | 4080H | 06B8H | CONV_INT_TO_CHAR |
| 4080H | 0131H | COS | 4080H | 0587H | CREATE |
| 4080H | 0136H | CSS_DISABLE | 4080H | 013BH | CSS_DISABLE_GE |
| 4080H | 0140H | CSS_ENABLE | 4080H | 0145H | CSS_ENABLE_GE |
| 5300H | 0218H | CURR_ZERO_TYPE | 4080H | 014FH | CYCLE_STOP_OFF |
| 4080H | 0154H | CYCLE_STOP_ON | 4080H | 014AH | CYC_START_INIT |
| 5300H | 0124H | CYC_ST_IS_FLASH | 4080H | 05F0H | DA_OUTPUT |
| 5480H | 0732H | DCOUT | 4080H | 06CCH | DECLUTCH_REQD |
| 4080H | 04F1H | DEICQQ | 4080H | 04F6H | DEJCQQ |
| 4080H | 06DBH | DELAY_OUTPUT | 4080H | 058CH | DELETE |
| 4080H | 0159H | DELETE_CUST_MSG | 4080H | 015EH | DELETE_FILE_MSG |
| 4080H | 04FBH | DELLQQ | 4080H | 0500H | DERCQQ |
| 4080H | 0163H | DIRECTION_NEG | 5300H | 01F4H | DIR_IS_NEG |
| 4080H | 0168H | DISABLE_AXIS | 4080H | 0505H | DISAQQ |
| 4080H | 016DH | DISP_CUST_LINE | 4080H | 0172H | DISP_FILE_MSG |
| 4080H | 0177H | DISP_PAGE_LINE | 4080H | 017CH | DISP_PAGE_RETURN |
| 4080H | 0181H | DISP_PAGE_SELECT | 4080H | 0186H | DISP_SEL_LOCK |
| 4080H | 018BH | DISP_SEL_UNLOCK | 4080H | 0190H | DISTANCE_TO_GO |
| 4080H | 0195H | DISTANCE_ZERO | 4080H | 050AH | DIVRQQ |
| 5480H | 0772H | DNC_BOOL | 5480H | 07B2H | DNC_FLT |
| 5480H | 0792H | DNC_INT | 5480H | 07DEH | DNC_STR_10 |
| 5480H | 07D2H | DNC_STR_6 | 5480H | 07F2H | DNC_STR_64 |
| 4080H | 063BH | DRAW_ARC | 4080H | 0640H | DRAW_CIRCLE |
| 4080H | 0645H | DRAW_CLEAR | 4080H | 064AH | DRAW_FILL |
| 4080H | 064FH | DRAW_LINE | 4080H | 0654H | DRAW_MOVE |
| 4080H | 0659H | DRAW_RECTANGLE | 4080H | 019AH | DRY_RUN_OFF |
| 4080H | 019FH | DRY_RUN_ON | 5300H | 0114H | DRY_RUN_STATE |
| 4080H | 01A4H | EDIT_OFF | 4080H | 01A9H | EDIT_ON |
| 5300H | 0116H | EDIT_STATE | 4080H | 01AEH | ENABLE_AXIS |
| 4080H | 06E5H | ENABLE_F_TIMERS | 4080H | 050FH | ENBCQQ |
| 4080H | 0514H | ENICQQ | 4080H | 0519H | ENRCQQ |
| 4080H | 01B3H | ENTER_TEMP_COMP | 4080H | 051EH | ENWCQQ |
| 4080H | 0523H | EQCLQQ | 4080H | 0528H | EQDLQQ |
| 4080H | 01B8H | EXP | 5480H | 01FEH | FAIN |
| 4484H | 0001H | FAST_MCL | 4080H | 01BDH | FDBK_DEVICE_PSN |
| 4080H | 01C2H | FEEDHOLD_STATUS | 5300H | 0128H | FH_IS_FLASHING |
| 5300H | 012AH | FH_IS_PULSING | 4080H | 01C7H | FILE_MSG_INSERT |
| 4133H | 0060H | FLASH | 5300H | 00C8H | FLASHING_LIGHTS |
| 4133H | 013AH | FLASH_LIGHTS | 5300H | 0276H | FLOAT_0 |
| 5300H | 027EH | FLOAT_10 | 5300H | 0286H | FLOAT_100 |
| 5300H | 028EH | FLOAT_10000 | 4080H | 01CCH | FLOAT_POWER |
| 4080H | 01D1H | FORCE_FEED_OFF | 4080H | 01D6H | FORCE_FEED_ON |
| 4080H | 01DBH | FORCE_INZONE_OFF | 4080H | 01E0H | FORCE_INZONE_ON |
| 4484H | 0075H | FSTMCL | 4080H | 05D2H | GETBUF |
| 4080H | 0596H | GETCH | 4080H | 05A5H | GETLN |
| 4080H | 0604H | GET_MCL_DATA | 4080H | 01E5H | GET_SAVE_BOOL |
| 4080H | 01EAH | GET_SAVE_FLOAT | 4080H | 01EFH | GET_SAVE_INT |
| 4080H | 0663H | GET_SAVE_LOST | 4080H | 01F4H | GRID_AXIS_INIT |
| 5300H | 01F6H | INCREMENT | 5300H | 01E8H | INCR_AXIS |
| 5300H | 01EAH | INCR_DIR | 4080H | 01F9H | INCR_FEED_INIT |
| 5300H | 001CH | INCR_TABLE | 4080H | 01FEH | INHIB_DRILL_OFF |
| 4080H | 0203H | INHIB_DRILL_ON | 4133H | 0001H | INIT_FLASH |
| 4133H | 01A4H | INIT_MSG | 4080H | 0208H | INQUIRE_CANCEL |
| 4080H | 020DH | INQUIRE_PROMPT | 4080H | 0212H | INQUIRE_RESPONSE |
| 4080H | 0591H | INSLQQ | 4080H | 0217H | INT_POWER |
| 4080H | 021CH | INT_TO_BOOLS | 4080H | 0221H | INT_TO_FLOAT |
| 4080H | 052DH | INUXQQ | 5300H | 00B6H | IN_POS_LIGHT |
| 5300H | 012CH | JOG_AXES | 5300H | 0138H | JOG_DIR |
| 4080H | 0226H | JOG_MOVE_INIT | 5300H | 0498H | JOG_OFF_PB |
| 4080H | 022BH | JOG_STOP | 4080H | 0230H | KEYBD_LOCK |
| 4080H | 0235H | KEYBD_UNLOCK | 4133H | 02A4H | KILL_MSG |
| 5480H | 0000H | LDIN | 5480H | 043AH | LDOUT |
| 4080H | 023FH | LN | 5480H | 023AH | LOG10 |
| 5300H | 0242H | LOT_PARTS_COUNT | 5480H | 024AH | LRISE |
| 4080H | 0532H | LTDLQQ | 5480H | 020CH | LXOR |
| 4080H | 0253H | MACH_PSN_MCL | 4080H | 0258H | MACH_PSN_PROG |
| 416EH | 172EH | MANUAL | 416EH | 0A4BH | MANUAL_MODE |
| 4080H | 025DH | MANUAL_MODE_SEL | 5300H | 01E6H | MAN_MOVE_COUNT |
| 5300H | 01E4H | MAN_MOVE_STATE | 5300H | 0382H | MAN_SPIN_DIR |
| 4080H | 05C3H | MARKER_FOUND | 4080H | 0262H | MAX |
| 464EH | 0928H | MAXI | 464EH | 00B5H | MAXI_CANCEL |
| 464EH | 0011H | MAXI_CLEAR | 464EH | 0001H | MAXI_INIT |
| 464EH | 00C0H | MAXI_MAIN | 47AEH | 02BBH | MCCCY |
| 47AEH | 002CH | MCCCY_CANCEL | 47AEH | 0001H | MCCCY_CLEAR |
| 47AEH | 004EH | MCCCY_INIT | 47AEH | 006FH | MCCCY_MAIN |
| 4101H | 0019H | MCLDAT | 4101H | 0001H | MCLDAT_INIT |
| 4104H | 02DBH | MCLINT | 4133H | 038BH | MCLLIB |

| | | | | | |
|---|---|---|---|---|---|
| 448CH | 0001H | MCL_1_OEM | 448FH | 0001H | MCL_2_OEM |
| 4080H | 0267H | MCL_CANCEL_DONE | 4080H | 026CH | MCL_CLEAR_DONE |
| 4080H | 0271H | MCL_DATA_1 | 4080H | 0276H | MCL_DATA_2 |
| 4532H | 0001H | MCL_DISP_CHNG | 4532H | 000CH | MCL_DISP_UPDATE |
| 4080H | 027BH | MCL_FEEDHOLD_OFF | 4080H | 0280H | MCL_FEEDHOLD_ON |
| 44B0H | 0001H | MCL_GET_GE_DATA | 44B0H | 041DH | MCL_GET_OEM_DATA |
| 4104H | 0001H | MCL_INITIALIZE | 4080H | 0285H | MCL_MFO_OFF |
| 4080H | 028AH | MCL_MFO_ON | 4080H | 028FH | MCL_MFO_VALUE |
| 4080H | 06D6H | MCL_OFFSET | 4080H | 0294H | MCL_SSO_OFF |
| 4080H | 0299H | MCL_SSO_ON | 4080H | 029EH | MCL_SSO_VALUE |
| 5300H | 00FCH | MCL_STATE | 4080H | 02A3H | MDI_MODE_SELECT |
| 5300H | 0228H | MFO_MULTIPLIER | 4080H | 02A8H | MIN |
| 4080H | 02ADH | MIN_MAX_RPM | 4080H | 02B2H | MIRROR_OFF |
| 4080H | 02B7H | MIRROR_ON | 4080H | 02BCH | MOTION_INHIB_OFF |
| 4080H | 02C1H | MOTION_INHIB_ON | 5300H | 01ECH | MOVE_TYPE_SEL |
| 4080H | 05B9H | MPG_POSITION | 4080H | 05B4H | MPG_START |
| 4080H | 05BEH | MPG_STOP | 4080H | 0465H | MSD_AXIS_BOOL |
| 4080H | 046AH | MSD_AXIS_CHAR | 4080H | 046FH | MSD_AXIS_FLOAT |
| 4080H | 0474H | MSD_AXIS_INT | 4080H | 0479H | MSD_AXIS_RESOLU |
| 4080H | 047EH | MSD_AXIS_TYPE | 4080H | 0483H | MSD_BOOL_TABLE |
| 4080H | 0488H | MSD_CHAR_TABLE | 4080H | 048DH | MSD_FEEDBK_UNITS |
| 4080H | 0492H | MSD_FLOAT_TABLE | 4080H | 0497H | MSD_INT_TABLE |
| 4080H | 049CH | MSD_NUM_OF_AXES | 4080H | 04A1H | MSD_REF_DIR |
| 4080H | 04A6H | MSD_UNITS | 4080H | 05FAH | MSG_NUM_PRESENT |
| 4535H | 0048H | MST | 4080H | 05CDH | MSUB_POST_OFF |
| 4080H | 05C8H | MSUB_POST_ON | 4080H | 0537H | MULRQQ |
| 5300H | 033CH | M_10 | 5300H | 0362H | M_10_11_PRE_REQ |
| 5300H | 033EH | M_11 | 5300H | 0340H | M_12 |
| 5300H | 0364H | M_12_13_PRE_REQ | 5300H | 0342H | M_13 |
| 5300H | 0344H | M_14 | 5300H | 0366H | M_14_15_PRE_REQ |
| 5300H | 0346H | M_15 | 5300H | 0348H | M_16 |
| 5300H | 0368H | M_16_17_PRE_REQ | 5300H | 034AH | M_17 |
| 5300H | 0350H | M_18 | 5300H | 036AH | M_18_19_PRE_REQ |
| 5300H | 0352H | M_19 | 5300H | 0354H | M_20 |
| 5300H | 0356H | M_21 | 5300H | 0358H | M_22 |
| 5300H | 035AH | M_23 | 5300H | 035CH | M_24 |
| 5300H | 035EH | M_25 | 5300H | 0360H | M_26 |
| 5300H | 034CH | M_27 | 5300H | 034EH | M_28 |
| 5300H | 0100H | M_CODES | 4080H | 0244H | M_CODE_1 |
| 4080H | 0249H | M_CODE_2 | 4080H | 024EH | M_CODE_3 |
| 5300H | 00FEH | M_COUNT | 4080H | 02C6H | NC_MFO_VALUE |
| 4080H | 02CBH | NC_SSO_VALUE | 5480H | 05EAH | NC_STATUS |
| 4080H | 053CH | NECLQQ | 4080H | 0541H | NEDLQQ |
| 4080H | 0546H | NEGRQQ | 4080H | 054BH | NEWAQQ |
| 5300H | 0150H | NEW_JOG_COUNT | 437CH | 0BC4H | NORMAL_MCL |
| 448CH | 0022H | OEM1 | 448FH | 002AH | OEM2 |
| 4535H | 03E6H | OEMAIN | 44B0H | 0813H | OEMDSP |
| 4532H | 0017H | OEMGRP | 4493H | 01C1H | OEMMST |
| 4723H | 034BH | OEMSPN | 4723H | 005BH | OEMSPN_CLEAR |
| 4723H | 0001H | OEMSPN_INIT | 4723H | 00A5H | OEMSPN_MAIN |
| 4723H | 02F6H | OEM_CLR_SSO_100 | 5300H | 0224H | OEM_CONTROLS_MFO |
| 5300H | 0226H | OEM_CONTROLS_SSO | 5300H | 01E2H | OEM_MAN_MODE |
| 4535H | 012FH | OEM_MCL_1 | 4535H | 0144H | OEM_MCL_2 |
| 4535H | 03B7H | OEM_MCL_CANCEL | 4535H | 0389H | OEM_MCL_CLEAR |
| 4535H | 0159H | OEM_MCL_INIT | 4723H | 02C3H | OEM_SET_SSO_100 |
| 5300H | 04B2H | OEM_SO_ANGLE | 5300H | 04AAH | OEM_SO_CMD |
| 5300H | 04AEH | OEM_SO_DONE | 5300H | 04B0H | OEM_SO_ERROR |
| 5300H | 04ACH | OEM_SO_PERMIT | 5300H | 04A6H | OEM_SPIN_DIR |
| 5300H | 04A8H | OEM_S_COMPLETE | 5300H | 00B8H | OFFSET_BUT_TYPES |
| 5300H | 00BCH | OFFSET_LIGHTS | 5300H | 01F0H | OFFSET_TYPE_SEL |
| 5300H | 021CH | OLD_JOG_LIGHT | 5300H | 0220H | OLD_MFO_POT |
| 5300H | 01EEH | OLD_MOVE_TYPE | 5300H | 021EH | OLD_OFFSET_LIGHT |
| 5300H | 01F2H | OLD_OFFSET_TYPE | 5300H | 00F0H | OLD_REF_STATE |
| 5300H | 0222H | OLD_SSO_POT | 5300H | 0518H | OLD_TEMP_ADC |
| 4080H | 0550H | ONESQQ | 4080H | 02D0H | ON_REF_SWITCH |
| 4080H | 057DH | OPEN | 5300H | 037AH | OPEN_ON_REF_SW |
| 4080H | 02D5H | OPEN_PSN_LOOP | 4080H | 069AH | OPEN_SER_PORT |
| 4080H | 02DAH | OPER_FDHOLD_OFF | 4080H | 02DFH | OPER_FDHOLD_ON |
| 5300H | 0122H | OPER_RETRACE_ACT | 4080H | 02E4H | OPTION_STOP_OFF |
| 4080H | 02E9H | OPTION_STOP_ON | 4080H | 04ABH | OPT_CONTROL |
| 4080H | 04B0H | OPT_TRP | 5300H | 0118H | OP_STOP_STATE |
| 4080H | 06C2H | ORD | 4759H | 0537H | ORIENT |
| 4080H | 02EEH | ORIENT_ANGLE | 4759H | 0047H | ORIENT_CANCEL |
| 4759H | 002EH | ORIENT_CLEAR | 4759H | 0001H | ORIENT_INIT |
| 4759H | 0516H | ORIENT_MAIN | 46E2H | 03A9H | OVRTRV |
| 46E2H | 018CH | OVRTRV_CANCEL | 46E2H | 013EH | OVRTRV_CLEAR |
| 46E2H | 0103H | OVRTRV_INIT | 46E2H | 01A1H | OVRTRV_MAIN |
| 5300H | 0486H | OVRTRV_STATE | 4080H | 02F3H | PARAMETER_CHANGE |
| 4080H | 02F8H | PARAMETER_VALUE | 5300H | 0240H | PARTS_COUNTER |
| 4080H | 05F5H | PART_TIME_RESET | 4080H | 065EH | PLOT_NUM_SELECT |
| 4080H | 0555H | POSLQQ | 4080H | 0302H | POSTLUDE_REQUEST |
| 4080H | 02FDH | POSTLUDE_REQ_OFF | 5300H | 04A4H | POST_STOP |
| 5300H | 04A0H | POWER_UP_DONE | 4080H | 0307H | PRELUDE_OFF_GE |
| 4080H | 030CH | PRELUDE_ON_GE | 4080H | 0316H | PRELUDE_REQUEST |
| 4080H | 0311H | PRELUDE_REQ_OFF | 5300H | 010AH | PRE_SEL_TOOL |
| 4080H | 031BH | PRIVILEGE_SELECT | 4080H | 0320H | PROBE_MACH_PSN |

| | | | | | |
|---|---|---|---|---|---|
| 4080H | 0325H | PROBE_PSN | 5300H | 021AH | PROGRAMMED_ZERO |
| 4080H | 0348H | PROGRAM_REWIND | 4080H | 032AH | PROG_ERROR_NUM |
| 4080H | 0695H | PROG_ID_SELECT | 4080H | 032FH | PROG_NUM_SELECT |
| 4080H | 0334H | PROG_REFERENCE | 4080H | 0339H | PROG_REL_PSN |
| 5300H | 039EH | PROG_S | 4080H | 033EH | PROG_SEARCH_PROC |
| 4080H | 0343H | PROG_SEARCH_SKIP | 5300H | 0380H | PROG_SPIN_DIR |
| 4080H | 034DH | PSN_LOOP_OPENED | 4080H | 067CH | PUNCH_DONE |
| 4080H | 06D1H | PUNCH_IN_PROG | 4080H | 05D7H | PUTBUF |
| 4080H | 059BH | PUTCH | 4080H | 05A0H | PUTLN |
| 4080H | 05AAH | PUTSTR | 4133H | 0252H | PUT_MSG |
| 4080H | 0352H | PUT_SAVE_BOOL | 4080H | 0357H | PUT_SAVE_FLOAT |
| 4080H | 035CH | PUT_SAVE_INT | 471EH | 0037H | PWRUP |
| 471EH | 001CH | PWRUP_CANCEL | 471EH | 0011H | PWRUP_CLEAR |
| 471EH | 0001H | PWRUP_INIT | 471EH | 0027H | PWRUP_MAIN |
| 5300H | 01FEH | RATE | 5480H | 0140H | RDIN |
| 5480H | 04FAH | RDOUT | 4080H | 0361H | READ_TIME_REAL |
| 4080H | 0366H | REF_AXIS_INIT | 4080H | 0668H | REF_BACKOFF |
| 5300H | 00D8H | REF_LIM_SW_OFF | 4080H | 036BH | REMOVE_AXIS |
| 4080H | 05E1H | RENAME | 4080H | 0370H | REQED_NORMAL_RUN |
| 4080H | 0375H | REQUEST_PRIORITY | 4080H | 0681H | RESUME_AXIS_MTN |
| 4080H | 05FFH | RESYNC_AXIS | 4080H | 037AH | RETRACE_BY_BLKS |
| 4080H | 06EAH | RETRACE_BY_DIST | 4080H | 06EFH | RETRACE_FEEDRATE |
| 4080H | 037FH | RETRACE_OFF | 4080H | 0384H | RETRACE_ON |
| 4080H | 0389H | ROUND | 5480H | 038AH | RRISE |
| 4080H | 038EH | RUN_ACTIVE_CYCLE | 4080H | 068BH | RUN_FAST |
| 4080H | 0393H | RUN_MSUB | 5480H | 0234H | RXOR |
| 4080H | 039DH | SECONDOFFSET_OFF | 4080H | 03A2H | SECONDOFFSET_ON |
| 4080H | 05AFH | SEEKEOF | 5300H | 0386H | SELECTED_GEAR |
| 4535H | 03DBH | SELECT_MCS | 4080H | 06A9H | SEND_SER_OUTPUT |
| 4080H | 055AH | SEQLQQ | 4080H | 03A7H | SERVO_ENABLE_GE |
| 4080H | 03ACH | SERVO_STOP_GE | 4080H | 03B1H | SERVO_STOP_OFF |
| 4080H | 03B6H | SERVO_STOP_ON | 4080H | 03BBH | SERVO_STOP_TYPE |
| 4080H | 06A4H | SETUP_SER_INPUT | 4080H | 03C0H | SET_AXIS_ZERO |
| 4133H | 003BH | SET_BUSY | 4080H | 06E0H | SET_INPUT_MASK |
| 4493H | 0001H | SET_M_FLAGS | 4080H | 0609H | SET_RECIP_LIMIT |
| 4080H | 03C5H | SIN | 4080H | 0686H | SINGLE_CYC_INIT |
| 4080H | 03CAH | SINGLE_MODE_SEL | 4080H | 055FH | SNELQQ |
| 4575H | 0D77H | SPCONT | 5300H | 0388H | SPINDLE_ENABLE |
| 4080H | 03D9H | SPINDLE_RPM | 4080H | 03CFH | SPIN_AXIS_RUN |
| 5300H | 03ACH | SPIN_FAULT | 4080H | 03D4H | SPIN_IOC_RUN |
| 5300H | 03D4H | SPIN_POST | 5300H | 03D2H | SPIN_PRE |
| 4575H | 04F1H | SPIN_RUN | 4575H | 01C1H | SP_CANCEL |
| 4575H | 014DH | SP_CLEAR | 4575H | 0001H | SP_INIT |
| 4575H | 01DFH | SP_MCL1 | 4575H | 0300H | SP_MCL2 |
| 4080H | 03DEH | SQR | 4080H | 03E3H | SQRT |
| 5300H | 0238H | SSO_MIN_FRACTION | 5300H | 0230H | SSO_MULTIPLIER |
| 4080H | 060EH | START_RECIP | 4080H | 03E8H | START_TIMER |
| 4080H | 03EDH | START_TIMER_GE | 437CH | 1067H | STDMCL |
| 5300H | 0248H | STD_MCL_VERSION | 4080H | 0613H | STOP_RECIP |
| 4080H | 070DH | STORE_MCL_OFFSET | 4080H | 0564H | SUBRQQ |
| 4080H | 0569H | SUBSQQ | 4080H | 03F2H | SYS_ERROR |
| 5300H | 03C8H | S_ACTIVE_DIR | 5300H | 03CAH | S_ACTIVE_SPEED |
| 5300H | 03AEH | S_AXIS_NO | 5300H | 038CH | S_CLOSE_LOOP |
| 5300H | 03A8H | S_CMD_COMPLETE | 5300H | 038EH | S_CMD_DIR |
| 5300H | 0390H | S_CMD_SPEED | 4080H | 0398H | S_CODE |
| 5300H | 04CCH | S_DIST_TO_GO | 5300H | 03AAH | S_LOOP_CLOSED |
| 5300H | 03C0H | S_MAX_RPM | 5300H | 03B8H | S_MIN_RPM |
| 5300H | 037EH | S_MODE | 5300H | 04C8H | S_ORIENT_DIR |
| 5300H | 04C0H | S_ORIENT_RATE | 5300H | 04CAH | S_ORIENT_STATE |
| 5300H | 0398H | S_SPEED_OVRIDE | 5300H | 039AH | S_STROBE |
| 4080H | 03FCH | TABLE_CHG_FLOAT | 4080H | 0401H | TABLE_CHG_INT |
| 4080H | 0406H | TABLE_CHG_TOOL | 4080H | 040BH | TABLE_VAL_FLOAT |
| 4080H | 0410H | TABLE_VAL_INT | 4080H | 0415H | TABLE_VAL_TOOL |
| 4080H | 041AH | TAN | 4080H | 06FEH | TBL_ADD_INT |
| 4080H | 06F9H | TBL_CHG_INT | 4080H | 06F4H | TBL_VAL_INT |
| 5300H | 026AH | TEMP_BOOL | 5300H | 0268H | TEMP_BYTE |
| 5300H | 026EH | TEMP_FLOAT | 5300H | 026CH | TEMP_INT |
| 4080H | 041FH | TEST_OFF | 4080H | 0424H | TEST_ON |
| 5300H | 011AH | TEST_STATE | 47DBH | 0064H | TGCOMP |
| 47DBH | 0001H | TGCOMP_INIT | 47DBH | 001DH | TGCOMP_MAIN |
| 4080H | 0429H | THC_POST_OFF | 4080H | 042EH | THC_POST_ON |
| 4080H | 0433H | TIMER_RUNNING | 4080H | 0438H | TIMER_RUNNING_GE |
| 5300H | 0106H | TOOL_IN_SPINDLE | 5300H | 0246H | TOOL_MAN_ACTIVE |
| 4080H | 043DH | TRACKING_OFF | 4080H | 0442H | TRACKING_ON |
| 4080H | 05EBH | TRAV_ACC_DEC_OFF | 4080H | 05E6H | TRAV_ACC_DEC_ON |
| 4080H | 0447H | TRAV_POST_OFF | 4080H | 044CH | TRAV_POST_ON |
| 4080H | 0712H | TRAV_RATE_OVRIDE | 5300H | 0126H | TRP_IS_FLASHING |
| 4080H | 0451H | TRP_OFF | 4080H | 0456H | TRP_ON |
| 4080H | 045BH | TRUNC | 4133H | 01BBH | TRY_MSG |
| 4080H | 03F7H | T_CODE | 4133H | 00CBH | UNFLASH |
| 4080H | 0460H | UNREF_AXIS | 4080H | 056EH | VASGQQ |
| 4080H | 0578H | XMTOS86 | 42E1H | 099DH | ZERO |
| 42E1H | 01ECH | ZEROING | 5300H | 0214H | ZERO_ACTIVE_CNT |
| 5300H | 0216H | ZERO_AX_NO | 5300H | 0206H | ZERO_STATE |

```
5300H  0208H    ZERO_VECTOR         4080H  0573H    ZERSQQ
END OF MAP
SUCCESSFUL COMPLETION
```

We claim:

1. Apparatus for forming a form wound stator coil for placement into slots within a stator core from a bobbin having a lower leg including a straight length portion and two nose end arms, and an upper leg including an upper leg straight length portion and two nose end arms, an outer lead end nose defining a lead end inner nose radius, an opposite outer lead end nose defining an opposite lead end inner nose radius and leads the apparatus comprising
   a. lower leg clamping means for clamping the lower leg of the bobbin to maintain the lower leg straight length portion substantially in its original shape and for forming a radius of predetermined dimensions between the lower straight length portion and the lower leg nose end arms;
   b. lower leg clamp positioning means for initially positioning the lower leg clamping means on at least the opposite ends of the lower leg straight length portion;
   c. upper leg clamping means for clamping the upper leg of the bobbin to maintain the upper leg straight length portion substantially in its original shape and for forming a radius of predetermined dimensions between the straight length portion and the upper leg nose end arms;
   d. upper leg clamp positioning means for initially positioning the upper leg clamping means on at least the opposite ends of the upper leg straight length portion;
   e. pivoting means for pivoting the lower leg clamping means about an axis generally equidistant to the distance from the slots within the stator core to the center axis of the stator core;
   f. pivoting means for pivoting the upper leg clamping means about said axis about which said lower leg clamping means is being pivoted;
   g. lead end clamping means for securing the lead end nose, for forming radii between the lead end nose and the upper and lower nose end arms proximate to the lead end nose, and for rotating the lead end nose to a predetermined angle;
   h. opposite lead end clamping means for securing the opposite lead end nose, for forming radii between the opposite lead end nose and the upper and lower nose end arms proximate to the opposite lead end nose, and for rotating the opposite lead end nose to a predetermined angle;
   i. first positioning means for positioning the opposite lead end clamping means with respect to the dimensions of the bobbin;
   j. second positioning means for positioning the lead end clamping means with respect to the dimensions of the bobbin;
   k. first pressure means for selectively applying generally outward directed pressure against the first positioning means;
   l. second pressure means for selectively applying generally outward directed pressure against the second positioning means;
   m. operation means for pivoting the lower leg clamping means to a first predetermined angle and for pivoting the upper leg clamping means to a second predetermined angle and for activating the first and second pressure means to apply a predetermined amount of pressure so that the lower leg clamping means and the upper leg clamping means reach their respective predetermined angles substantially simultaneously;
   n. encoder means for providing feedback to control means of the positions of the lower leg clamping means, the lower leg clamp positioning means, the upper leg clamping means, the upper leg clamp positioning means, the pivoting means, the lead end clamping means, the opposite lead end clamping means, the first and second positioning means, and for providing feedback to control means of the status of the operation means; and
   o. control means for controlling the operation means to position and move the lower leg clamping means, the lower leg clamp positioning means, the upper leg clamping means, the upper leg clamp positioning means, the lead end clamping means, the opposite lead end clamping means, and the first and second positioning means in a predetermined manner so that the clamps can be initially positioned to receive a bobbin having predetermined dimensions, and so that the clamps can close to secure the bobbin, and so that the clamps can be moved and rotated to produce a formed coil having predetermined dimensions.

2. The apparatus of claim 1 further comprising means for arcing the arms of the upper and lower legs to a predetermined radius.

3. The apparatus of claim 1 in which the operation means is a hydraulic system.

4. The apparatus of claim 1 further comprising means for configuring the leads to a predetermined configuration.

5. The apparatus of claim 1 further comprising position indication means for visually depicting the lateral spacing between each of the lower leg clamping means and between each of the upper leg clamping means for setting those clamps to a distance equal to the straight length portion of each leg of the bobbin.

6. The apparatus of claim 5 in which the means for configuring the leads to a predetermined configuration comprise configuration means for altering the configuration of the leads, and positioning means for positioning the leads so that portions of the leads may be operated on by the configuration means.

7. The apparatus of claim 5 in which the configuration means comprise means for bending the lower lead of the bobbin and separate, independently controlled means for bending the upper lead of the bobbin.

8. The apparatus of claim 1 in which the lead end clamping means comprises a back block cooperatively engaged with a front clamping block and further including
   means for positioning the lead end nose and portions of the nose end arms of the bobbin proximate to the lead end nose;
   means for positioning the leads;

means for forming outer radii having predetermined dimensions on the portions of the nose end arms proximate to the lead end nose;

means for forming outer radii having predetermined directions on the portions of the leads proximate to the lead end nose; and means for rotating the lead end nose to a predetermined angle.

9. The apparatus of claim 8 further comprising means for configuring the leads to a predetermined configuration.

10. The apparatus of claim 9 in which the means for configuring the leads to a predetermined configuration comprise configuration means for altering the configuration of the leads, and positioning means for positioning the leads so that portions of the leads may be operated on by the configuration means.

11. The apparatus of claim 10 in which the configuration means comprise means for bending the lower lead of the bobbin and separate, independently controlled means for bending the upper lead of the bobbin.

12. The apparatus of claim 10 in which the opposite lead end clamping means includes a back block cooperatively engaged with a front clamping block and further including means for positioning the opposite lead end nose and portions of the nose end arms of the bobbin proximate to the opposite lead end nose;

means for forming outer radii having predetermined dimensions on the portions of the nose end arms proximate to the opposite lead end nose; and, means for rotating the opposite lead end nose to a predetermined angle.

* * * * *